US012244996B2

(12) United States Patent
Zhang et al.

(10) Patent No.: US 12,244,996 B2
(45) **Date of Patent: *Mar. 4, 2025**

(54) HEADPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,530

(22) Filed: Feb. 25, 2024

(65) Prior Publication Data

US 2024/0259725 A1 Aug. 1, 2024

Related U.S. Application Data

(63) Continuation of application No. PCT/CN2023/126054, filed on Oct. 23, 2023.

(30) Foreign Application Priority Data

Oct. 28, 2022 (CN) ......................... 202211336918.4
Dec. 1, 2022 (CN) ......................... 202223239628.6

(Continued)

(51) Int. Cl.
*H04R 1/10* (2006.01)

(52) U.S. Cl.
CPC ......... *H04R 1/1075* (2013.01); *H04R 1/1008* (2013.01); *H04R 1/105* (2013.01)

(58) Field of Classification Search
CPC ........ H04R 1/023; H04R 1/028; H04R 1/083; H04R 1/1008; H04R 1/105; H04R 1/1066;

(Continued)

(56) References Cited

U.S. PATENT DOCUMENTS 4,347,911 A * 9/1982 Bertagna ................ G10K 11/22 181/131
5,164,987 A * 11/1992 Raven .................. H04R 1/1066 381/381

(Continued)

FOREIGN PATENT DOCUMENTS

CN 206517569 U 9/2017
CN 110958526 A 4/2020

(Continued)

OTHER PUBLICATIONS

International Search Report in PCT/CN2023/126054 mailed on Dec. 5, 2023, 9 pages.

(Continued)

*Primary Examiner* — Gerald Gauthier
(74) *Attorney, Agent, or Firm* — METIS IP LLC

(57) ABSTRACT

Embodiments of the present disclosure provide a headphone including a sound production component and an ear hook. The ear hook includes a first portion and a second portion connected in sequence. The first portion being hooked up between an ear auricle and a head of a user, and the second portion is configured to be hang between an auricle of a user and a head of the user, the second portion extends toward a front outer side of the auricle, connects with the sound production component, and is configured to place the sound (Continued)

production component at a position close to an ear canal without blocking an opening of the ear canal, and at least a portion of the sound production component is inserted into an concha cavity. The sound production component and the first portion of the ear hook clamp the auricle in a wearing state.

20 Claims, 16 Drawing Sheets

(30) Foreign Application Priority Data

Dec. 30, 2022 (WO) ................ PCT/CN2022/144339
Mar. 2, 2023 (WO) ................ PCT/CN2023/079400
Mar. 2, 2023 (WO) ................ PCT/CN2023/079409

(58) Field of Classification Search
CPC ...... H04R 1/1075; H04R 1/2853; H04R 1/38; H04R 1/406; H04R 3/005; H04R 5/0335; H04R 3/04; H04R 9/06; H04R 9/025; G10L 15/22; G10L 15/26; G02C 11/06; G10K 11/22; G10K 11/17857
See application file for complete search history.

(56) References Cited

U.S. PATENT DOCUMENTS 5,694,475 A * 12/1997 Boyden ................ H04R 1/1066 381/370
5,737,436 A * 4/1998 Boyden .................. G02C 11/06 381/370
6,449,374 B1 * 9/2002 Skulley .................. H04R 1/083 381/381
7,050,598 B1 5/2006 Ham
9,020,168 B2 * 4/2015 Karkkainen ......... H04R 1/1075 381/381
11,902,731 B1 * 2/2024 Zhang .................. H04R 1/1008
11,902,734 B1 * 2/2024 Xu ........................ H04R 1/1008
11,956,584 B1 * 4/2024 Zhang .................. H04R 1/1041
11,968,489 B1 * 4/2024 Zhang .................. H04R 1/1008
2006/0008106 A1 * 1/2006 Harper ................. H04R 1/1033 381/374
2007/0009133 A1 1/2007 Gerkinsmeyer
2009/0285436 A1 * 11/2009 Lowry ................. H04R 1/1016 381/380
2010/0254563 A1 * 10/2010 Harper ................. H04R 1/1033 381/381
2013/0028461 A1 * 1/2013 Harper ................. H04R 1/1016 381/374
2014/0185855 A1 * 7/2014 Lin ...................... H04R 5/0335 381/383
2014/0334661 A1 * 11/2014 Besgen, Sr. .......... H04R 1/1066 381/388
2015/0181338 A1 * 6/2015 Hosoi ...................... H04R 1/02 381/309
2015/0222977 A1 * 8/2015 Angel, Jr. .............. H04R 1/105 381/74
2016/0134957 A1 * 5/2016 Jentz ...................... H04R 1/105 381/380
2017/0111728 A1 * 4/2017 Kim ..................... H04R 1/1075
2017/0223445 A1 * 8/2017 Bullen ..................... H04R 3/04
2018/0288518 A1 * 10/2018 Schmidt ................. H04R 1/028
2019/0045292 A1 * 2/2019 Yung .................... H04R 1/1041
2019/0069070 A1 * 2/2019 Patil ..................... H04R 1/2857
2019/0327548 A1 10/2019 Wei et al.
2019/0379962 A1 * 12/2019 Navid ...................... H04R 1/38
2020/0125646 A1 * 4/2020 D'oleo .................... G10L 15/26
2020/0196062 A1 6/2020 Zhang
2020/0275193 A1 * 8/2020 Ikeda ................... H04R 1/2819
2020/0322712 A1 10/2020 Williams et al.
2021/0084399 A1 * 3/2021 Sha ...................... H04R 1/1008
2021/0099789 A1 * 4/2021 Sha ...................... H04R 1/1091
2021/0105554 A1 * 4/2021 McRae ................ H04R 29/001
2021/0136470 A1 * 5/2021 Minoda ................ H04R 1/2819
2022/0182750 A1 * 6/2022 Lauridsen ............ H04R 1/1083
2022/0264219 A1 * 8/2022 Keikhosravy .......... H04R 3/005
2022/0337935 A1 * 10/2022 Wang ................... H04R 1/1066
2022/0360873 A1 * 11/2022 Zhang .................. H04R 5/0335
2022/0360888 A1 * 11/2022 Zhang .................... H04R 1/023
2023/0061686 A1 * 3/2023 Wolfl ................... H04R 1/2853
2023/0063283 A1 * 3/2023 Zheng .................... H04R 1/406
2023/0141946 A1 * 5/2023 Zhang .................... G02C 11/00 381/381
2023/0145038 A1 * 5/2023 Zhang ...................... H04R 1/10 381/381
2023/0329913 A1 * 10/2023 Li .......................... G10L 15/22
2023/0381025 A1 * 11/2023 Keikhosravy ........ H04R 1/1041
2024/0080606 A1 * 3/2024 Manni .................. H04R 1/1008
2024/0147112 A1 * 5/2024 Zhang .................... H04R 1/347
2024/0147118 A1 * 5/2024 Xu ....................... H04R 1/1066
2024/0147133 A1 * 5/2024 Zhang .................. H04R 1/1066
2024/0187780 A1 * 6/2024 Zhang .................... H04R 1/105
2024/0223943 A1 * 7/2024 Zhang .................. H04R 1/1008
2024/0236545 A1 * 7/2024 Xu ......................... H04R 1/021
2024/0251191 A1 * 7/2024 Zhang .................... H04R 1/105
2024/0251193 A1 * 7/2024 Xu ....................... H04R 1/1016
2024/0259725 A1 * 8/2024 Zhang .................. H04R 1/1008

FOREIGN PATENT DOCUMENTS

CN 212909891 U 4/2021
CN 113542956 A 10/2021
CN 113556638 A 10/2021
CN 113573215 A 10/2021
CN 214429681 U 10/2021
CN 215682610 U 1/2022
CN 114286228 A 4/2022
CN 114286236 A 4/2022
CN 216752043 U 6/2022
CN 217011123 U 7/2022
CN 115175069 A 10/2022
CN 115460496 A 12/2022
CN 115550783 A 12/2022
CN 218352706 U 1/2023
JP 2003032772 A 1/2003

OTHER PUBLICATIONS

Written Opinion in PCT/CN2023/126054 mailed on Dec. 5, 2023, 9 pages.
International Search Report in PCT/CN2023/126054 mailed on Dec. 5, 2023, 7 pages.
Written Opinion in PCT/CN2023/126054 mailed on Dec. 5, 2023, 6 pages.
International Search Report in PCT/CN2023/079400 mailed on Jul. 14, 2023, 6 pages.
Written Opinion in PCT/CN2023/079400 mailed on Jul. 14, 2023, 8 pages.
International Search Report in PCT/CN2023/079409 mailed on Jun. 29, 2023, 6 pages.
Written Opinion in PCT/CN2023/079409 mailed on Jun. 29, 2023, 6 pages.

* cited by examiner

HEADPHONES

CROSS-REFERENCE TO RELATED APPLICATIONS

This application is a Continuation of International Application No. PCT/CN2023/126054, filed on Oct. 23, 2023, which claims priority to the Chinese Patent Application No. 202211336918.4, filed on Oct. 28, 2022, the Chinese Patent Application No. 202223239628.6, filed on Dec. 1, 2022, the International Application No. PCT/CN2022/144339, filed on Dec. 30, 2022, the International Application No. PCT/CN2023/079400, filed on Mar. 2, 2023, and the International Application No. PCT/CN2023/079409, filed on Mar. 2, 2023, the entire contents of each of which are hereby incorporated by reference.

TECHNICAL FIELD

The present disclosure relates to the field of acoustic technology, and in particular, to headphones.

BACKGROUND

With the development of acoustic output technology, acoustic devices (e.g., headphones) have been widely used in people's daily lives, and can be used in conjunction with electronic devices such as cell phones and computers to provide users with an auditory feast. Acoustic devices may include head-mounted acoustic devices, ear-hook type acoustic devices, and in-ear acoustic devices according to the way users wear them. The output performance of the acoustic devices, as well as the wearing comfort and stability, can greatly affect the user's choice and experience.

Therefore, it is desirable to provide a headphone, which can improve the wearing comfort of the user and the wearing stability of the headphone while ensuring the output performance of the headphone.

SUMMARY

One of the embodiments of the present disclosure provides a headphone including a sound production component and an ear hook. The ear hook may include a first portion and a second portion connected in sequence, wherein the first portion may be configured to be hung between an auricle of a user and a head of the user, and the second portion may extend toward a front outer side of the auricle, connect with the sound production component, and may be configured to place the sound production component at a position close to an ear canal without blocking an opening of the ear canal. At least a portion of the sound production component may extend into a concha cavity. The sound production component and the first portion of the ear hook may clamp the auricle in a wearing state, and a minimum distance between the sound production component and the first portion of the ear hook in the wearing state may have a difference with a minimum distance between the sound production component and the first portion of the ear hook in a non-wearing state, and the difference may not be less than 1 mm. The sound production component may have a first projection on a sagittal plane of the user, and a distance between a centroid of the first projection and a projection of an edge of the concha cavity of the auricle on the sagittal plane may be within a range of 4 mm-25 mm.

One of the embodiments of the present disclosure further provides a sound production component and an ear hook.

The ear hook may include a first portion and a second portion connected in sequence, wherein the first portion may be configured to hung between an auricle of a user and a head of the user, the second portion may extend toward a front outer side of the auricle, connect with the sound production component, and may be configured to place the sound production component at a position close to an ear canal without blocking an opening of the ear canal. At least a portion of the sound production component may cover an antihelix region. The sound production component and the auricle may have a first projection and a second projection, respectively. On a sagittal plane, a centroid of the first projection may have a first distance from a highest point of the second projection in a vertical axis direction, and a ratio of the first distance to a height of the second projection in the vertical axis direction may be within a range of 0.25-0.4. The centroid of the first projection may have a second distance from an end point of the second projection in a sagittal axis direction, and a ratio of the second distance to a width of the second projection in the sagittal axis direction may be within a range of 0.4-0.6. A side of the sound production component facing the antihelix region may include a clamping region in contact with the antihelix region, and in a wearing state, a distance between a farthest point on the sound production component from a plane of the ear hook and the plane of the ear hook may be within a range of 12 mm-19 mm.

Additional features may be set forth in part in the following description and may become apparent to those skilled in the art by reference to the following and the accompanying drawings, or may be appreciated by the production or operation of examples. The features of the present disclosure may be realized and obtained by practicing or using aspects of the methods, tools, and combinations set forth in the following detailed examples.

BRIEF DESCRIPTION OF THE DRAWINGS

The present disclosure will be further illustrated by way of exemplary embodiments, which will be described in detail with the accompanying drawings. These embodiments are not limiting, and in these embodiments, the same numbering denotes the same structure, wherein:

FIG. 4 is a schematic diagram illustrating an acoustic model of a quasi-cavity structure according to some embodiments of the present disclosure;

DETAILED DESCRIPTION

Figure 1:
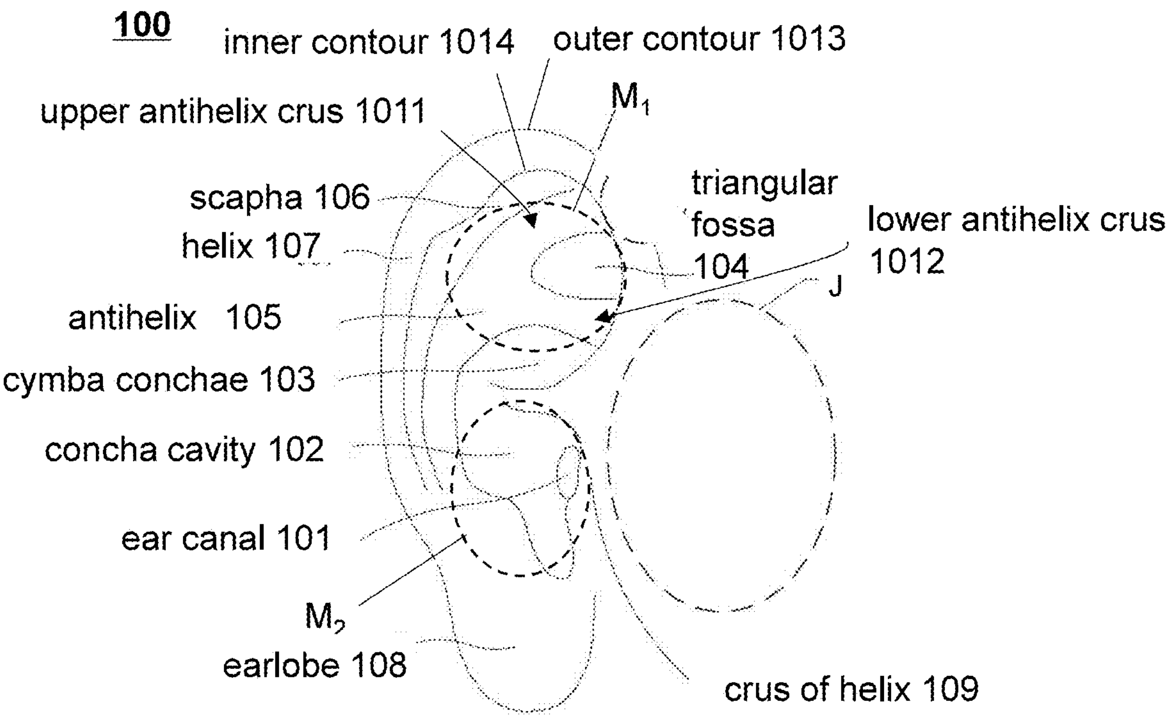
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. It should be understood that these exemplary embodiments are given only to enable those of ordinary skill in the art to better understand and thus realize the present disclosure, and are not intended to limit the scope of the present disclosure in any way. Unless obviously obtained from the context or the context illustrates otherwise, the same numeral in the drawings refers to the same structure or operation.

As indicated in the disclosure and claims, the terms “a”, “an”, “an” and/or “the” are not specific to the singular form and may include the plural form unless the context clearly indicates an exception. In general, the terms “comprise,” “comprises,” and/or “comprising,” “include,” “includes,” and/or “including,” merely prompt to include steps and elements that have been clearly identified, and these steps and elements do not constitute an exclusive listing. The methods or devices may also include other steps or elements. The term “based on” is “based at least in part on.” The term “one embodiment” means “at least one embodiment”; the term “another embodiment” means “at least one other embodiment”.

In the description of the present disclosure, it should be understood that the orientation or positional relationship indicated by the terms “front”, “rear”, “ear hook”, “rear hook”, or the like are based only on that shown in the accompanying drawings, and are intended only to facilitate the description of the present disclosure and to simplify the description, and are not intended to indicate or imply that the device or element referred to have a particular orientation or be constructed and operated in a particular orientation, and therefore are not to be construed as a limitation of the present disclosure.

Additionally, the terms “first” and “second” are used for descriptive purposes only and are not to be construed as indicating or implying relative importance or implicitly specifying the number of technical features indicated. Therefore, a feature defined as “first”, and “second” may expressly or impliedly include at least one of the features. In the description of the present disclosure, “plurality” means at least two, e.g., two, three, or the like, unless explicitly and specifically limited otherwise.

In the present disclosure, unless otherwise expressly specified or limited, the terms "mounted", "connected", "connection", "fixed", etc. are to be understood in a broad sense. For example, as a fixed connection, a removable connection, a one-piece connection, a mechanical connection, an electrical connection, a direct connection, an indirect connection through an intermediate medium, a connection between two elements, or an interactive relationship between the two elements, unless otherwise expressly limited. For those ordinary skilled in the art, the specific meaning of the above terms in the present disclosure may be understood according to specific circumstances.

Embodiments of the present disclosure provide a headphone including a sound production component and an ear hook. The ear hook may include a first portion and a second portion connected in sequence. The first portion may be configured to be hung between an auricle of a user and a head of the user. The second portion may extend toward a front outer side of the auricle, connect with the sound production component, and is configured to place the sound production component at a position close to an ear canal without blocking an opening of the ear canal. At least a portion of the sound production component may be inserted into a concha cavity. The sound production component and the first portion of the ear hook may clamp the auricle in a wearing state. A minimum distance between the sound production component and the first portion of the ear hook in the wearing state may have a difference from a minimum distance between the sound production component and the first portion of the ear hook in a non-wearing state, and the difference may be not less than 1 mm. The sound production component may have a first projection on a sagittal plane of the user. A distance between a centroid of the first projection and a projection of an edge of the concha cavity of the auricle on the sagittal plane may be within a range of 4 mm-25 mm. In the embodiments of the present disclosure, by designing the distance between the centroid of the first projection and the projection of the edge of the concha cavity on the sagittal plane, a size of a gap formed between the sound production component and the concha cavity (i.e., the count of leakage structures and the size of the openings of the quasi-cavity structure) may be made more appropriate, to ensure a listening quality and a leakage reduction effect of the headphone. Furthermore, the sound production component and the first portion of the ear hook may clamp the ear. If the difference between the minimum distance from the sound production component to the first portion of the ear hook in the wearing state and the minimum distance from the sound production component to the first portion of the ear hook in the non-wearing state is too small, the clamping force may be too small, the sound production component may not be worn stably in the concha cavity of the user, and an effective quasi-cavity structure may fail to form between the sound production component and the concha cavity, i.e., the size of the gap formed between the sound production component and the concha cavity may be too large, which affects a listening volume received near the ear canal of the user. By setting the difference between the minimum distance from the sound production component to the first portion of the ear hook in the wearing state and the minimum distance from the sound production component to the first portion of the ear hook in the non-wearing state not less than 1 mm, the listening volume near the ear canal of the user may be ensured while providing a suitable clamping force and ensuring the wearing comfort.

FIG. 1 is a schematic diagram illustrating an exemplary ear according to some embodiments of the present disclosure. Referring to FIG. 1, the ear 100 may include an external ear canal 101, a concha cavity 102, a cymba conchae 103, a triangular fossa 104, an antihelix 105, a scapha 106, a helix 107, an earlobe 108, a crus of helix 109, an outer contour 1013, and an inner contour 1014. It should be noted that, for the convenience of description, an upper antihelix crus 1011, a lower antihelix crus 1012, and the antihelix 105 are collectively referred to as the antihelix region in the embodiments of the present disclosure. In some embodiments, an acoustic device may be stably worn using one or more parts of the ear 100 supporting the acoustic device. In some embodiments, the external ear canal 101, the concha cavity 102, the cymba conchae 103, and the triangular fossa 104 may have a certain depth and volume in a three-dimensional space, which can be used to meet the wearing requirements of the acoustic device. For example, the acoustic device (e.g., the headphone) may be worn in the external ear canal 101. In some embodiments, the acoustic device may be worn using other parts of the ear 100 than the external ear canal 101. For example, the acoustic device may be worn through the cymba conchae 103, the triangular fossa 104, the antihelix 105, the scapha 106, the helix 107, etc. or a combination thereof. In some embodiments, the earlobe 108 of the user and other parts may be further used to improve the wearing comfort and reliability of the acoustic device. By using other parts of the ear 100 than the external ear canal 101 to realize the wearing of the acoustic device and the transmission of sound, the external ear canal 101 of the user may be "freed". When the user wears the acoustic device (the headphone), the acoustic device may not block the external ear canal 101 of the user. The user may receive both the sound from the acoustic device and the sound from the environment (e.g., sound of a whistle, the sound of a vehicle bell, the sound of people around, the sound of traffic guidance, etc.), thereby reducing the probability of traffic accidents. In some embodiments, the acoustic device may be designed into a structure adapted to the ear 100 according to a structure of the ear 100, to realize the wearing of the sound production component of the acoustic device at different positions of the ear. For example, when the acoustic device is the headphone, the headphone may include a suspension structure (e.g., the ear hook) and the sound production component. The sound production component and the suspension structure may be physically connected. The suspension structure may be adapted to a shape of the auricle, to place the whole or a portion of the structure of the sound production component on a front side (e.g., a region J enclosed by dotted lines in FIG. 1) of the crus of helix 109. As another example, when the user wears the headphone, the whole or a portion of the structure of the sound production component may be in contact with an upper part (e.g., a position of one or more of the crus of helix 109, the cymba conchae 103, the triangular fossa 104, the antihelix 105, the scapha 106, the helix 107, etc.) of the external ear canal 101. As another example, when the user wears the headphone, the whole or a portion of the structure of the sound production component may be located in a cavity (e.g., a region M1 including at least the cymba conchae 103 and the triangular fossa 104 and a region M2 including at least the concha cavity 102 enclosed by the dotted lines in FIG. 1) formed by one or more parts (e.g., the concha cavity 102, the cymba conchae 103, the triangular fossa 104, etc.) of the ear.

Different users may have individual differences, resulting in different shapes, sizes, and other dimensional differences in the ears. For case of description and understanding, unless otherwise specified, the present disclosure mainly takes to an ear model with a "standard" shape and size for reference and further describes how the acoustic device in different embodiments is worn on the ear model. For example, a simulator containing the head and (left and right) ears thereof prepared based on ANSI: S3.36, S3.25 and IEC: 60318-7 standards, such as GRAS KEMAR, HEAD Acoustics, B&K 4128 series, or B&K 5128 series, may be designated as a reference for wearing the acoustic device, to present a situation that most users normally wear the acoustic device. Taking GRAS KEMAR as an example, an ear simulator may be any one of GRAS 45AC, GRAS 45BC, GRAS 45CC, or GRAS 43AG. Taking HEAD Acoustics as an example, an ear simulator may be any one of HMS II.3, HMS II.3 LN, or HMS II.3LN HEC. It should be noted that the range of data measured in the embodiments of the present disclosure is based on GRAS 45BC KEMAR, but it should be understood that there may be differences between different head models and ear models. There may be a fluctuation of +10% in the relevant data range with other models. Merely by way of example, a reference ear model may have the following relevant features: a size of a projection of an auricle on a sagittal plane in a vertical axis direction may be within a range of 55 mm-65 mm, and a size of the projection of the auricle on the sagittal plane in a sagittal axis direction may be within a range of 45 mm-55 mm. The projection of the auricle on the sagittal plane refers to a projection of an edge of the auricle on the sagittal plane. The edge of the auricle may at least include an outer contour of the helix, a contour of the earlobe, a contour of a tragus, an intertragic notch, an antitragus tip, a notch between an antitragus and the antihelix, etc. Therefore, in the present disclosure, descriptions such as “worn by the user”, “in the wearing state” and “in wearing” refer to that the acoustic device described in the present disclosure is worn on the ear of the simulator. Of course, considering the individual differences of different users, the structure, shape, size, thickness, etc. of one or more parts of the ear 100 may be differentiated according to ears of different shapes and sizes. These differentiated designs may be expressed as that feature parameters of one or more parts (e.g., the sound production component, the ear hook, etc. hereinafter) of the acoustic device may have different ranges of values, to adapt to different ears.

It should be noted that in the field of medicine, anatomy, etc., three basic sections including a sagittal plane, a coronal plane, and a horizontal plane of the human body may be defined, respectively, and three basic axes including a sagittal axis, a coronal axis, and a vertical axis may also be defined. The sagittal plane refers to a section perpendicular to the ground along the front and rear directions of the body, which divides the human body into left and right parts. The coronal plane refers to a section perpendicular to the ground along the left and right directions of the body, which divides the human body into front and rear parts. The horizontal plane refers to a section parallel to the ground along a vertical direction of the body, which divides the human body into upper and lower parts. Correspondingly, the sagittal axis refers to an axis along a front-back direction of the body and perpendicular to the coronal plane, the coronal axis refers to an axis along a left-right direction of the body and perpendicular to the sagittal plane, and the vertical axis refers to an axis along a vertical direction of the body and perpendicular to the horizontal plane. Further, the front side of the ear in the present disclosure refers to a side of the ear facing the facial region of the human body along the sagittal axis direction. A schematic diagram illustrating a front contour of the ear as shown in FIG. 1 may be obtained by observing the ear of the simulator along the coronal axis direction of the human body.

The above description of the ear 100 is for illustration purposes only and is not intended to limit the scope of the present disclosure. Those skilled in the art can make various variations and modifications based on the description of the present disclosure. For example, part of the structure of the acoustic device may cover part or all of the external ear canal 101. These variations and modifications are still within the protection scope of the present disclosure.

Figure 2:
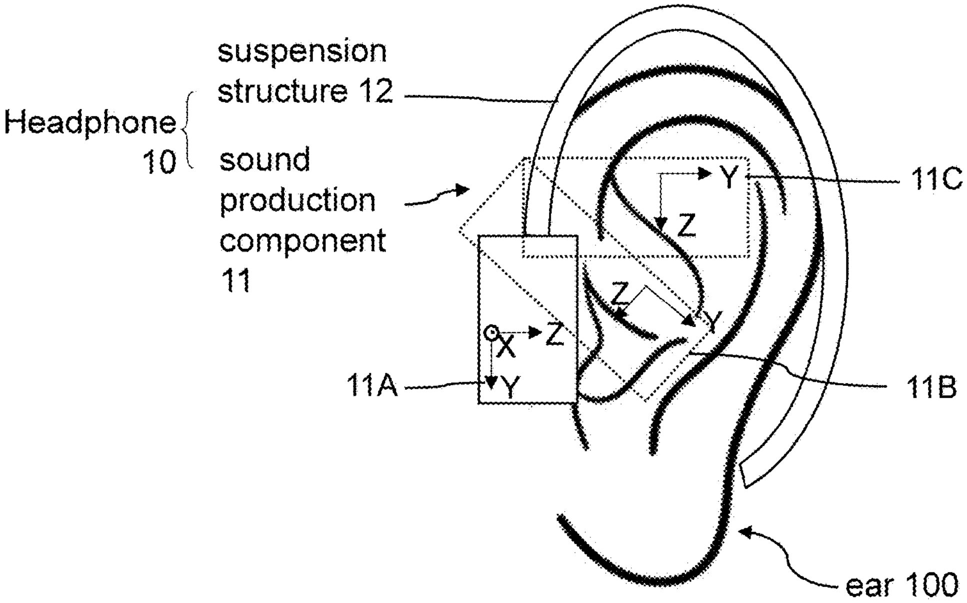
FIG. 2 is a schematic diagram illustrating an exemplary wearing state of a headphone according to some embodiments of the present disclosure.

FIG. 2 is a schematic diagram illustrating an exemplary wearing state of a headphone according to some embodiments of the present disclosure. As shown in FIG. 2, the headphone 10 may include a sound production component 11 and a suspension structure 12. In some embodiments, the headphone 10 may enable the sound production component 11 to be worn on a user’s body (e.g., the head, neck, or upper torso of the body) through the suspension structure 12. In some embodiments, the suspension structure 12 may be an ear hook. The sound production component 11 may be connected to one end of the ear hook. The ear hook may be set in a shape suitable for the ear of the user. For example, the ear hook may be in an arc structure. In some embodiments, the suspension structure 12 may also be a clamping structure adapted to the auricle of the user, to enable the suspension structure 12 to clamp the auricle of the user. In some embodiments, the suspension structure 12 may include but not limited to the ear hook, an elastic band, etc., so that the headphone 10 may be better hung on the user, thereby preventing the headphone 10 from falling when used by the user.

In some embodiments, the sound production component 11 may be worn on the user’s body. A loudspeaker may be disposed in the sound production component 11 to produce sound input to the ear 100 of the user. In some embodiments, the headphone 10 may be combined with products such as glasses, a headset, a head-mounted display device, an AR/VR helmet, etc. In this case, the sound production component 11 may be suspended or clamped near the ear 100 of the user. In some embodiments, the sound production component 11 may be circular, elliptical, polygonal (regular or irregular), U-shaped, V-shaped, or semicircular, so that the sound production component 11 may be directly hung on the ear 100 of the user.

Referring to FIG. 1 and FIG. 2, in some embodiments, when the user wears the headphone 10, at least a portion of the sound production component 11 may be located in a region J on a front side of a tragus of the ear 100 of the user or regions M1 and M2 on a front outer side of an auricle in FIG. 1. An exemplary description may be given below in conjunction with different wearing positions of the sound production component (11A, 11B, and 11C). It should be noted that the front outer side of the auricle mentioned in the embodiments of the present disclosure refers to the side of the auricle away from the head along the coronal axis direction, and correspondingly, a rear inner side of the auricle refers to the side of the auricle facing the head along the coronal axis direction. In some embodiments, the sound production component 11A may be located on a side of the ear 100 of the user facing a facial region along a sagittal axis direction, i.e., the sound production component 11A may be located on a human facial region J on a front side of the ear 100. Further, a loudspeaker may be disposed inside a housing of the sound production component 11A. At least one sound guiding hole (not shown in FIG. 2) may be disposed on the housing of the sound production component 11A. The sound guiding hole may be disposed on a sidewall of the housing of the sound production component facing or close to the external ear canal 101 of the user. The loudspeaker may output sound to the external ear canal 101 of the user through the sound guiding hole. In some embodiments, the loudspeaker may include a diaphragm. A cavity inside the housing of the sound production component 11 may be at least divided into a front cavity and a rear cavity by the diaphragm. The sound guiding hole may be acoustically coupled with the front cavity. The diaphragm may vibrate to drive the air in the front cavity to vibrate to produce air-conducted sound. The air-conducted sound produced by the front cavity may be transmitted to the outside through the sound guiding hole. In some embodiments, the housing of the sound production component 11 may further include one or more pressure relief holes. The pressure relief hole may be located on a sidewall of the housing adjacent to or opposite to a sidewall where the sound guiding hole is located. The pressure relief hole may be acoustically coupled with the rear cavity. When the diaphragm vibrates, the vibration may also drive the air in the rear cavity to vibrate to produce air-conducted sound. The air-conducted sound produced by the rear cavity may be transmitted to the outside through the pressure relief hole. For example, in some embodiments, the loudspeaker in the sound production component 11A may output sounds with a phase difference (e.g., anti-phase) through the sound guiding hole and the pressure relief hole. The sound guiding hole may be located on a sidewall of the housing of the sound production component 11A facing the external ear canal 101 of the user, and the pressure relief hole may be located on a sidewall of the housing of the sound production component 11 away from the external ear canal 101 of the user. At this time, the housing may act as a baffle, increasing a difference between a sound path from the sound guiding hole to the external ear canal 101 a sound path from the pressure relief hole to the external ear canal 101, thereby increasing a sound intensity at the external ear canal 101 while reducing the volume of far-field leakage. In some embodiments, the sound production component 11 may have a long axis direction Y and a short axis direction Z which are perpendicular to a thickness direction X and orthogonal to each other. The long axis direction Y may be defined as a direction (e.g., when a projection shape is a rectangle or an approximate rectangle, the long axis direction may be a length direction of the rectangle or the approximate rectangle) with a maximum extension size in a shape of a two-dimensional projection plane (e.g., a projection of the sound production component 11 on a plane where an outer surface of the sound production component is located, or a projection of the sound production component 11 on the sagittal plane) of the sound production component 11. The short axis direction Z may be defined as a direction (e.g., when a projection shape is a rectangle or an approximate rectangle, the short axis direction may be a width direction of the rectangle or the approximate rectangle) in a shape of a projection of the sound production component 11 on the sagittal plane perpendicular to the long axis direction Y. The thickness direction X may be defined as a direction perpendicular to the two-dimensional projection plane, e.g., which is consistent with the coronal axis direction, both pointing to the left and right directions of the body. In some embodiments, when the sound production component 11 is in a tilted state when worn, the long axis direction Y and the short axis direction Z may still be parallel or approximately parallel to the sagittal plane. A certain included angle may be formed between the long axis direction Y and the sagittal axis direction, i.e., the long axis direction Y may also be tilted accordingly. A certain included angle may be formed between the short axis direction Z and the vertical axis direction, i.e., the short axis direction Z may also be tilted, as shown in the wearing state of the sound production component of FIG. 2. In some embodiments, the whole or a portion of the structure of the sound production component 11B may extend into a concha cavity 102, i.e., a projection of the sound production component 11B on the sagittal plane and a projection of the concha cavity 102 on the sagittal plane may have an overlapping part. The specific description regarding the sound production component 11B may be found elsewhere in the present disclosure (e.g., FIG. 3 and corresponding content thereof). In some embodiments, the sound production component 11 may also be in a horizontal state or approximately horizontal state in the wearing state, as shown in the sound production component 11C of FIG. 2. The long axis direction Y may be consistent or approximately consistent with the sagittal axis direction, both pointing to the front-back direction of the body. The short axis direction Z may be consistent or approximately consistent with the vertical axis direction, both pointing to an up-down direction of the body. It should be noted that in the wearing state, the sound production component 11C in the approximately horizontal state may mean that an included angle between the long axis direction Y of the sound production component 11C shown in FIG. 2 and the sagittal axis may be within a specific range (e.g., not greater than 20°). In addition, the wearing position of the sound production component may not be limited to the sound production component 11A, the sound production component 11B, and the sound production component 11C in FIG. 2. The wearing position of the sound production component 11 may meet the region J, the region M1, or the M2 in FIG. 1. For example, the whole or a portion of the structure of the sound production component 11 may be located in the region J enclosed by the dotted lines in FIG. 1. As another example, the whole or a portion of the structure of the sound production component may be in contact with positions of one or more parts of the ear 100 such as the crus of helix 109, the cymba conchae 103, the triangular fossa 104, the antihelix 105, the scapha 106, and the helix 107. As another example, the whole or a portion of the structure of the sound production component 11 may be located in a cavity (e.g., the region M1 enclosed by the dotted lines in FIG. 1 that includes at least the cymba conchae 103 and the triangular fossa 104, and the region M2 enclosed by the dotted lines in FIG. 1 that includes at least the concha cavity 102) formed by one or more parts of the ear 100 (e.g., the concha cavity 102, the cymba conchae 103, the triangular fossa 104, etc.).

In order to improve the stability of the headphone 10 in the wearing state and ensure a certain clamping force between the headphone 10 and the auricle of the user to increase a listening volume of the headphone near the ear canal of the user, thereby enhancing a listening effect, the headphone 10 may adopt any one or a combination of the following manners. First, at least part of the suspension structure 12 may be configured as a profiling structure that fits at least one of the rear inner side of the auricle and the head, which increases a contact area between the suspension structure 12 and the ear and/or the head to ensure a certain clamping force between the headphone 10 and the auricle of the user, thereby increasing the resistance preventing the acoustic device 10 from falling off from the ear. Second, at least part of the suspension structure 12 may be set as an elastic structure, so that the suspension structure 12 may have a certain amount of deformation in the wearing state, which increases the positive pressure of the suspension structure 12 on the ear and/or the head to ensure a certain clamping force between the headphone 10 and the auricle of the user, thereby increasing the resistance preventing the acoustic device 10 from falling off from the ear. Third, at least part of the suspension structure 12 may be set to lean against the ear and/or the head in the wearing state, to form a reaction force that presses the ear and makes the sound production component 11 press against the front outer side (e.g., the regions M1 and M2 shown in FIG. 1) of the auricle to ensure a certain clamping force between the headphone 10 and the auricle of the user, thereby increasing the resistance preventing the acoustic device 10 from falling off from the ear. Fourth, the sound production component 11 and the suspension structure 12 may be set to clamp the antihelix region, a region of the concha cavity, etc. from the front outer side and the rear inner side of the auricle in the wearing state to ensure a certain clamping force between the headphone 10 and the auricle of the user, thereby increasing the resistance preventing the acoustic device 10 from falling off from the ear. Fifth, the sound production component 11 or a structure connected thereto may be arranged to at least partially extend into cavities such as the concha cavity 102, the cymba conchae 103, the triangular fossa 104, and the scapha 106 to ensure a certain clamping force between the headphone 10 and the auricle of the user, thereby increasing the resistance preventing the acoustic device 10 from falling off from the ear.

Figure 3:
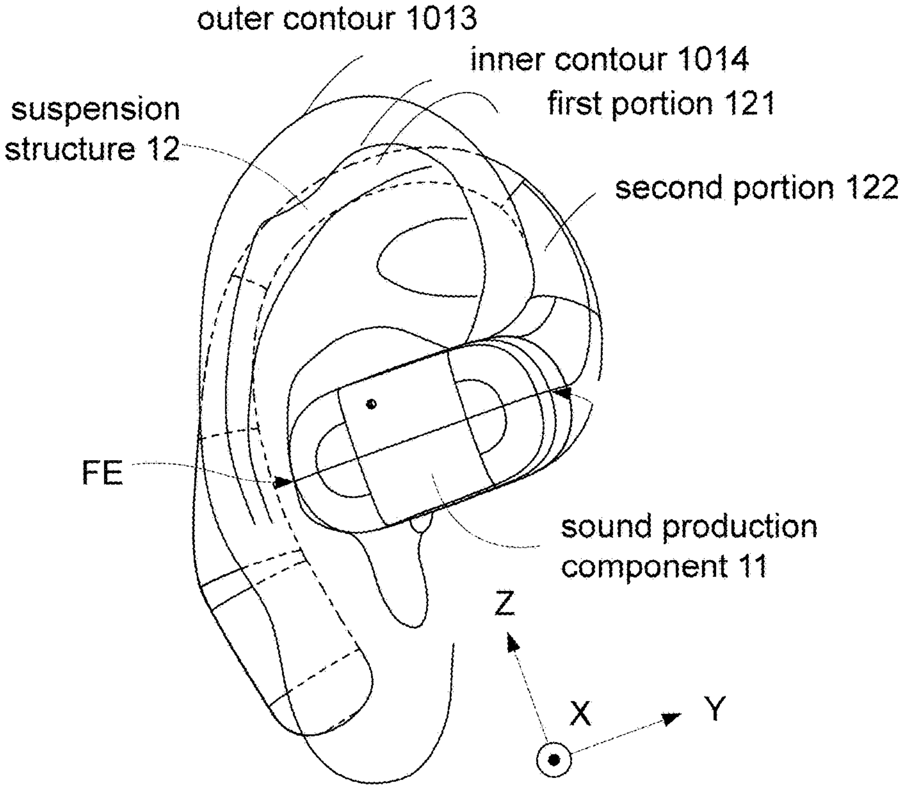
FIG. 3 is a schematic diagram illustrating a wearing state in which a sound production component of a headphone extends into a concha cavity according to some embodiments of the present disclosure.

For example, referring to FIG. 3, in the wearing state, an end FE (also referred to as a free end) of the sound production component 11 may extend into the concha cavity 102. Optionally, the sound production component 11 and the suspension structure 12 may be configured to clamp the ear region from the front and rear sides of the ear region corresponding to the concha cavity 102, thereby increasing the resistance preventing the acoustic device 10 from falling off from the ear, and further improving the stability of the headphone 10 in the wearing state. For example, the end FE of the sound production component may be pressed in the concha cavity 102 in the thickness direction X. As another example, the end FE may abut against the concha cavity 102 (e.g., which abuts against an inner wall of the concha cavity 102 facing the end FE) in the long axis direction Y and/or the short axis direction Z. It should be noted that the end FE of the sound production component 11 refers to an end of the sound production component 11 opposite to a fixed end connected to the suspension structure 12, which is also referred to as the free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the fixed end connected to the suspension structure 12 in the sound production component 11. As another example, when the sound production component 11 is a sphere, an ellipsoid, or an irregular structure, the end FE of the sound production component 11 may be a specific region away from the fixed end obtained by cutting the sound production component 11 along a Y-Z plane (a plane formed by the short axis direction Z and the thickness direction X). A ratio of a size of the specific region along the long axis direction Y to the size of the sound production component along the long axis direction Y may be within a range of 0.05-0.2.

By clamping the first portion of the sound production component 11 and the ear hook to the auricle in the wearing state and by extending a portion of the sound production component 11 into the concha cavity 102, a suitable clamping force may be provided between the headphone and the user's ear, the listening volume at a listening position (e.g., at the mouth of the ear canal), especially in the low and mid frequencies, may be increased, and a relatively good phase canceling effect for far-field leakage may be maintained. Merely by way of example, when the whole or a portion of the structure of the sound production component 11 extends into the concha cavity 102, the sound production component 11 and the concha cavity 102 may form a structure similar to a cavity (hereinafter referred to as a quasi-cavity structure). In the embodiments of the disclosure, the quasi-cavity structure may be understood as a semi-closed structure enclosed by the sidewall of the sound production component 11 and the concha cavity 102. The semi-closed structure may make the listening position (e.g., the opening of the ear canal) not completely sealed off from the external environment, but have a leakage structure (e.g., an opening, a gap, a tube, etc.) in acoustic communication with the external environment. When the user wears the headphone 10, one or more sound guiding holes may be disposed on a side of the housing of the sound production component 11 near or facing the ear canal of the user. One or more pressure relief holes may be disposed on the other sidewalls (e.g., sidewalls away from the ear canal of the user) of the housing of the sound production component 11. The sound guiding hole may be acoustically coupled with a front cavity of the headphone 10, and the pressure relief hole may be acoustically coupled with a rear cavity of the headphone 10. Taking the sound production component 11 including one sound guiding hole and one pressure relief hole as an example, the sound output from the sound guiding hole and the sound output from the pressure relief hole may be approximately regarded as two sound sources. Sound phases of the two sound sources may be opposite to form a dipole. The sound production component 11 and corresponding inner walls of the concha cavity 102 may form the quasi-cavity structure, wherein the sound source corresponding to the sound guiding hole may be located in the quasi-cavity structure, and the sound source corresponding to the pressure relief hole may be located outside the quasi-cavity structure, forming an acoustic model shown in FIG. 4. As shown in FIG. 4, the quasi-cavity structure 402 may include a listening position and at least one sound source 401A. The "include" here may mean that at least one of the listening position and the sound source 401A is located inside the quasi-cavity structure 402, and may also mean that at least one of the listening position and the sound source 401A is located at an inner edge of the quasi-cavity structure 402. The listening position may be equivalent to the opening of the ear canal, an acoustic reference point of the ear, such as ERP, DRP, etc., or an entrance structure leading to the listener, etc. The sound source 401B may be located outside the quasi-cavity structure 402. The sound sources 401A and 401B with anti-phases may form a dipole. The dipole may respectively radiate sound to the surrounding space and produce the phenomenon of interference and cancellation of sound waves, thereby realizing the effect of sound leakage cancellation. As the sound path difference between the two sounds is relatively large at the listening position, the effect of sound cancellation may be relatively insignificant, and a relatively large sound may be heard at the listening position than at other positions. Specifically, as the sound source 401A is surrounded by the quasi-cavity structure 402, most of the sound radiated from the sound source 401A may reach the listening position through direct radiation or reflection. In contrast, most of the sound radiated from the sound source 401A may not reach the listening position without the quasi-cavity structure 402. Therefore, the arrangement of the quasi-cavity structure 402 may significantly increase the sound volume reaching the listening position. Meanwhile, only a small part of anti-phase sound radiated from an anti-phase sound source 401B outside the quasi-cavity structure 402 may enter the quasi-cavity structure 402 through the leakage structure 403 of the quasi-cavity structure 402. This may be equivalent to generating a secondary sound source 401B' at the leakage structure 403, of which the intensity may be significantly smaller than the sound source 401B and also be significantly smaller than the sound source 401A. The sound produced by the secondary sound source 401B' may have a weak effect of anti-phase cancellation on the sound source 401A in the cavity, which may significantly increase the listening volume at the listening position. For sound leakage, the sound source 401A may radiate sound to the outside through the leakage structure 402 of the cavity, which may be equivalent to generating the secondary sound source 401A' at the leakage structure 402. As almost all the sound radiated by the sound source 401A comes from the leakage structure 403, and a scale of the quasi-cavity structure 402 is much smaller than the spatial scale of evaluating sound leakage (the difference is at least one order of magnitude), it may be considered that the intensity of the secondary sound source 401A' may be equivalent to that of the sound source 401A. For the external space, the effect of sound cancellation produced by the secondary sound source 401A' and the sound source 401B may be equivalent to the sound cancellation effect produced by the sound source 401A and the sound source 401B. That is to say, a considerable sound leakage reduction effect may still be maintained under the quasi-cavity structure.

In a specific application scenario, the outer wall of the housing of the sound production component 11 may usually be a plane or a curved surface, while the contour of the concha cavity 102 of the user may be an uneven structure. By extending a portion or the whole structure of the sound production component 11 into the concha cavity 102, the sound production component 11 and the contour of the concha cavity 102 may form the quasi-cavity structure that communicates with the outside world. Further, the sound guiding hole may be arranged at a position on the housing of the sound production component facing the opening of ear canal of the user and near the edge of the concha cavity 102, and the pressure relief hole may be arranged at the position on the sound production component 11 deviating from or away from the opening of the ear canal, to construct the acoustic model shown in FIG. 4, thereby improving the listening volume at the opening of the ear canal when wearing the headphone, and reducing the far-field leakage effect.

Figure 5A:
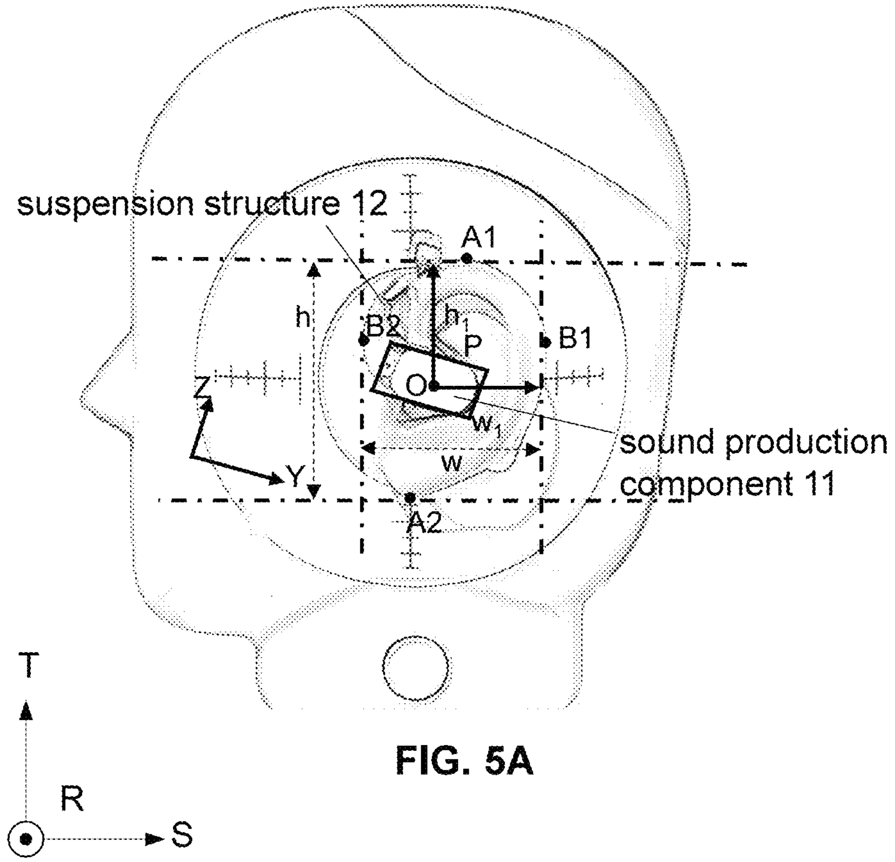
FIG. 5A is a schematic diagram illustrating an exemplary wearing state of a headphone according to some embodiments of the present disclosure.

FIG. 5A is a schematic diagram illustrating an exemplary wearing state of a headphone according to some embodiments of the present disclosure. In some embodiments, a headphone may include a transducer and a housing for containing the transducer. The transducer may be an element capable of receiving an electrical signal and converting the electrical signal into a sound signal for output. In some embodiments, according to frequency, transducer types may include low frequency (e.g., 30 Hz-150 Hz) loudspeakers, medium and low frequency (e.g., 150 Hz-500 Hz) loudspeakers, medium and high frequency (e.g., 500 Hz-5 kHz) loudspeakers, high frequency (e.g., 5 kHz-16 kHz) loudspeakers, or full range (e.g., 30 Hz-16 kHz) loudspeakers, or any combination thereof. The low frequency, high frequency, etc. mentioned here may only represent an approximate range of the frequency, and in different application scenarios, there may be different division methods. For example, a frequency division point may be determined, the low frequency may represent a frequency range below the frequency division point, and the high frequency may represent a frequency range above the frequency division point. The frequency division point may be any value within an audible range of the human ear, e.g., 500 Hz, 600 Hz, 700 Hz, 800 Hz, 1000 Hz, or the like.

In some embodiments, the transducer may include a diaphragm. When the diaphragm vibrates, the sound may be emitted from the front and rear sides of the diaphragm, respectively. In some embodiments, a front cavity (not shown) for sound transmission may be disposed at the front side of the diaphragm in the housing 120. The front cavity may be acoustically coupled with the sound guiding hole, and the sound from the front side of the diaphragm may be emitted from the sound guiding hole through the front cavity. A rear cavity (not shown) for sound transmission may be disposed at the rear side of the diaphragm in the housing 120. The rear cavity may be acoustically coupled with the pressure relief hole, and the sound from the rear side of the diaphragm may be emitted from the pressure relief hole through the rear cavity.

Referring to FIG. 3, an example of the suspension structure 12 is illustrated here with an ear hook. In some embodiments, the ear hook may include a first portion 121 and a second portion 122 connected in sequence. The first portion 121 may be configured to be hung between the rear outer side of the auricle of the user and the head of the user, and the second portion may extend toward a front outer side (a side of the auricle away from the head along the coronal axis) of the auricle, connect the sound production component 11, and is configured to place the sound production component at a position close to the ear canal without blocking an opening of the ear canal. In some embodiments, the sound guiding hole may be disposed on the sidewall of the housing of the sound production component 11 facing the auricle, and the sound produced by the transducer may be exported out of the housing and transmitted to the opening of the ear canal of the user.

Figure 6:
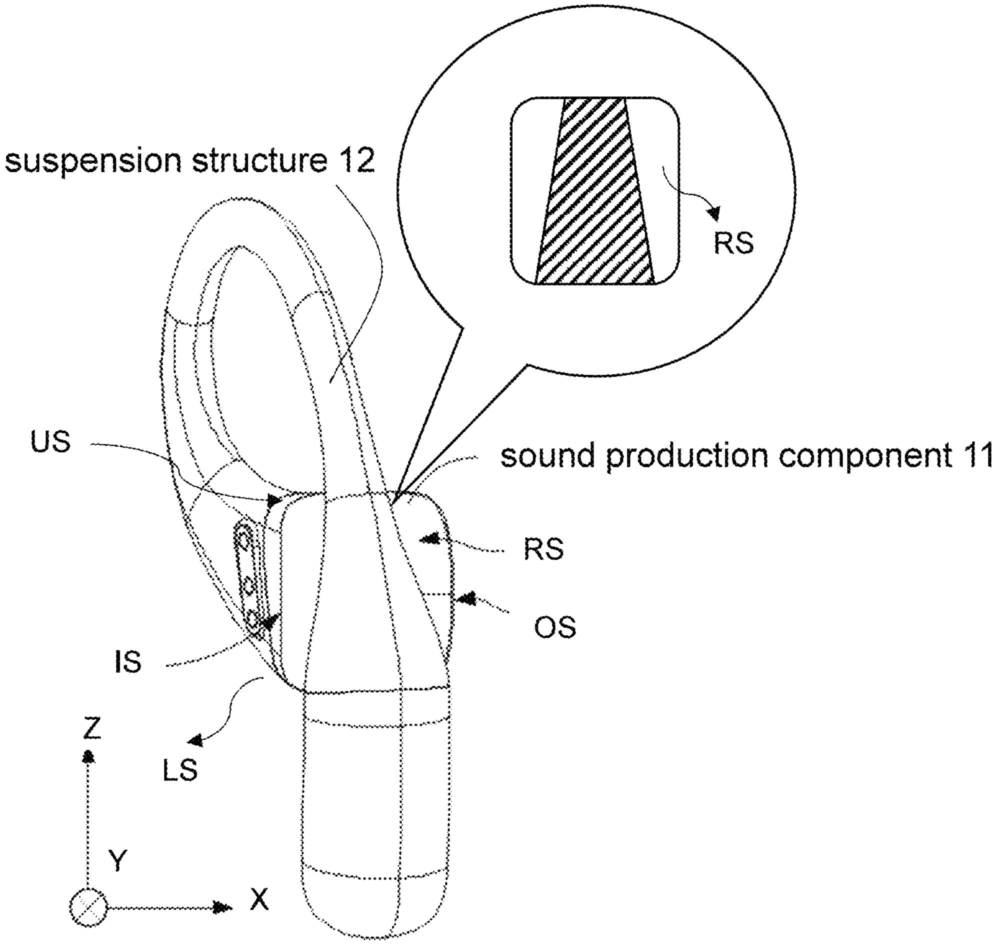
FIG. 6 is a schematic diagram illustrating another exemplary structure of the headphone illustrated in FIG. 3.

FIG. 6 is a schematic diagram illustrating another exemplary structure of a headphone illustrated in FIG. 3. Referring to FIG. 3 and FIG. 4, in some embodiments, the sound production component 11 may include a transducer and a housing accommodating the transducer. The housing may include an inner side IS facing the ear 100 and an outer side OS away from the ear 100 along the thickness direction X in a wearing state. The housing may also include a connection surface connecting the inner side IS and the outer side OS. It should be noted that in the wearing state, when viewed along a direction of the coronal axis (i.e., the thickness direction X), the sound production component 11 may be provided in a shape of a circle, an oval, a rounded square, a rounded rectangle, etc. When the sound production component 11 is provided in the shape of a circle, an ellipse, etc., the connection surface refers to an arc-shaped side of the sound production component 11. When the sound production component 11 is provided in the shape of a rounded square, a rounded rectangle, etc., the connection surface may include a lower side LS, an upper side US, and a rear side RS as mentioned later. Therefore, for case of description, this embodiment is exemplarily illustrated with the sound production component 11 set in a rounded rectangle. The length of the sound production component 11 in the long axis direction Y may be greater than the width of the sound production component 11 in the short axis direction Z. As shown in FIG. 6, the sound production component 11 may have the upper side US away from the external ear canal 101 and the lower side LS facing the external ear canal 101 along the short axis direction Z in the wearing state, and also have the rear side RS connecting the upper side US and the lower side LS. The rear side RS may be located at an end of the long axis direction Y facing the back of the head in the wearing state, and at least partially located in the concha cavity 102.

Referring to FIG. 3 and FIG. 5A, in some embodiments, when the user wears the headphone 10, the sound production component 11 may have a first projection on a sagittal plane (i.e., a plane formed by a T-axis and an S-axis in FIG. 5A) along a coronal axis direction R. A shape of the sound production component 11 may be a regular or irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be the irregular shape, for the convenience of describing the first projection, a rectangular region shown in a solid line box P may be delineated around the projection (i.e., the first projection) of the sound production component 11 in FIG. 5A, and a centroid O of the rectangular region shown by the solid line box P may be approximately regarded as the centroid of the first projection. It should be noted that the above description of the first projection and the centroid thereof is only an example, and the shape of the first projection is related to the shape of the sound production component 11 or the wearing condition relative to the ear. The auricle may have a second projection on the sagittal plane along the coronal axis direction R. In some embodiments, in order to make the whole or a portion of the structure of the sound production component 11 to be inserted into the concha cavity 102, such as a position of the sound production component 11B relative to the ear as illustrated in FIG. 2, a ratio of a distance h1 (also referred to as a first distance) between the centroid O of the first projection and a highest point of the second projection in a vertical axis direction (e.g., the T-axis direction in FIG. 5A) to a height h of the second projection in the vertical axis direction may be within a range of 0.35-0.6. A ratio of a distance w1 (also referred to as a second distance) between the centroid O of the first projection and an end point of the second projection in the sagittal axis direction (e.g., the S-axis direction in FIG. 5A) to a width w of the second projection in the sagittal axis direction may be within a range of 0.4-0.65. Some embodiments of the present disclosure provide the headphone, by controlling the ratio of the distance h1 between the centroid O of the first projection and the highest point of the second projection in the vertical axis direction to the height h of the second projection in the vertical axis direction to be within a range of 0.35-0.6, and controlling the ratio of the distance w1 between the centroid O of the first projection and the end point of the second projection in the sagittal axis direction to the width w of the second projection in the sagittal axis direction to be within a range of 0.4-0.65, at least a portion of the sound production component 11 may extend into the concha cavity 102 and an acoustic model shown in FIG. 4 may be formed with the concha cavity 102 of the user. Thus, a listening volume at a listening position (e.g., at an opening of the ear canal) of the headphone, especially the listening volume at the middle and low frequencies, may be improved, while still maintaining a good far-field sound leakage cancellation effect. When the whole or the portion of the sound production component 11 extends into the concha cavity 102, the sound guiding hole may be closer to the opening of the ear canal, further increasing the listening volume at the opening of the ear canal. In addition, the concha cavity 102 may support and limit the sound production component 11 to improve the stability of the headphone in the wearing state.

In some embodiments, the sound production component 11 and the suspension structure 12 may be two independent structures or an integrated structure. In order to describe the first projection region of the sound production component more clearly, the thickness direction X, the long axis direction Y, and the short axis direction Z may be introduced according to a three-dimensional structure of the sound production component 11. The long axis direction Y may be perpendicular to the short axis direction Z, and the thickness direction X may be perpendicular to a plane formed by the long axis direction Y and the short axis direction Z. Merely by way of example, the confirmation process of the solid line box P may be as follows. Two farthest points of the sound production component 1 in the long axis direction Y may be determined, and a first line segment and a second line segment parallel to the short axis direction Z through the two farthest points may be drawn, respectively. Two farthest points of the sound production component 11 in the short axis direction Z may be determined, a third line segment and a fourth line segment parallel to the long axis direction Y through the two farthest points may be drawn, and the rectangular region of the solid line box P in FIG. 5A and FIG. 5B may be obtained by a region formed by the above line segments.

The highest point of the second projection may be understood as a point with a largest distance in the vertical axis direction relative to a projection of a certain point on the neck of the user on the sagittal plane among all the projection points, i.e., a projection of the highest point of the auricle (e.g., point A1 in FIG. 5A) on the sagittal plane may be the highest point of the second projection. A lowest point of the second projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 5A) on the sagittal plane may be the lowest point of the second projection. A height of the second projection in the vertical axis direction may be a distance (height h shown in FIG. 5A) between the point with the largest distance and the point with the smallest distance in the vertical axis direction relative to the projection of a certain point of the neck of the user on the sagittal plane among all the projection points in the second projection, i.e., the distance between point A1 and point A2 in the vertical axis direction T. The end point of the second projection may be understood as a point with the largest distance in the sagittal axis direction relative to the projection of the nose tip of the user on the sagittal plane among all the projection points, i.e., the projection of the end point of the auricle (e.g., point B1 in FIG. 5A) on the sagittal plane may be the end point of the second projection. The front end point of the second projection may be understood as a point with the smallest distance in the sagittal axis direction relative to the projection of the nose tip of the user on the sagittal plane among all projection points, i.e., the projection of the front end point of the auricle (e.g., point B2 shown in FIG. 5) on the sagittal plane may be the front end point of the second projection. The width of the second projection in the sagittal axis direction may be a distance (the width w shown in FIG. 5A) between the point with the largest distance and the point with the smallest distance along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

It should also be noted that an area of the first projection of the sound production component 11 on the sagittal plane may be generally much smaller than an area of a projection of the auricle on the sagittal plane, to ensure that the opening of the ear canal of the user may not be blocked when the user wears the headphone 10, and the load on the user when wearing the headphone may be reduced, which is convenient for the user to carry daily. On this premise, in the wearing state, when a ratio of the distance h1 between the centroid O of the projection (the first projection) of the sound production component 11 on the sagittal plane and the projection (the highest point of the second projection) of the highest point A1 of the auricle on the sagittal plane in the vertical axis direction to the height h of the second projection in the vertical axis direction is too small or too large, a portion of the structure of the sound production component 11 may be located above the top of the auricle or at the earlobe of the user, which may be impossible to use the auricle to sufficiently support and limit the sound production component 11, and there may be a problem that the wearing is unstable and easy to fall off. On the other hand, it may also cause the sound guiding hole set on the sound production component 11 to be away from the opening of the ear canal, affecting the listening volume at the opening of the ear canal of the user. In order to ensure that the headphone does not block the opening of the ear canal of the user and ensure the stability and comfort of the user wearing the headphone and a good listening effect, in some embodiments, the ratio of the distance h1 between the centroid O of the first projection and the highest point A1 of the second projection in the vertical axis direction to the height h of the second projection in the vertical axis direction may be controlled to be within a range of 0.35-0.6. Therefore, when a portion or the whole structure of the sound production component extends into the concha cavity 102, to a certain extent, the force exerted by the concha cavity 102 on the sound production component 11 may support and limit the sound production component 11 to ensure an appropriate clamping force between the headphone 10 and the ear 100 of the user, thereby improving the wearing stability and comfort of the headphone. Meanwhile, the sound production component 11 may also form the acoustic model shown in FIG. 4 with the concha cavity 102, to ensure the listening volume of the user at the listening position (e.g., the opening of the ear canal) and reduce the far-field leakage volume. In some embodiments, the ratio of the distance h1 (also referred to as the first distance) between the centroid O of the first projection and the highest point A1 of the second projection in the vertical axis direction to the height h of the second projection in the vertical axis direction may be controlled to be within a range of 0.35-0.55. In some embodiments, the ratio of the distance h1 between the centroid O of the first projection and the highest point of the second projection in the vertical axis direction to the height h of the second projection in the vertical axis direction may be controlled to be within a range of 0.4-0.5.

Similarly, when the ratio of the distance w1 between the centroid O of the first projection and the end point of the second projection in the sagittal axis direction to the width w of the second projection in the sagittal axis direction is too large or too small, the part of whole structure of the sound production component 11 may be located in a facial region on the front side of the ear, or extend out of the outer contour of the auricle, which may also cause the problem that the sound production component 11 cannot construct the acoustic model in FIG. 4 with the concha cavity 102, and also lead to unstable wearing of the headphone 10. According to the headphone provided in the embodiments of the present disclosure, the ratio of the distance w1 (also referred to as the second distance) between the centroid O of the first projection and the end point of the second projection in the sagittal axis direction to the width w of the second projection in the sagittal axis direction may be controlled to be within a range of 0.4-0.7, thereby improving the wearing stability and comfort of the headphone while ensuring the acoustic output effect of the sound production component. In some embodiments, the ratio of the distance w1 between the centroid O of the first projection and the end point of the second projection in the sagittal axis direction to the width w of the second projection in the sagittal axis direction may be controlled to be within a range of 0.45-0.68. In some embodiments, the ratio of the distance w1 between the centroid O of the first projection and the end point of the second projection in the sagittal axis direction to the width w of the second projection in the sagittal axis direction may be controlled to be within a range of 0.5-0.6.

For example, the height h of the second projection in the vertical axis direction may be within a range of 55 mm-65 mm. In the wearing state, if the distance h1 between the centroid O of the first projection and the highest point of the second projection in the vertical axis direction is less than 15 mm or greater than 50 mm, the sound production component 11 may be located away from the concha cavity 102, which not only fails to construct the acoustic model in FIG. 4 but also leads to the problem of unstable wearing. Therefore, to ensure the acoustic output effect of the sound production component and the wearing stability of the headphone, the distance h1 between the centroid O of the first projection and the highest point of the second projection in the vertical axis direction may be controlled to be within a range of 15 mm-50 mm. Similarly, in some embodiments, the width of the second projection in the sagittal axis direction may be within a range of 40 mm-55 mm. When the distance between the centroid O of the first projection and the end point of the second projection in the sagittal axis direction is greater than 45 mm or less than 15 mm, the sound production component 11 may be too forward or too backward relative to the ear of the user, causing that the sound production component 11 may not construct the acoustic model in FIG. 4 and the unstable wearing of the headphone 10. Therefore, to ensure the acoustic output effect of the sound production component 11 and the wearing stability of the headphone 10, the distance between the centroid O of the first projection and the end point of the second projection in the sagittal axis direction may be controlled to be within a range of 15 mm-45 mm.

Figure 7:
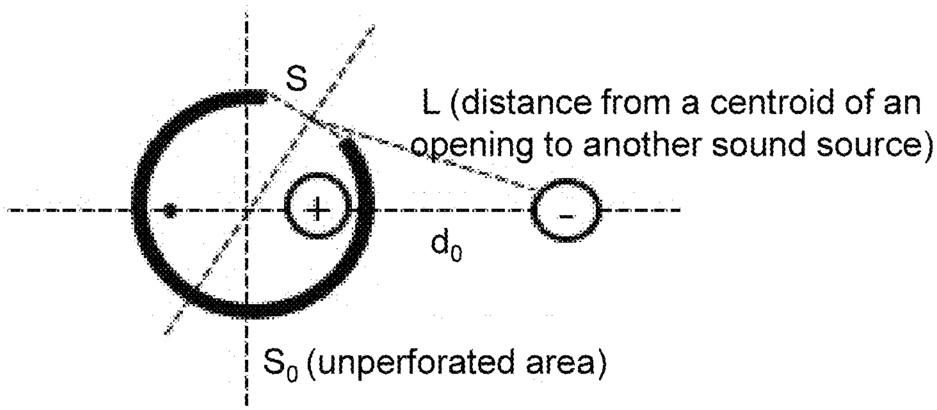
FIG. 7 is a schematic diagram illustrating a quasi-cavity structure according to some embodiments of the present disclosure.
Figure 8:
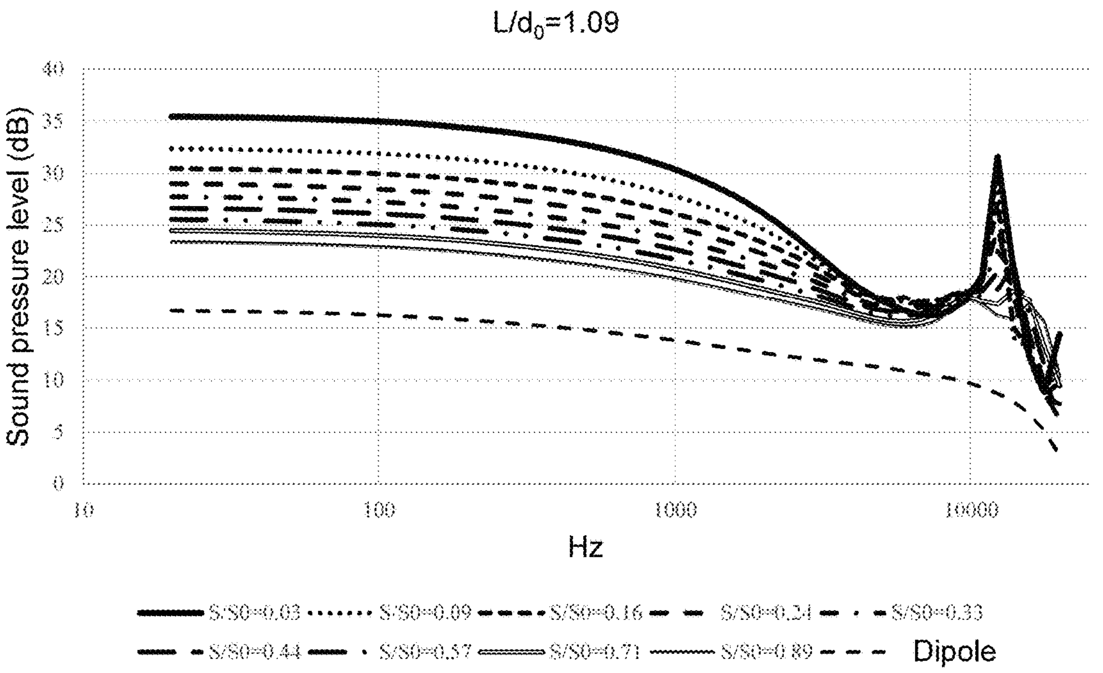
FIG. 8 is a graph illustrating listening index curves of quasi-cavity structures with leakage structures of different sizes according to some embodiments of the present disclosure.

As mentioned above, when the user wears the headphone 10, at least a portion of the sound production component 11 may extend into the concha cavity of the user to form the acoustic model in FIG. 4. The outer wall surface of the housing of the sound production component 11 may usually be the plane or the curved plane, and the contour of the concha cavity 102 of the user may be the uneven structure. When the portion or whole structure of the sound production component 11 extends into the concha cavity 102, a gap may be formed as the sound production component 11 cannot closely fit with the concha cavity 102. The gap may correspond to the leakage structure 403 in FIG. 4. FIG. 7 is a schematic diagram illustrating a quasi-cavity structure according to some embodiments of the present disclosure. FIG. 8 is a graph illustrating listening index curves of quasi-cavity structures with leakage structures of different sizes according to some embodiments of the present disclosure. As shown in FIG. 6, an opening area of a leakage structure on a quasi-cavity structure may be represented as S, and an area of the quasi-cavity structure directly affected by a contained sound source (e.g., "+" shown in FIG. 7) may be represented as S0. The "directly affected" here means that the sound emitted by the contained sound source may directly acoustically act on a wall of the quasi-cavity structure without passing through the leakage structure. A distance between two sound sources is d0, and a distance from a center of an opening shape of the leakage structure to another sound source (e.g., "−" in FIG. 7) is L. As shown in FIG. 8, keeping L/d0=1.09 constant, the larger the relative opening size S/S0, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, a relative position of the sound production component 11 and an ear canal of a user (e.g., the concha cavity 102) may affect a size of a gap formed between the sound production component 11 and the concha cavity 102. For example, when the end FE of the sound production component 11 abuts against the concha cavity 102, the size of the gap may be relatively small. When the end FE of the sound production component 11 does not abut against the concha cavity 102, the size of the gap may be relatively large. The gap formed between the sound production component 11 and the concha cavity 102 may be referred to as the leakage structure in an acoustic model in FIG. 4. The relative position of the sound production component 11 and the ear canal of the user (e.g., concha cavity 102) may affect a count of the leakage structure of the quasi-cavity structure formed by the sound production component 11 and the concha cavity 102 and the opening size of the leakage structure, and the opening size of the leakage structure may directly affect the listening quality. Specifically, the larger the opening of the leakage structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the concha cavity 102 of the user. Correspondingly, the ratio of the distance h1 between the centroid O of the first projection and the highest point of the second projection in the vertical axis direction to the height h of the second projection in the vertical axis direction may be controlled to be within a range of 0.35-0.6, while the ratio of the distance w1 between the centroid O of the first projection and the end point of the second projection in the sagittal axis direction to the width w of the second projection in the sagittal axis direction may be controlled to be within a range of 0.4-0.65. In some embodiments, in order to improve the wearing comfort of the headphone while ensuring the acoustic output quality of the sound production component 11, the ratio of the distance h1 between the centroid O of the first projection and the highest point of the second projection in the vertical axis direction to the height h of the second projection in the vertical axis direction may be within a range of 0.35-0.55, and the ratio of the distance w1 between the centroid O of the first projection and the end point of the second projection in the sagittal axis direction to the width w of the second projection in the sagittal axis direction may be within a range of 0.45-0.68. In some embodiments, the ratio of the distance h1 between the centroid O of the first projection and the highest point of the second projection in the vertical axis direction to the height h of the second projection in the vertical axis direction may be within a range of 0.35-0.5, and the ratio of the distance w1 between the centroid O of the first projection and the end point of the second projection in the sagittal axis direction to the width w of the second projection in the sagittal axis direction may be within a range of 0.48-0.6.

When the headphone 10 is in a wearing state shown in FIG. 5A, i.e., when the ratio of the distance h1 between the centroid O of the first projection and the highest point of the second projection in the vertical axis direction to the height h of the second projection in the vertical axis direction, and the ratio of the distance w1 between the centroid O of the first projection and the end point of the second projection in the sagittal axis direction w1 to the width w of the second projection in the sagittal axis direction are within the above ranges, a minimum distance between the sound production component 11 and the first portion 121 of the ear hook may reflect a clamping force between the headphone 10 and the ear 100 of the user. If the minimum distance is too small, in the wearing state of the headphone 10, the ear 100 of the user may feel a strong pressure, and a wearing position of the headphone 10 may be difficult to adjust after wearing. Besides, a sidewall of the sound production component 11 may be attached to an upper edge of the concha cavity 102, and the gap between the sidewall of the sound production component 11 and the concha cavity 102 may be too small (or a count of the gap may be too small), resulting in a poor sound leakage reduction effect. To ensure an appropriate clamping force between the headphone 10 and the ear 100 of the user and a near-field listening effect and the leakage reduction effect of the headphone 10, in some embodiments, when the headphone 10 is in the wearing state shown in FIG. 5A, a minimum distance between the sound production component 11 and the first portion 121 of the ear hook also needs to be within a specific range. It should be noted that the minimum distance between the sound production component 11 and the first portion 121 of the ear hook herein refers to a distance between a region of the sound production component 11 clamped to both sides of the ear (i.e., the clamping region) and a region of the first portion 121 of the ear hook (i.e., a region near the ear hook clamping point EP). In some embodiments, for case of description, the minimum distance between the sound production component 11 and the first portion of the ear hook may be understood as a distance between a center CC of the clamping region and the ear hook clamping point EP. Detailed descriptions regarding the ear hook clamping point EP and the center of the clamping region CC may be found elsewhere in the present disclosure, such as in FIG. 13 and related descriptions thereof. In some embodiments, to prevent the clamping force between the headphone 10 and the ear 100 of the user from being too large in the wearing state, causing the sound production component 11 to excessively compress the ear 100 of the user, the minimum distance between the sound production component 11 and the first portion of the ear hook may be no less than 2 mm. In some embodiments, to improve the leakage reduction effect, the minimum distance between the sound production component 11 and the first portion of the ear hook in the wearing state may be no less than 2.5 mm. In this case, the sidewall of the sound production component 11 and the edge of the concha cavity 102 may have a certain gap, ensuring that the gap between the sidewall of the sound production component 11 and the concha cavity 102 is small (or the count of the gap is moderate), and thus improving the sound leakage reduction effect of the headphone 10. In some embodiments, to further increase adjustability after wearing, the minimum distance between the sound production component 11 and the first portion of the ear hook may be no less than 2.8 mm in the wearing state.

In some embodiments, when the ratio of the distance h1 between the centroid O of the first projection and the highest point of the second projection in the vertical axis direction to the height h of the second projection in the vertical axis direction, and the ratio of the distance w1 between the centroid O of the first projection and the end point of the second projection in the sagittal axis direction to the width w of the second projection in the sagittal axis direction is within the above-described ranges, the minimum distance between the sound production component 11 and the first portion 121 of the ear hook may reflect the clamping force of the sound production component 11 and the first portion 121 of the ear hook clamping on the auricle and the wearing position of the sound production component 11. When the clamping force of the sound production component 11 and the first portion 121 of the ear hook clamping on the auricle is excessively small or excessively large in the wearing state, a portion of a structure of the sound production component 11 may be located above a top of the auricle or at an earlobe of the user, which may be impossible to use the auricle to sufficiently support and limit the sound production component 11, and there may be a problem that the wearing is unstable and easy to fall off. Besides, it may also cause a sound guiding hole set on the sound production component 11 to be relatively far away from an opening of the ear canal, affecting the listening volume at the opening of the ear canal of the user. On the other hand, a portion or the whole structure of the sound production component 11 may be located in a facial region on the front side of the ear, or extend out of an outer contour of the auricle, which may also cause the problem that the sound production component 11 cannot construct the acoustic model in FIG. 4 with the concha cavity 102, and also lead to unstable wearing of the headphone 10. Therefore, to ensure the wearing stability and comfort of the headphone as well as a good listening effect while ensuring that the headphone does not block the opening of the ear canal of the user, in some embodiments, the clamping force of the ear hook of the sound production component 11 and the first portion 121 clamping on the auricle may be within a range of 0.03 N-1 N. In some embodiments, in the wearing state, the ear hook 12 may generate the clamping force for driving the sound production component 11 to be close to the first portion of the ear hook, and the clamping force may keep in a specific range. It should be noted that the clamping force refers to a clamping force corresponding to a preset stretching distance measured by a tension meter, and the preset distance may be a distance under a standard wearing condition. The clamping force may also be determined by attaching a force sensor (e.g., a strain gauge) or a force sensor array to both a side of the auricle facing the head and a side of the auricle away from the head, and reading a value of a force of a clamped position of the auricle. For example, if forces are measurable at two points corresponding to the same position on the side of the auricle facing the head and the side of the auricle away from the head, the force (e.g., any of the two forces) may be measured as the clamping force. If the aforementioned clamping force is too small, the ear hook 12 and the sound production component 11 may not be effectively clamped on the front and rear sides of the ear 100 in the wearing state, resulting in poor wearing stability. When the sound production component 11 cannot effectively clamp the concha cavity 102, the gap between the sound production component 11 and the concha cavity 102 may be too large, i.e., an opening of the formed quasi-cavity may be too large, resulting in a smaller listening index. If the aforementioned clamping force is too large, the headphone 10 may exert a strong pressure on the car 100 of the user in the wearing state, making the headphone 10 difficult to adjust the wearing position after wearing. Moreover, if the aforementioned clamping force is too large, a pressure of the sound production component 11 on the concha cavity 102 may be too large, which may increase the tendency of the sound production component 11 to rotate around a clamping fulcrum CP, the clamping region of the sound production component 11 may slide toward a position of the clamping fulcrum CP, and then the sound production component 11 may not be located in an expected position in the concha cavity 102, i.e., the sidewall of the sound production component 11 may be attached to the upper edge of the concha cavity 102, the gap between the sidewall of the sound production component 11 and the concha cavity 102 may be too small (or the count of the gap may be too small), resulting in a poor sound leakage reduction effect. In some embodiments, in order to meet wearing requirements, a value of the clamping force generated by the ear hook 12 to drive the sound production component 11 to be close to the first portion of the ear hook may be within a range of 0.03 N-1 N. In some embodiments, in order to increase the adjustability after wearing, the value of the clamping force generated by the ear hook 12 to drive the sound production component 11 to be close to the first portion of the ear hook may be in a range of 0.05 N-0.8 N. In some embodiments, in order to increase the stability after wearing, the value of the clamping force generated by the ear hook 12 to drive the sound production component 11 to be close to the first portion of the ear hook may be in a range of 0.2 N-0.75 N. In some embodiments, in order to make the headphone have a better listening index in the wearing state, the value of the clamping force generated by the ear hook 12 to drive the sound production component 11 to be close to the first portion of the ear hook may be in a range of 0.3 N-0.7 N. In some embodiments, in order to further improve the sound leakage reduction effect, the value of the clamping force generated by the ear hook 12 to drive the sound production component 11 to be close to the first portion of the ear hook may be in a range of 0.35 N-0.6 N.

In some embodiments, in the non-wearing state, the minimum distance between the sound production component 11 and the first portion of the ear hook may be kept in a specific range. If the aforementioned minimum distance is too large, the headphone 10 may not be effectively clamped on both sides of the ear 100 after wearing, and the clamping force between the headphone 10 and the ear 100 of the user may be too small, i.e., the wearing stability may be poor, and the gap between the sound production component 11 and the concha cavity 102 may be too large, i.e., the opening of the formed quasi-cavity may be too large, resulting in a smaller listening index. In some embodiments, in order to make the headphone have a better listening index in the wearing state, and ensure a certain clamping force between the headphone and the car of the user, the minimum distance between the sound production component 11 and the first portion of the ear hook may not be greater than 3 mm in the non-wearing state. In some embodiments, the minimum distance between the sound production component 11 and the first portion of the ear hook may be no greater than 2.6 mm in the non-wearing state, to increase the clamping force between the headphone and the ear of the user and enhance the stability of the headphone after wearing. At the same time, the opening of the quasi-cavity formed by the sound production component 11 and the concha cavity 102 may be more appropriate, to enhance the listening effect of the user in the opening of the ear canal when wearing the headphone. In some embodiments, in order to make the quasi-cavity structure formed by the sound production component 11 and the concha cavity 102 have a more suitable opening size, the minimum distance between the sound production component 11 and the first portion of the ear hook may not be greater than 2.2 mm in the non-wearing state.

In some embodiments, the headphone 10 may include the wearing state and the non-wearing state, and a difference between the minimum distance from the sound production component 11 to the first portion of the ear hook in the wearing state and the minimum distance from the sound production component 11 to the first portion of the ear hook in the non-wearing state may be kept in a specific range, respectively. It should be noted that a difference between the minimum distances in the wearing state and the non-wearing state may be different. If the aforementioned difference is too small, the clamping force may be too small, the ear hook may not be effectively clamped on both sides of the ear 100 in the wearing state, and the gap between the sound production component 11 and the concha cavity 102 may be too large, i.e., the opening of the formed quasi-cavity may be too large, resulting in a smaller listening index. In some embodiments, in order to make the headphone have a better listening index in the wearing state, the difference between the minimum distance from the sound production component 11 to the first portion of the ear hook in the wearing state and the minimum distance from the sound production component 11 to the first portion of the ear hook in the non-wearing state may not be less than 1 mm. In some embodiments, in order to increase the stability after wearing, the difference between the minimum distance from the sound production component 11 to the first portion of the ear hook in the wearing state and the minimum distance from the sound production component 11 to the first portion of the ear hook in the non-wearing state may not be less than 1.3 mm. In some embodiments, in order to ensure an appropriate opening size of the quasi-cavity structure formed by the sound production component 11 and the concha cavity 102, the difference between the minimum distance from the sound production component 11 to the first portion of the ear hook in the wearing state and the minimum distance from the sound production component 11 to the first portion of the ear hook in the non-wearing state may not be less than 1.5 mm.

Figure 5B:
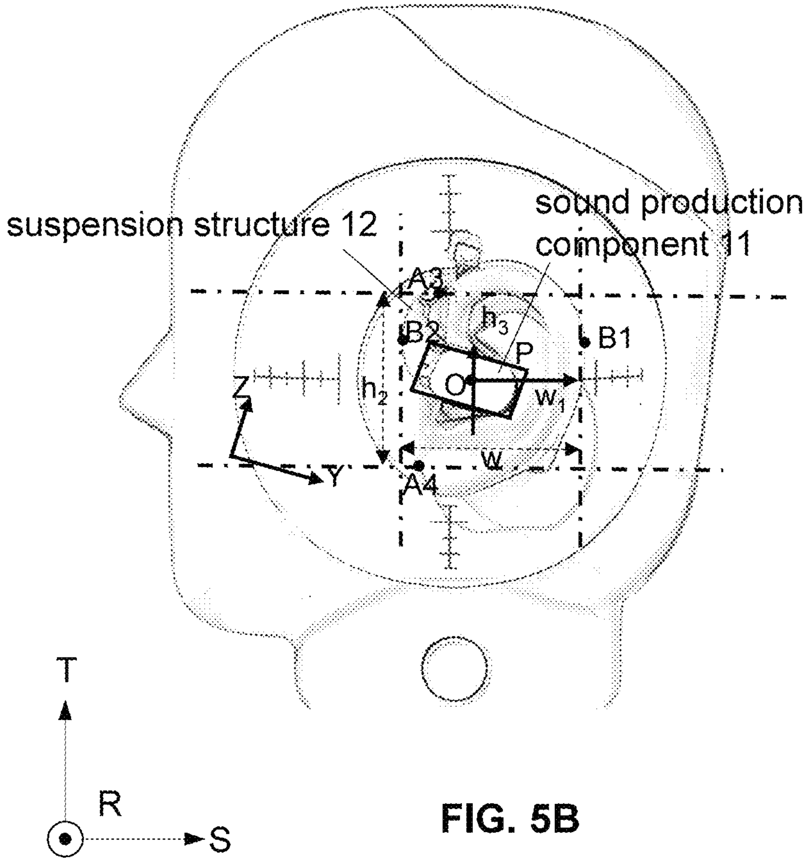
FIG. 5B is a schematic diagram illustrating an exemplary wearing state of a headphone according to some embodiments of the present disclosure.

FIG. 5B is schematic diagram illustrating an exemplary wearing state of a headphone according to some embodiments of the present disclosure.

The ears of different users are different. For example, some users have longer earlobes. At this time, it may have an effect if the headphone 10 is defined using the ratio of the distance between the centroid O of the first projection and the highest point of the second projection to the height of the second projection in the vertical axis. As shown in FIG. 5B, a highest point A3 and a lowest point A4 of a connection region between the auricle of the user and the head of the user may be selected for illustration. The highest point of the connection part between the auricle and the head may be understood as a position where a projection of the connection region between the auricle and the head on the sagittal plane has a largest distance from a projection of a specific point on the neck on the sagittal plane. The lowest point of the connection part between the auricle and the head may be understood as a position where the projection of the connection region between the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the concha cavity 102 of the user. Correspondingly, a ratio of a distance h3 between the centroid O of the first projection and a highest point of a projection of the connection region between the auricle and the head on the sagittal plane in the vertical axis direction to a height h2 between a highest point and a lowest point of the projection of the connection region between the auricle and the head on the sagittal plane in the vertical axis direction may be controlled to be within a range of 0.4-0.65. Meanwhile, the ratio of the distance w1 between the centroid O of the first projection and the end point of the second projection in the sagittal axis direction to the width w of the second projection in the sagittal axis direction may be controlled to be within a range of 0.4-0.65. In some embodiments, in order to improve the wearing comfort of the headphone while ensuring the acoustic output quality of the sound production component 11, the ratio of the distance h3 between the centroid O of the first projection and the highest point of the projection of the connection region between the auricle and the head on the sagittal plane in the vertical axis direction to the height h2 between the highest point and the lowest point of the projection of the connection region between the auricle and the head on the sagittal plane in the vertical axis direction may be controlled to be within a range of 0.45-0.6, and the ratio of the distance w1 between the centroid O of the first projection and the end point of the second projection in the sagittal axis direction to the width w of the second projection in the sagittal axis direction may be within a range of 0.45-0.68. In some embodiments, the ratio of the distance h3 between the centroid O of the first projection and the highest point of the projection of the connection region between the auricle and the head on the sagittal plane in the vertical axis direction to the height h2 between the highest point and the lowest point of the projection of the connection region between the auricle and the head on the sagittal plane in the vertical axis direction may be within a range of 0.5-0.6, and the ratio of the distance w1 between the centroid O of the first projection and the end point of the second projection in the sagittal axis direction to the width w of the second projection in the sagittal axis direction may be within a range of 0.48-0.6.

In some embodiments, when the ratio of the distance h3 between the centroid O of the first projection and the highest point of the projection of the connection region between the auricle and the head on the sagittal plane in the vertical axis direction to the height h2 between the highest point and the lowest point of the projection of the connection region between the auricle and the head on the sagittal plane in the vertical axis direction, and the ratio of the distance w1 between the centroid O of the first projection and the end point of the second projection in the sagittal axis direction to the width w of the second projection in the sagittal axis direction are within the above-described ranges, the minimum distance between the sound production component 11 and the first portion 121 of the ear hook may also reflect the clamping force of the sound production component 11 and the first portion 121 clamping on the auricle, as well as the wearing position of the sound production component 11.

Figure 9:
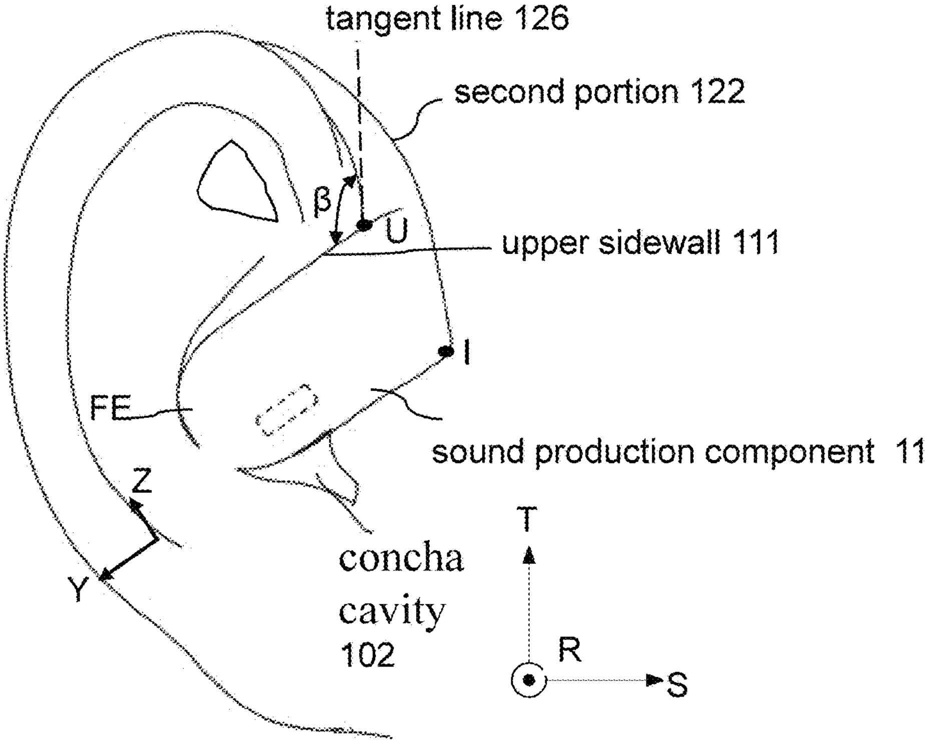
FIG. 9 is a schematic diagram of a headphone according to some embodiments of the present disclosure.
Figure 10:
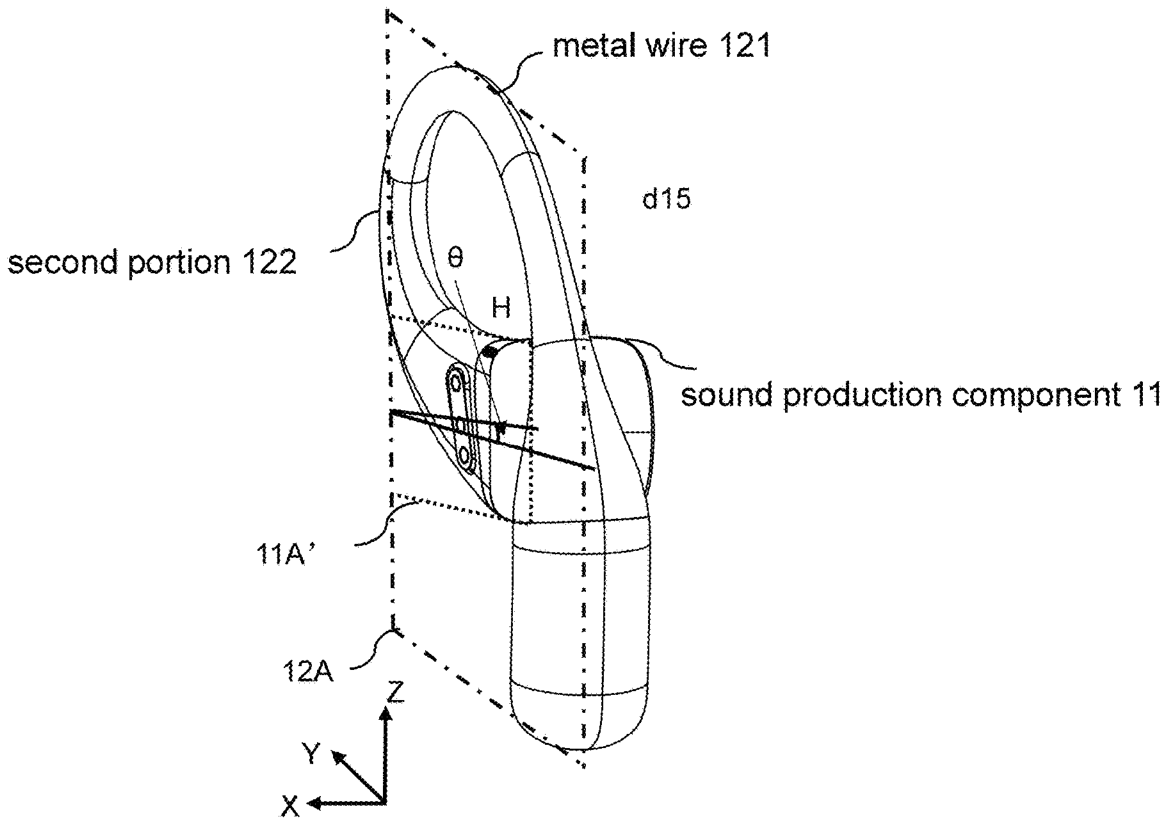
FIG. 10 is a schematic structural diagram illustrating a headphone in a non-wearing state according to some embodiments of the present disclosure.

FIG. 9 is a schematic diagram of a headphone according to some embodiments of the present disclosure. FIG. 10 is a schematic structural diagram illustrating a headphone in a non-wearing state according to some embodiments of the present disclosure.

Referring to FIG. 9, in some embodiments, when a user wears the headphone, a portion or the whole structure of the sound production component 11 may extend into the concha cavity 102, so that the sound production component 11 and the concha cavity 102 may form a quasi-cavity to ensure near-field listening effect and far-field sound reduction effect. At the same time, the sound production component 11 and the ear hook may be clamped on the ear of the user to provide a certain clamping force when wearing, and a certain included angle may be formed between an upper sidewall 111 of the sound production component 11 and the second portion 122 of the ear hook. The included angle may be expressed by an included angle β between a projection of the upper sidewall 111 of the sound production component 11 on a sagittal plane and a tangent line 126 of a projection of a connection part between the second portion 122 of the ear hook and the upper sidewall 111 of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook may be drawn through the point U. When the upper sidewall 111 is a curved plane, the projection of the upper sidewall 111 on the sagittal plane may be a curved line or a broken line. At this time, the included angle between the projection of the upper sidewall 111 on the sagittal plane and the tangent line 126 may be an included angle between a tangent line to a point at which the curved line or the broken line has a largest distance from a plane and the tangent line 126. In some embodiments, when the upper sidewall 111 is the curved plane, a tangent line parallel to the long axis direction Y on the projection may also be selected. An included angle between the tangent line and the horizontal direction may represent an inclination angle between the projection of the upper sidewall 111 on the sagittal plane and the tangent line 126. In some embodiments, the included angle β may be within a range of 100°-150°. At this time, the sound production component 11 and the ear hook may match with the ear hook to clamp the ear of the user to ensure the wearing stability of the headphone. At the same time, a portion of the structure of the sound production component 11 may extend into the concha cavity 102 to form a quasi-cavity structure. In some embodiments, the angle β may be within a range of 120°-135°, and the sound production component 11 may be more tightly clamped on the ear of the user, which may further improve the wearing stability of headphone, and an opening size and a count of openings of the quasi-cavity structure formed by the sound production component 11 and the concha cavity 102 may be more appropriate, thereby improving the listening effect and the sound leakage reduction effect when the user wears the headphone.

The human head is approximately regarded as a quasi-sphere structure, and the auricle is a structure that protrudes relative to the head. When the user wears the headphone, part of the ear hook 12 may be attached to the head of the user. In order to make the sound production component 11 inserted into the concha cavity 102, a certain inclination angle may be formed between the sound production component 11 and a plane of the ear hook. The inclination angle may be expressed by an included angle between a plane corresponding to the sound production component 11 and the plane of the ear hook. In some embodiments in the present disclosure, the plane of the ear hook refers to a plane (e.g., a plane where the dotted line 12A in FIG. 10 is located) formed by a bisector that bisects or roughly bisects the ear hook 12 along a length extension direction of the ear hook 12. In some embodiments, the plane of the ear hook may also be a plane formed by three most protruding points on the ear hook, i.e., a plane that supports the ear hook when the ear hook is placed freely (without external force). For example, when the ear hook is placed on a horizontal plane, the horizontal plane may support the ear hook, and the horizontal plane may be regarded as the plane of the ear hook. In some embodiments, a plane 11A' corresponding to the sound production component 11 may include a sidewall (also referred to as an inner side) of the sound production component 11 facing the front outer side of the auricle of the user, or a sidewall (also referred to as an outer side) away from the front outer side of the auricle of the user. When the sidewall of the sound production component 11 facing a front outer side of the auricle of the user or the sidewall of the sound production component 11 away from the front outer side of the auricle of the user is the curved plane, the plane corresponding to the sound production component 11 refers to a tangent plane corresponding to the curved plane at a center position, or a plane approximately coinciding with a curve enclosed by the contour of the edge of the curved plane. Taking the plane 11A' where the sidewall of the sound production component 11 facing the front outer side of the auricle of the user is located as an example, the included angle θ formed between the plane 11A' and the plane 12A of the ear hook may be the inclination angle θ of the sound production component 11 relative to the plane of the ear hook. In some embodiments, the included angle θ may be measured by the following exemplary method. The projection of the sidewall (hereinafter referred to as the inner side) of the sound production component 11 close to the ear hook 12 on an X-Y plane and the projection of the ear hook 12 on the X-Y plane may be obtained along the short axis direction Z, respectively. A first straight line may be drawn by selecting two most protruding points of a side of the projection of the ear hook 12 on the X-Y plane close to (or away from) the projection of the inner side of the sound production component 11 on the X-Y plane. When the projection of the inner side of the sound production component 11 on the XY plane is a straight line, an included angle between the first straight line and the projection of the inner side on the X-Y plane may be the included angle θ. When the inner side of the sound production component 11 is the curved line, the included angle between the first straight line and the long axis direction Y may be approximately regarded as the included angle θ. It should be noted that the inclination angle θ of the sound production component 11 relative to the plane of the ear hook in both the wearing state and the non-wearing state of the headphone may be measured using the same manner. The difference lies in that in the non-wearing state, the inclination angle θ may be directly measured using the manner; in the wearing state, the inclination angle θ may be measured using the manner when the headphone is worn on a human head model or an ear model. Considering that if the angle is too large, a contact area between the sound production component 11 and the front outer side of the auricle of the user may be small, the clamping force between the headphone and the ear may be too small, and the headphone may be prone to fall off when the user wears the headphone. In addition, sizes of gaps formed in the quasi-cavity structure between the sound production component 11 and the concha cavity 102 of the user may be too large, which may affect the listening volume at an opening of an ear canal of the user. If the angle is too small, the sound production component 11 may not be effectively inserted into the concha cavity when the user wears the headphone. In order to ensure that the user has a better listening effect when wearing the headphone 10 and ensure the wearing stability, in some embodiments, when the headphone is in the wearing state, the inclination angle θ of the sound production component 11 relative to the plane of the ear hook may be within a range of 15°-28°. In some embodiments, the inclination angle θ of the sound production component 11 relative to the plane of the ear hook may be within a range of 16°-25°. In such cases, the sizes and count of the openings of the quasi-cavity structure formed by the sound production component 11 and the concha cavity 102 may be more moderate, ensuring the listening effect and the leakage reduction effect when the user wears the headphone. In some embodiments, the inclination angle θ of the sound production component 11 relative to the plane of the ear hook may be within a range of 18°-23°. At this time, the sound production component 11 may fit more closely with the ear of the user when the user wears the headphone, which may increase the contact area between the sound production component 11 and the ear of the user, thereby improving the wearing stability of the headphone.

Due to the elasticity of the ear hook, the inclination angle of the sound production component 11 relative to the plan 12A of the ear hook may vary to a certain extent in the wearing state and the non-wearing state. For example, the inclination angle in the non-wearing state may be smaller than that in the wearing state. In some embodiments, when the headphone is in the non-wearing state, the inclination angle of the sound production component 11 relative to the plane of the ear hook may be within a range of 15°-23°, and the ear hook of the headphone 100 may produce a certain clamping force on the ear of the user when the headphone 100 is in the wearing state, thereby improving the wearing stability for the user without affecting the wearing experience of the user. In some embodiments, in the non-wearing state, the inclination angle of the sound production component 11 relative to the plane 12A of the ear hook may be within a range of 16.5°-21°. In some embodiments, in the non-wearing state, the inclination angle of the sound production component 11 relative to the plane 12A of the ear hook may be within a range of 18°-20°.

When the size of the sound production component 11 in the thickness direction X is too small, a volume of a front cavity and a rear cavity formed by a diaphragm and a housing of the sound production component 11 may be too small, a vibration amplitude of the vibration may be limited, and a large sound volume may not be provided. When the size of the sound production component 11 in the thickness direction X is too large, the end FE of the sound production component 11 may not completely abut against the edge of the concha cavity 102 in the wearing state, and the edge of the concha cavity 102 may be weak in limiting and supporting the sound production component 11, causing the headphone to easily fall off. The sidewall of the sound production component 11 facing the ear of the user in a coronal axis direction may have an inclination angle relative to the plane of the ear hook. A distance between a farthest point on the sound production component 11 from the plane of the ear hook and the plane of the ear hook may be related to the size of the sound production component 11 in the thickness direction X. As the sound production component 11 is arranged obliquely relative to the plane of the ear hook, the farthest point on the sound production component 11 from the plane of the ear hook refers to an intersection point I of a fixed end connected to the ear hook, a lower sidewall, and the outer side of the sound production component 11. Furthermore, a depth of the sound production component 11 inserted into the concha cavity 102 may be determined by the distance between the closest point on the sound production component 11 from the plane of the ear hook and the plane of the ear hook. The deeper the sound production component 11 is inserted into the concha cavity 102, the more obvious the supporting and limiting effect of the concha cavity 102 on the sound production component 11, and the higher the wearing stability of the headphone. Thus, the distance between the closest point on the sound production component 11 from the plane of the ear hook and the plane of the ear hook may be set in a suitable range, which may ensure that the size of the gap formed by the sound production component 11 and the concha cavity 102 is small while ensuring the wearing comfort and stability of the headphone. The closest point on the sound production component 11 from the plane of the ear hook may be an intersection point H of the end FE, the upper sidewall, and the inner side of the sound production component 11. In some embodiments, to ensure that the sound production component 11 has a better acoustic output effect and the wearing stability and comfort, when the headphone is in the wearing state, the distance between a farthest point I on the sound production component 11 from the plane 12A of the ear hook and the plane 12A of the ear hook may be within a range of 11.2 mm-16.8 mm, and the distance between a closest point H on the sound production component 11 to the plane 12A of the ear hook and the plane 12A of the ear hook may be within a range of 3 mm-5.5 mm. In some embodiments, the distance between the farthest point I on the sound production component 11 from the plane 12A of the ear hook and the plane 12A of the ear hook may be within a range of 12 mm-15.6 mm, and the distance between the closest point H on the sound production component 11 to the plane 12A of the ear hook and the plane 12A of the ear hook may be within a range of 3.8 mm-5 mm. At this time, the size of the sound production component 11 in the thickness direction X may be relatively moderate, which ensures a vibration amplitude of the diaphragm, and thus allows the sound production component 11 to provide a larger sound volume, thereby ensuring a large volume at the opening of the ear canal of the user. At the same time, the size of the sound production component 11 may not be too large, and the end FE of the sound production component 11 may at least partially abut against the edge of the concha cavity 102. The edge of the concha cavity 102 may support and limit the sound production component 11 to a certain extent, improving the wearing stability of headphone. To make more portions of the end of the sound production component 11 abut against the edge of the concha cavity 102, and further improve the wearing stability of headphones, in some embodiments, the distance between the farthest point I on the sound production component 11 from the plane 12A of the ear hook and the plane 12A of the ear hook may be within a range of 13 mm-15 mm, and the distance between the closest point H on the sound production component 11 to the plane 12A of the ear hook and the plane 12A of the ear hook may be within a range of 4 mm-5 mm.

Figure 11:
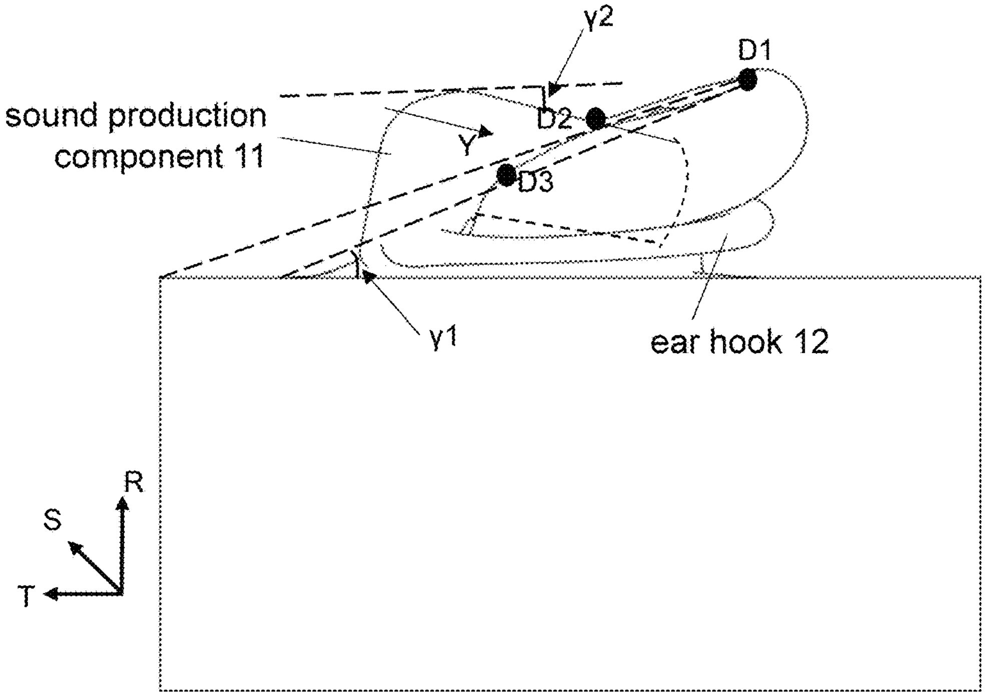
FIG. 11 is a schematic diagram illustrating another exemplary wearing state of a headphone according to some embodiments of the present disclosure.

FIG. 11 is a schematic diagram illustrating another exemplary wearing state of a headphone according to some embodiments of the present disclosure.

An inclination angle of the sound production component 11 relative to a plane of an auricle may also affect wearing stability of a headphone. Specifically, referring to FIG. 11, in some embodiments, in a wearing state, at least a portion of the sound production component 11 of the headphone may be inserted into the concha cavity 102 of the user. Therefore, an acoustic output effect of the sound production component 11 may be ensured while improving the wearing stability of the headphone based on a force of the concha cavity 102 applied to the sound production component 11. At this time, a sidewall of the sound production component 11 away from the head of the user or facing an opening of an ear canal of the user may have a certain inclination angle relative to the plane of the auricle of the user. It should be noted that the sidewall of the sound production component 11 away from the head of the user or facing the opening of the ear canal of the user may be a plane or a curved plane. When the sidewall is the curved plane, the inclination angle of the sidewall of the sound production component 11 away from the head of the user or facing the opening of the ear canal of the user relative to the plane of the auricle of the user may be represented by an inclination angle of a tangent plane (or a plane roughly coincides with a curve formed by the edge contour of the curved surface) corresponding to the curved plane at a center position relative to the plane of the auricle of the user. It should be noted that in some embodiments of the present disclosure, the plane of the auricular refers to a plane (e.g., a plane on which points D1, D2, and D3 are located in FIG. 11) on which three points farthest from a sagittal plane of the user are located in different regions (e.g., a top region of the auricle, a tragus region, and an antihelix) on the auricle of the user. In addition, the plane of the auricular may be determined in other ways. For example, the auricle of the user may be scanned through three-dimensional (3D) scanning, create a 3D model of the auricle of the user, and calculate a plane tangent to a front outer side of the auricle, the calculated plane is the plane of the auricular.

As the projection of the sound production component 11 on the sagittal plane is much smaller than the projection of the auricle on the sagittal plane, and the concha cavity 102 is a concave cavity in the structure of the auricle, when the inclination angle of the sound production component 11 relative to the plane of the auricle is small, e.g., when the sidewall of the sound production component 11 away from the head of the user or facing the opening of the ear canal of the user is approximately parallel to the plane of the auricle, the sound production component 11 may not be inserted into the concha cavity 102, or a size of a gap of a quasi-cavity structure formed between the sound production component 11 and the concha cavity 102 may be very large, and the user may not obtain a good listening effect when wearing the headphone. Meanwhile, the sound production component 11 may not abut against the edge of the concha cavity 102, and the headphone may be liable to fall off when the user wears the headphone. When the inclination angle of the sound production component 11 relative to the plane of the auricle is large, the sound production component 11 may be excessively inserted into the concha cavity 102 and squeeze the ear of the user, and the user may feel a strong sense of discomfort after wearing the headphone for a long time. In order to make the user experience a better acoustic output effect when wearing the headphone and ensure the wearing stability and comfort, the inclination angle of the sidewall of the sound production component 11 away from the head of the user or facing the opening of the ear canal of the user relative to the plane of the auricle of the user may be within a range of 40°-60°. A portion or the whole structure of the sound production component 11 may be inserted into the concha cavity 102 of the user. At this time, the sound production component 11 may have relatively good acoustic output quality, and a contact force between the sound production component 11 and the ear canal of the user may be relatively moderate, thereby achieving more stable wearing, and making the user have a more comfortable wearing experience. In some embodiments in order to further optimize the acoustic output quality and the wearing experience of the headphone in the wearing state, the inclination angle of the sound production component 11 relative to the plane of the auricle may be controlled to be within a range of 42°-55°. In some embodiments, in order to further optimize the acoustic output quality and the wearing experience of the headphone in the wearing state, the inclination angle of the sound production component 11 relative to the plane of the auricle may be controlled to be within a range of 44°-52°.

It should be noted that, referring to FIG. 11, the plane of the auricle may be inclined upward relative to the sagittal plane, and an inclination angle between the plane of the auricle and the sagittal plane may be $\gamma 1$. In order to make the end of the sound production component 11 inserted into the concha cavity concave relative to the auricle, the outer side or the inner side of the sound production component 11 may be inclined downward relative to the sagittal plane. An inclination angle between the outer side or the inner side of the sound production component 11 and the sagittal plane may be $\gamma 2$. An included angle between the sound production component 11 and the plane of the auricle may be a sum of the inclination angle $\gamma 1$ between the plane of the auricle and the sagittal plane and the inclination angle $\gamma 2$ between the long axis direction Y of the sound production component 11 and the sagittal plane. That is to say, the inclination angle of the outer side or the inner side of the sound production component 11 relative to the plane of the auricle of the user may be determined by calculating the inclination angle $\gamma 1$ between the plane of the auricle and the sagittal plane, and the included angle $\gamma 2$ between the outer side or the inner side of the sound production component 11 and the sagittal plane. The inclination angle between the outer side or the inner side of the sound production component 11 and the sagittal plane may be approximately regarded as the inclination angle between the long axis direction Y of the sound production component 11 and the sagittal plane. In some embodiments, the inclination angle may also be calculated by an included angle between a projection of the plane of the auricle on a plane formed by a T-axis and an R-axis (hereinafter referred to as a T-R plane) and a projection of the outer side or the inner side of the sound production component 11 on the T-R plane. When the outer side or the inner side of the sound production component 11 is a plane, the projection of the outer side or the inner side of the sound production component 11 on the T-R plane may be a straight line. An included angle between the straight line and the projection of the plane of the auricle on the T-R plane may be the inclination angle of the sound production component 11 relative to the plane of the auricle. When the outer side or the inner side of the sound production component 11 is a curved plane, the inclination angle of the sound production component 11 relative to the plane of the auricle may be approximately regarded as the included angle between the long axis direction Y of the sound production component 11 and the projection of the plane of the auricle on the T-R plane.

The projection of the sound production component 11 on the sagittal plane is much smaller than the projection of the auricle on the sagittal plane, and the concha cavity 102 is a concave cavity in the structure of the auricle, when the inclination angle of the sound production component 11 relative to the plane of the auricle is small, e.g., when the sidewall of the sound production component 11 away from the head of the user or facing the opening of the ear canal of the user is approximately parallel to the plane of the auricle, the sound production component 11 may not be inserted into the concha cavity 102, or the size of the gap of the quasi-cavity structure formed between the sound production component 11 and the concha cavity 102 may be very large, and the user may not obtain a good listening effect when wearing the headphone. Meanwhile, the sound production component 11 may not abut against the edge of the concha cavity 102, and the headphone may be liable to fall off when the user wears the headphone due to insufficient clamping force. When the inclination angle of the sound production component 11 relative to the plane of the auricle is large, the clamping force between the headphone and the car of the user may be too large, and the sound production component 11 may be excessively inserted into the concha cavity 102 and squeeze the ear of the user, causing strong discomfort to the user when wearing the headphone for a long time. The inclination angle of the sound production component 11 relative to the plane of the auricle may be set in the above range may enable the user to experience a better acoustic output effect while ensuring the wearing stability and comfort of the headphone.

As mentioned in the above embodiments, factors such as a positional relationship of the sound production component 11 relative to the auricle, a minimum distance between the sound production component 11 and the first portion 121 of the ear hook, and the inclination angle of the sound production component 11 relative to the plane of the ear hook and the plane of the ear, may affect a position of the sound production component 11 relative to the concha cavity 102 and the clamping force when the user wears the headphone, which in turn affects the listening effect at the opening of the ear canal of the user and a far-field sound leakage reduction effect. In order to more clearly illustrate the effect of a positional relationship between the sound production component 11 and the concha cavity 102 on the acoustic output effect and wearing stability when the user wears the headphone, the positional relationship between the sound production component 11 and the concha cavity 102 may be described below.

Figure 12:
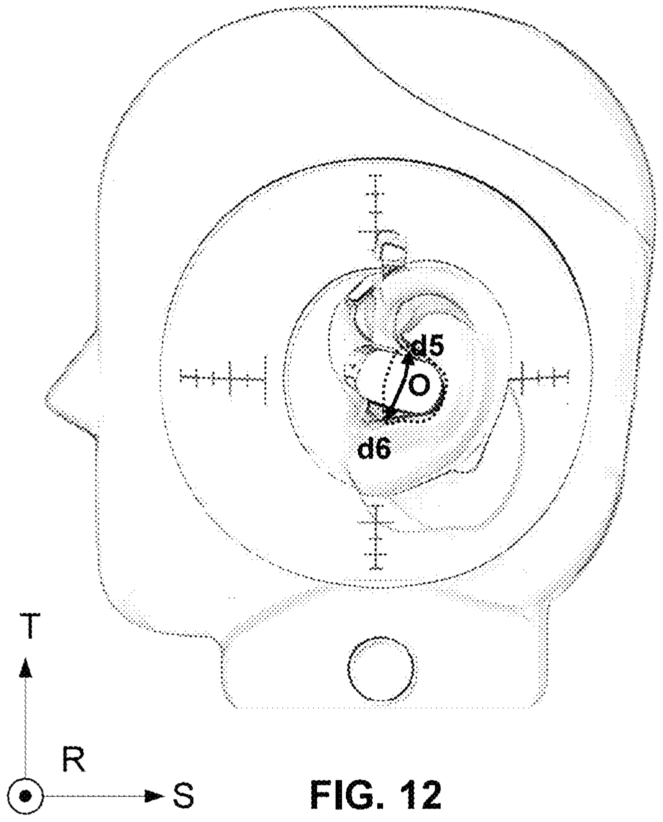
FIG. 12 is a schematic diagram illustrating another exemplary wearing state of a headphone according to some embodiments of the present disclosure.

FIG. 12 is a schematic diagram illustrating another exemplary wearing state of a headphone according to other embodiments of the present disclosure.

In some embodiments, a distance between a centroid of a first projection and a projection of an edge of the concha cavity 102 in a sagittal plane may be within a range of 4 mm-25 mm. At least a portion of the sound production component 11 inserted into the concha cavity 102 may include at least one clamping region contact with the edge of the concha cavity 102.

Referring to FIG. 12, in some embodiments, a projection of the sound production component on the sagittal plane may have an overlapping portion with a projection of the concha cavity of the user (e.g., a dashed portion in FIG. 12) on the sagittal plane, i.e., when the user wears the headphone, a portion or the whole of the sound production component may cover the concha cavity, and the centroid of the first projection (e.g., point O in FIG. 12) may be located in a region of the projection of the concha cavity of the user on the sagittal plane when the headphone is in a wearing state. In some embodiments, when a wearing state of the headphone 10 is that at least a portion of the sound production component 11 covers an antihelix region of the user, the centroid O of the first projection of the sound production component 11 on the sagittal plane may be located in a region outside the region of the projection of the opening of the auricle of the user on the sagittal plane. Thus, the opening of the auricle may be kept fully open to receive sound information from the external environment. The position of the centroid O of the first projection may be related to the size of the sound production component. For example, when the size of the sound production component 11 is too small in the long axis direction Y or the short axis direction Z, the volume of the sound production component 11 may be relatively small, so that an area of a diaphragm arranged in the sound production component 11 may also be relatively small, resulting in low efficiency of the diaphragm in pushing the air inside a housing of the sound production component 11 to generate sound, which affects the acoustic output effect of the headphone. When the size of the sound production component 11 in the long axis direction Y or the short axis direction Z is too large, the sound production component 11 may extend beyond the auricle, and an inner contour of the auricle may not support and limit the sound production component 11, so that the headphone may prone to falling off in the wearing state. In addition, the sound production component 11 may extend beyond the concha cavity and fail to form a quasi-cavity structure, or the total size of a gap formed between the sound production component 11 and the concha cavity may be large, affecting the listening volume at the opening of the ear canal and the far-field sound leakage effect. In some embodiments, in order to enable the headphone to have a better quality of acoustic output when the user wears the headphone 10, the distance between the centroid O of the first projection and the projection of the edge of the concha cavity of the user on the sagittal plane may be within a range of 4 mm-25 mm. In addition, when the size of the sound production component 11 in the long axis direction Y is too small, a gap may be formed between the end FE of the sound production component 11 and the inner contour 1014 of the auricle. The sound emitted from a sound guiding hole and the sound emitted from a pressure relief hole may produce an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. When the size of the sound production component 11 in the short axis direction Z is too large, the sound production component 11 may cover the opening of the ear canal of the user, which may affect the user to access the sound information from the external environment. In some embodiments, in order to make the sound production component have a better acoustic output quality, when the headphone is in the wearing state, a distance between the centroid of the first projection of the sound production component on the sagittal plane of the user and a projection of a centroid of the opening of the ear canal of the user on the sagittal plane may be not greater than 25 mm. In some embodiments, the distance between the centroid of the first projection of the sound production component on the sagittal plane of the user and the projection of the centroid of the opening of the ear canal of the user on the sagittal plane may be within a range of 5 mm-23 mm. In some embodiments, the distance between the centroid of the first projection of the sound production component on the sagittal plane of the user and the projection of the centroid of the opening of the ear canal of the user on the sagittal plane may be within a range of 8 mm-20 mm. In some embodiments, by controlling the distance between the centroid of the first projection of the sound production component on the sagittal plane of the user and the projection of the centroid of the opening of the ear canal of the user on the sagittal plane to be within a range of 10 mm-17 mm, the centroid O of the first projection may be roughly located in the antihelix region of the user. Therefore, the sound output by the sound production component may be better transmitted to the user, and the opening of the ear canal may be kept fully open to obtain the sound information from the external environment. Meanwhile, the inner contour of the auricle may also make at least a portion of the sound production component 11 be subjected to a force that hinders its downward movement, thereby improving the wearing stability of the headphone 10 to a certain extent. It should be noted that the shape of the projection of the opening of the ear canal on the sagittal plane may be approximately regarded as an ellipse. Correspondingly, the centroid of the projection of the opening of the ear canal on the sagittal plane may be a geometric center of the ellipse. Furthermore, the distance between the centroid O of the projection of the first projection and the projection of the edge of the ear canal of the user on the sagittal plane may reflect that at least a portion of the sound production component 11 is inserted into the concha cavity 102 of the user. At this time, the at least a portion of the sound production component 11 inserted into the concha cavity 102 of the user may include at least one clamping region that contacts with the edge of the concha cavity 102 of the user, and the clamping region may be arranged at a free end FE of the sound production component 11. In some embodiments, an orthographic projection of the ear hook 12 on a reference plane (e.g., the XZ plane in FIG. 6) perpendicular to the thickness direction X may partially overlap with an orthographic projection of the free end FE on the same reference plane (as shown in a shaded portion on the rear side RS in FIG. 6). The clamping region may be defined as a region on the rear side RS that forms the projection overlapped region on the reference plane. The projection overlapped region formed by the orthographic projection of the ear hook 12 on the reference plane and the orthographic projection of the free end FE on the same reference plane may be located between the inner side IS and the outer side OS in the thickness direction X. In this way, not only the sound production component 11 and the ear hook 12 jointly clamp the ear 100 from the front and rear sides of the ear 100, but also the formed clamping force may be mainly expressed as a compressive stress, thereby improving the stability and comfort of the acoustic device 10 in the wearing state. It may be understood that when the sound production component 11 is provided in the shape of a circle, an ellipse, etc., the clamping region may be defined as a region on a connection surface (a curved side of the sound production component 11) corresponding to the projection overlapped region. The clamping region may be a region of the sound production component 11 configured to clamp the concha cavity 102. However, different users may have individual differences, resulting in different shapes, sizes, etc., of ears. In the actual wearing state, the clamping region may not clamp the concha cavity 102, but for most users and the aforementioned standard ear model 100, the clamping region may clamp the concha cavity 102 of the user in the wearing state. In some embodiments, the distance between the projection of the centroid O of the first projection on the sagittal plane of the user and the projection of the edge of the concha cavity of the user on the sagittal plane may be within a range of 6 mm-20 mm. At this time, a relatively large portion of the structure of the sound production component may be inserted into the concha cavity, and the contact area between the sound production component and the edge of the concha cavity may be relatively large, i.e., the area of the clamping region may be relatively large, which may provide a certain clamping force for the user to wear the headphone and improve the wearing stability of the headphone. In addition, the area of the sound production component that covers the concha cavity may be relatively large, and the count and sizes of the gaps of the quasi-cavity structure formed by the sound production component and the concha cavity may not be too large, which may improve the listening effect at the opening of the ear canal. In order to further increase the clamping force of the headphone in the wearing state, to ensure that the count and sizes of the gaps of the quasi-cavity structure formed by the sound production component and the concha cavity may not be too small, and to prevent a poor sound leakage reduction effect of the headphone in the wearing state, in some embodiments, the distance between the projection of the centroid O of the first projection on the sagittal plane of the user and the projection of the edge of the concha cavity of the user on the sagittal plane may be within a range of 10 mm-18 mm. For example, in some embodiments, a minimum distance d5 between the centroid O of the first projection and the projection of the edge of the concha cavity of the user on the sagittal plane may be 5 mm, and a maximum distance d6 between the centroid O of the first projection and the projection of the edge of the concha cavity of the user on the sagittal plane may be 24.5 mm. In some embodiments, by controlling the distance between the centroid O of the first projection and the projection of the edge of the concha cavity of the user on the sagittal plane to be within a range of 4 mm-25 mm, at least a portion of the structure of the sound production component 11 may cover the concha cavity to form an acoustic model of the quasi-cavity with the concha cavity. Therefore, the sound output by the sound production component may be better transmitted to the user, and the wearing stability of the headphone 100 may be improved by the force exerted by the concha cavity on the sound production component 11.

Figure 13:
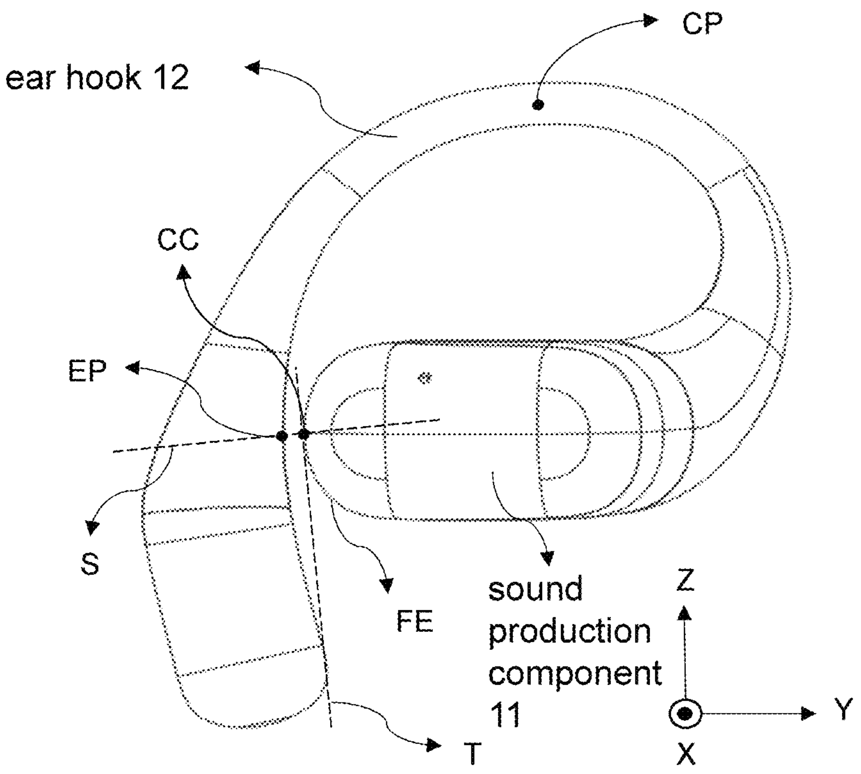
FIG. 13 is a schematic diagram illustrating another exemplary structure of the headphone illustrated in FIG. 3.

FIG. 13 is a schematic diagram illustrating another exemplary structure of a headphone in FIG. 3. In some embodiments, as shown in FIG. 3, the sound production component 11 and the ear hook 12 may jointly clamp the ear 100 from front and rear sides of the ear 100 (e.g., the concha cavity 102), and the clamping force may be mainly manifested as compressive stress, thereby improving stability and comfort of the headphone 10 in a wearing state. As shown in FIG. 13, the sound production component 11 may include a center CC of a clamping region, and the ear hook 12 may include a clamping fulcrum CP and an ear hook clamping point EP.

The clamping fulcrum CP here may be understood as a fulcrum of the ear hook 12 that contacts an auricle and provides support for the headphone when the headphone is worn. Considering that there is a continuous region on the ear hook 12 that is in contact with a side of the auricle facing the head and provides support, for ease of understanding, in some embodiments, an extreme point of the ear hook 12 located in this region may be regarded as the clamping fulcrum CP. The extreme point of the ear hook 12 may be determined as follows. An inner contour of a projection curve of the headphone on a sagittal plane of the user in the wearing state (or an inner contour of a projection of the headphone on a plane of the ear hook in a non-wearing state) may be obtained, and an extreme point (e.g., a maximum point) of the inner contour of the projection curve in the short axis direction Z may be designated as the extreme point of the ear hook 12, which is located near a highest point in a vertical axis direction of a human body in the wearing state (e.g., at a position within 15 mm of a rear side of the highest point). It should be noted that the ear hook may be an arc structure, and the plane of the ear hook may be a plane formed by three most protruding points on the ear hook 12, i.e., the plane that supports the ear hook 12 when the ear hook 12 is placed freely. In other embodiments, the plane of the ear hook also refers to a plane formed by a bisector line that bisects or roughly bisects the ear hook 12 along the long axis direction Y of the ear hook 12. The extreme point of the inner contour of the projection curve in the width direction Z may be determined as follows. A coordinate system may be constructed by taking the long axis direction Y of the sound production component 11 as a horizontal axis and the short axis direction Z as a vertical axis, and the maximum point of the inner contour of the projection curve in the coordinate system (e.g., a first-order derivative is 0) may be taken as the extreme point of the inner contour of the projection curve in the width direction Z. In addition, when the non-wearing state changes to the wearing state, the sound production component 11 and an end of the ear hook 12 away from the sound production component 11 (e.g., a battery compartment) may be stretched. In this case, the clamping fulcrum CP may produce a large strain. Therefore, in some alternative embodiments, a center of a cross section corresponding to a position of maximum strain on the ear hook 12 before and after wearing may be taken as the clamping fulcrum CP. Alternatively, in order to easily generate a large strain at the clamping fulcrum CP, the ear hook 12 may be set as a variable cross-section structure, i.e., cross-sectional areas of different positions of the ear hook 12 may be different, and a center of a cross section of the ear hook 12 with the smallest cross-sectional area may be taken as the clamping fulcrum CP. In other alternative embodiments, when the user wears the headphone, since a main action position of a support force of the ear 100 of the user on the ear hook 12 may be a highest point of the ear hook 12 in the vertical axis direction of the human body, the highest point may be regarded as the clamping fulcrum CP.

The center CC of the clamping region refers to a point capable of representing the clamping region and configured to describe positions of the clamping region relative to other structures. In some embodiments, the center CC of the clamping region may be used to represent a position where the clamping region exerts the greatest force on the ear 100 in a standard wearing condition. The standard wearing condition may be a condition in which the headphone is correctly worn on the standard ear model according to a wearing specification. In some embodiments, when the sound production component 11 is provided in the shape of a circle, an oval, a rounded square, a rounded rectangle, etc., an intersection point between a long axis of the sound production component and the clamping region may be defined as the center CC of the clamping region. It should be noted that the long axis of the sound production component may be a central axis of the sound production component 11 along the long axis direction Y. The center CC of the clamping region may be determined as follows. An intersection point between an orthographic projection of the sound production component 11 on a reference plane (e.g., an XZ plane in FIG. 6) perpendicular to the long axis direction Y and an orthographic projection of the central axis on the same reference plane may be determined, and the center CC of the clamping region may be defined as a point on the sound production component 11 that forms the intersection point on the reference plane. In other embodiments, when the long axis of the sound production component 11 is difficult to determine (e.g., the sound production component 11 is provided in an irregular shape), as shown in FIG. 6, the center CC of the clamping region may be defined as an intersection point between a tangent plane of the free end FE and the end of the ear hook 12 away from the sound production component 11 (e.g., the battery compartment) and the free end FE. The center CC of the clamping region may be determined as follows. A tangent line T of an orthographic projection of the sound production component 11 on a reference plane (e.g., a YZ plane in FIG. 6) and an orthographic projection of the end of the ear hook 12 (e.g., the battery compartment) on the same reference plane may be determined, an intersection point between the tangent line T on the reference plane and the orthographic projection of the free end FE may be determined, and the center CC of the clamping region may be defined as a point of the free end FE that forms the intersection point on the reference plane.

In some embodiments, after the shape and size of the sound production component 11 are determined, a covering position of the sound production component 11 in the concha cavity 102 in the wearing state and a clamping position of the sound production component 11 clamping the concha cavity 102 (or even the tragus near the concha cavity 102) may also be changed by designing a distance between the center CC of the clamping region and the clamping fulcrum CP, thereby affecting the stability and comfort of the user wearing the headphone, and affecting the listening effect of the headphone. That is to say, in the wearing state, the distance between the center CC of the clamping region and the clamping fulcrum CP may be in a specific range. When the shape and the size of the sound production component 11 are constant, if the aforementioned distance is too large, the position of the sound production component 11 in the concha cavity 102 may be lower, and a gap between the upper side US of the sound production component 11 and the concha cavity 102 may be too large, i.e., an opening of the quasi-cavity may be too large, the contained sound source (i.e., the sound guiding hole on the inner side IS) may directly radiate more sound components to the environment, and the sound reaching the listening position may be relatively small. Meanwhile, the sound from the external sound source entering the quasi-cavity may increase, resulting in near-field sound cancellation, which in turn leads to a smaller listening index. Moreover, if the aforementioned distance is too large, there may be too much interference between the sound production component 11 (or a connection region between the ear hook 12 and the sound production component) and a tragus, causing the sound production component 11 to squeeze the tragus too much, and affecting the wearing comfort. When the shape and the size of the sound production component 11 are constant, if the aforementioned distance is too small, the upper side US of the sound production component 11 may be attached to the upper edge of the concha cavity 102, and the gap between the upper side US and the concha cavity 102 may be too small (or a count of gaps may be too small), even making the internal environment completely sealed and isolated from the external environment, and failing to form the quasi-cavity structure. Moreover, if the aforementioned distance is too small, the sound production component 11 (or the connection region between the ear hook 12 and the sound production component) may squeeze the outer contour of the ear too much, which may also affect the wearing comfort. The listening index takes a reciprocal 1/α of a sound leakage index a as an evaluation effect of each configuration. The listening index means the size of the listening volume when the sound leakage is constant. From an application, the listening index should be as large as possible. If the gap is too small (i.e., the opening of the quasi-cavity is too small), the sound leakage reduction effect may be poor. If too few gaps are formed, a count of the openings of the quasi-cavity may be small. Compared with a cavity structure with fewer openings, a cavity structure with more openings may better improve a resonant frequency of the air-conducted sound in the cavity structure, so that the whole device may have a better listening index in a high-frequency range (e.g., sound with a frequency close to 10000 Hz) than the cavity structure with fewer openings. Moreover, the high-frequency range is a frequency range that the human ear is more sensitive to, so the demand for leakage reduction is greater. Therefore, if too few gaps are formed, the sound leakage reduction effect in the high-frequency range cannot be improved. In some embodiments, in order to make the headphone have a better hearing index in the wearing state, the distance between the center CC of the clamping region and the clamping fulcrum CP may be in a range of 20 mm-40 mm. In some embodiments, in order to further improve the sound leakage reduction effect, the distance between the center CC of the clamping region and the clamping fulcrum CP may be in a range of 23 mm-35 mm. In some embodiments, in order to make the quasi-cavity structure formed by the sound production component 11 and the concha cavity 102 have a more suitable volume and opening size/count, the distance between the center CC of the clamping region and the clamping fulcrum CP may be in a range of 25 mm-32 mm.

The ear hook clamping point EP may be a point of the ear hook 12 closest to the center CC of the clamping region, and may be configured to measure the clamping condition of the ear hook 12 to the ear 100 in the wearing state. The clamping force of the ear hook 12 to the ear 100 may be changed by setting the position of the ear hook clamping point EP. In some embodiments, when the sound production component 11 is provided in the regular shape of a circle, an oval, a rounded square, a rounded rectangle, etc., the intersection point between the long axis of the sound production component and the first portion of the ear hook may be defined as the ear hook clamping point EP. The ear hook clamping point EP may be determined as follows. A point of the first portion of the ear hook corresponding to an intersection point between an orthographic projection of the first portion of the ear hook on the reference plane (e.g., the XZ plane in FIG. 6) perpendicular to the short axis direction Y and the orthographic projection of the central axis of the sound production component 11 on the same reference plane may be defined as the ear hook clamping point EP. In some embodiments, when the long axis of the sound production component 11 is difficult to determine (e.g., the sound production component 11 is provided in an irregular shape), as shown in FIG. 6, the ear hook clamping point EP may be defined as an intersection point between a tangent plane passing through the center CC of the clamping region and perpendicular to the tangent plane of the free end FE and the end of the ear hook 12 away from the sound production component 11 (e.g., the battery compartment) and a portion of the ear hook 12 close to the free end FE. The ear hook clamping point EP may be determined as follows. A straight line S passing through the orthographic projection of the center CC of the clamping region on the reference plane of the center CC of the clamping region on the reference plane (e.g., the YZ plane in FIG. 6) perpendicular to the thickness direction X and perpendicular to the tangent line T may be determined, an intersection point of the straight line S and a portion of the orthographic projection of the ear hook 12 on the reference plane close to the orthographic projection of the free end FE on the reference plane may be also determined, and the ear hook clamping point EP may be defined as a point of the ear hook 12 that forms the intersection point on the reference plane.

In some embodiments, in the wearing state, a distance between the ear hook clamping point EP of the first portion of the ear hook and the clamping fulcrum CP may be in a specific range. If the aforementioned distance is too large, the ear hook 12 between the ear hook clamping point EP and the clamping fulcrum CP may be too straight or difficult to clamp on the rear side of the concha cavity 102 (e.g., the clamping position may be lower relative to the concha cavity 102), and the end of the ear hook 12 away from the sound production component 11 (e.g., the battery compartment) may not fit well with the ear 100. If the aforementioned distance is too small, the ear hook 12 between the ear hook clamping point EP and the clamping fulcrum CP may be bent or difficult to clamp the rear side of the concha cavity 102 (e.g., a holding position may be upper relative to the concha cavity 102), and the end of the ear hook 12 away from the sound production component 11 may squeeze the ear 100, resulting in poor comfort. In some embodiments, in order to meet the wearing requirements, in the wearing state, the distance between the ear hook clamping point EP of the first portion of the ear hook and the clamping fulcrum CP may be within a range of 25 mm-45 mm. In some embodiments, in order to make the end of the ear hook 12 away from the sound production component 11 better fit with the ear 100, in the wearing state, the distance between the ear hook clamping point EP of the first portion of the ear hook and the clamping fulcrum CP may be in a range of 26 mm-40 mm. In some embodiments, in order to improve comfort, in the wearing state, the distance between the ear hook clamping point EP of the first portion of the ear hook and the clamping fulcrum CP may be in a range of 27 mm-36 mm.

In some embodiments, as shown in FIG. 3, in the wearing state, viewed along the direction of the coronal axis of the human body, a connection end CE may be closer to the top of the head than the free end FE, so that the free end FE may extend into the concha cavity 102. Accordingly, an included angle between the long axis direction Y and the sagittal axis direction of the human body may keep in a specific range. When the shape and the size of the sound production component 11 are constant, if the aforementioned included angle is too small, the upper side US of the sound production component 11 may be attached to the upper edge of the concha cavity 102, and the gap between the upper side US and the concha cavity 102 may be too small (or the count of the gaps may be too small), resulting in a poor sound leakage reduction effect and a long distance between the sound guiding hole of the sound production component 11 and the external ear canal 101. When the shape and the size of the sound production component 11 are constant, if the aforementioned included angle is too large, the gap between the upper side US of the sound production component 11 and the concha cavity 102 may be too large, i.e., the opening of the formed quasi-cavity may be too large, resulting in a smaller listening index. In some embodiments, in order to make the headphone have a better listening index in the wearing state, the included angle between the long axis direction Y and the sagittal axis direction of the human body may be in a range of 15°-60°. In some embodiments, in order to further improve the sound leakage reduction effect, the included angle between the long axis direction Y and the sagittal axis direction of the human body may be in a range of 20°-50°. In some embodiments, in order to have a proper distance between the sound guiding hole and the external ear canal 101, the included angle between the long axis direction Y and the sagittal axis direction of the human body may be in a range of 23°-46°.

In some embodiments, a direction of the clamping force may be the direction of a line connecting two clamping points (or a central point of a clamping surface) of the headphone clamped on both sides of the auricle. When the shape and the size of the sound production component 11 are constant, the direction of the clamping force may be closely related to an orientation of the sound production component 11 in the concha cavity 102 and a depth of the sound production component 11 inserted into the concha cavity 102. The depth of the sound production component 11 inserted into the concha cavity 102 may be represented by an inclination angle of the sound production component 11 relative to the plane of the ear hook or a plane of the auricle. For example, the larger the inclination angle of the sound production component 11 relative to the plane of the ear hook or the plane of the auricle, the deeper the sound production component 11 is inserted into the concha cavity 102. In addition, in order to make the headphone more stable to wear, the direction of the clamping force should be kept the same as or substantially the same as the direction of a pressure exerted by the sound production component 11 on the concha cavity 102 and a direction of a pressure exerted by the ear hook clamping point EP on the back of the ear to avoid the tendency of relative movement between the sound production component 11 and the ear hook 12. Therefore, the direction of the clamping force may also affect the wearing stability of the headphone. Since regions of the back of the ear 100 corresponding to the concha cavity 102 are limited, and the direction of the pressure of the ear hook 12 on the ear 100 in these regions is usually parallel or roughly parallel to the sagittal plane of the user, an included angle between the direction of the clamping force and the sagittal plane of the user may keep in a specific range. In other words, the direction of the clamping force may be parallel or substantially parallel to the sagittal plane of the user. If the aforementioned included angle deviates too much from 0°, a gap between the inner side IS of the sound production component 11 and the concha cavity 102 may be too large, resulting in a smaller listening index; or the position of the sound production component 11 in the concha cavity 102 may deviate toward the side of the ear 100 facing the head, the inner side IS on the sound production component 11 may be attached to the upper edge of the concha cavity 102, and the gap between the inner side IS of the sound production component 11 and the concha cavity 102 may be too small (or the count of the gaps may be too small), or even the internal environment may be completely sealed and isolated from the external environment, resulting in a poor sound leakage reduction effect. In addition, if the aforementioned included angle deviates too much from 0°, the wearing stability of the headphone 10 may be poor, and shaking may easily occur. It should be noted that the direction of the clamping force may be determined by affixing a force sensor (e.g., a strain gauge) or a force sensor array on the side of the auricle facing the head and the side of the auricle away from the head, and reading a force distribution at a clamped position. For example, if there is a point where the force may be measured on the side of the auricle facing the head and the side of the auricle away from the head, it can be considered that the direction of the clamping force may be the direction of the line connecting the two points. In some embodiments, in order to meet wearing requirements, an included angle between the direction of the clamping force and the sagittal plane of the user may be within a range of −30°-30°. In some embodiments, in order to improve the listening index, the included angle between the direction of the clamping force and the sagittal plane of the user may be within a range of −20°-20°. In some embodiments, in order to further improve the sound leakage reduction effect, the included angle between the direction of the clamping force and the sagittal plane of the user may be in a range of −10°-10°. In some embodiments, in order to further increase the wearing stability of the headphone 10, the included angle between the direction of the clamping force and the sagittal plane of the user may be within a range of −8°-8°. In some embodiments, the direction of the clamping force may be adjusted by designing a curve configuration of the ear hook 12, and/or designing the shape and the size of the sound production component 11, and/or designing the position of the center CC of the clamping region.

In order to further measure the clamping force provided by the ear hook 12 in the wearing state, a degree of difficulty of deformation of the ear hook 12 based on the clamping fulcrum CP may be defined as a clamping coefficient based on the clamping fulcrum CP in the present disclosure. In some embodiments, a value of the clamping coefficient of the ear hook 12 based on the clamping fulcrum CP may be in a specific range. If the above-mentioned clamping coefficient is too large, the clamping force may be too large during wearing, the ear 100 of the user may feel a strong pressure, and a wearing position may be difficult to adjust after wearing. Besides, the upper side US of the sound production component 11 may be attached to the upper edge of the concha cavity 102, and the gap between the sound production component 11 and the concha cavity 102 may be too small (or the count of the gaps may be too small), resulting in a poor sound leakage reduction effect. If the aforementioned clamping coefficient is too small, the wearing of the ear hook 12 may not be stable enough, the sound production component 11 may be easily separated from the auricle, and the gap between the sound production component 11 and the concha cavity 102 may be too large, i.e., the opening of the formed quasi-cavity may be too large, resulting in a smaller listening index. In some embodiments, to meet the wearing requirements, the value of the clamping coefficient of the ear hook 12 based on the clamping fulcrum CP may be within a range of 10 N/m-30 N/m. In some embodiments, to increase the adjustability after wearing, the value of the clamping coefficient of the ear hook 12 based on the clamping fulcrum CP may be within a range of 11

N/m-26 N/m. In some embodiments, to increase the stability after wearing, the value of the clamping coefficient of the ear hook 12 based on the clamping fulcrum CP may be within a range of 15 N/m-25 N/m. In some embodiments, to make the headphone have a better listening index in the wearing state, the value of the clamping coefficient of the ear hook 12 based on the clamping fulcrum CP may be within a range of 17 N/m-24 N/m. In some embodiments, to further improve the sound leakage reduction effect, the value of the clamping coefficient of the ear hook 12 based on the clamping fulcrum CP may be within a range of 18 N/m-23 N/m. The clamping coefficient of the ear hook 12 based on the clamping fulcrum CP may reflect a degree of difficulty in stretching the sound production component 11 away from the ear hook 12. In some embodiments, the clamping coefficient of the ear hook 12 based on the clamping fulcrum CP may be expressed as, in the wearing state, a relationship between a distance between the sound production component 11 and the ear hook 12 and a force generated by the ear hook 12 that drives the sound production component 11 to close to the first portion of the ear hook. It should be noted that the distance between the sound production component 11 and the ear hook 12 may be a change in the distance between the sound production component 11 and the ear hook 12 in the long axis direction Y of the sound production component from the non-wearing state to the wearing state. The value of the clamping coefficient of the ear hook 12 based on the clamping fulcrum CP may be determined by an exemplary process below, the ear hook 12 may be equivalent to a spring, and a specific relationship between a stretching distance of the spring and the clamping force is shown in Equation (1):

$$F = kx \tag{1}$$

where F represents the clamping force, k represents the clamping coefficient, and x represents the stretching distance.

Based on the above Equation (1), the clamping coefficient may be determined by the following process. Clamping forces corresponding to different stretching distances may be measured by a tension meter, and at least one set of clamping force and stretching distance may be determined. At least one intermediate clamping coefficient may be determined by substituting at least one set of clamping force and corresponding stretching distance into Equation (1). An average value of the at least one intermediate clamping coefficient may then be calculated and designated as the clamping coefficient. Alternatively, the clamping force may be determined by measuring a clamping force for stretching the distance in a normal wearing state by the tension meter. The clamping coefficient may be determined by substituting the clamping force and the stretching distance into Equation (1).

In some embodiments, after the clamping coefficient of the clamping fulcrum CP is determined, in the non-wearing state, an included angle between a first connection line from the center CC of the clamping region to the clamping fulcrum CP and a second connection line from the ear hook clamping point EP to the clamping fulcrum CP may keep in a specific range, so that the headphone may provide a suitable clamping force to the ear 100 in the wearing state, and make the sound production component 11 be located at the expected position in the concha cavity 102. When the clamping coefficient of the clamping fulcrum CP and the shape and the size of the sound production component 11 are constant, if the aforementioned included angle is too large, the ear hook 12 may not be effectively clamped on both sides of the ear 100 after wearing, the gap between the sound production component 11 and the concha cavity 102 may be too large, i.e., the opening of the formed quasi-cavity may be too large, resulting in a smaller listening index. When the clamping coefficient of the clamping fulcrum CP and the shape and the size of the sound production component 11 are constant, if the aforementioned included angle is too small, a difference between the included angle between the connection lines in the wearing state and the angle between the connection lines in the non-wearing state may be too large, then the clamping force of the ear hook 12 to the ear 100 in the wearing state may be too large, causing the headphone 10 to exert strong pressure on the ear 100 of the user in the wearing state, and making it difficult to adjust the wearing position after wearing. Besides, the sidewall of the sound production component 11 may be attached to the upper edge of the concha cavity 102, and the gap between the sidewall of the sound production component 11 and the concha cavity 102 may be too small (or the count of the gaps may be too small), resulting in a poor sound leakage reduction effect. In some embodiments, in order to meet the wearing requirements, in the non-wearing state, the included angle between the first connection line from the center CC of the clamping region to the clamping fulcrum CP and the second connection line from the ear hook clamping point EP to the clamping fulcrum CP may be within a range of 3°-9°. In some embodiments, in order to increase the adjustability after wearing, in the non-wearing state, the included angle between the first connection line from the center CC of the clamping region to the clamping fulcrum CP and the second connection line from the ear hook clamping point EP to the clamping fulcrum CP may be within a range of 3.1°-8.4°. In some embodiments, in order to increase the stability after wearing, in the non-wearing state, the included angle between the first connection line from the center CC of the clamping region to the clamping fulcrum CP and the second connection line from the ear hook clamping point EP to the clamping fulcrum CP may be within a range of 3.8°-8°. In some embodiments, in order to make the headphone have a better listening index in the wearing state, in the non-wearing state, the included angle between the first connection line from the center CC of the clamping region to the clamping fulcrum CP and the second connection line from the ear hook clamping point EP to the clamping fulcrum CP may be within a range of 4.5°-7.9°. In some embodiments, in order to further improve the sound leakage reduction effect, the included angle between the first connection line from the center CC of the clamping region to the clamping fulcrum CP and the second connection line from the ear hook clamping point EP to the clamping fulcrum CP may be within a range of 4.6°-7°.

In some embodiments, when the clamping coefficient of the clamping fulcrum CP and the shape and the size of the headphone 10 are constant, in the wearing state, the included angle between the first connection line from the center CC of the clamping region to the clamping fulcrum CP and the second connection line from the ear hook clamping point EP to the clamping fulcrum CP may keep in a specific range, so as to provide a suitable clamping force to the ear 100, and make the sound production component 11 be located at the expected position in the concha cavity 102. When the clamping coefficient of the clamping fulcrum CP and the shape and the size of the headphone 10 are constant, if the aforementioned angle is too small, the headphone 10 may exert a strong pressure on the ear 100 of the user in the wearing state, and make it difficult to adjust the wearing position after wearing. Besides, the sidewall of the sound production component 11 may be attached to the upper edge of the concha cavity 102, and the gap between the sidewall of the sound production component 11 and the concha cavity 102 may be too small (or the count of the gaps may be too small), resulting in a poor sound leakage reduction effect. When the clamping coefficient of the clamping fulcrum CP and the shape and the size of the headphone 10 are constant, if the aforementioned included angle is too large, the ear hook 12 may not be effectively clamped on both sides of the ear 100 after wearing, and the gap between the sound production component 11 and the concha cavity 102 may be too large, i.e., the opening of the formed quasi-cavity may be too large, resulting in a smaller listening index. In some embodiments, in order to meet the wearing requirements, in the wearing state, the included angle between the first connection line from the center CC of the clamping region to the clamping fulcrum CP and the second connection line from the ear hook clamping point EP to the clamping fulcrum CP may be within a range of 6°-12°. In some embodiments, in order to increase adjustability after wearing, in the wearing state, the included angle between the first connection line from the center CC of the clamping region to the clamping fulcrum CP and the second connection line from the ear hook clamping point EP to the clamping fulcrum CP may be within a range of 6.3°-10.8°. In some embodiments, in order to increase the stability after wearing, in the wearing state, the included angle between the first connection line from the center CC of the clamping region to the clamping fulcrum CP and the second connection line from the ear hook clamping point EP to the clamping fulcrum CP may be within a range of 7°-10.5°. In some embodiments, in order to make the headphone have a better listening index in the wearing state, in the wearing state, the included angle between the first connection line from the center CC of the clamping region to the clamping fulcrum CP and the second connection line from the ear hook clamping point EP to the clamping fulcrum CP may be within a range of 7.3°-10°. In some embodiments, in order to further improve the sound leakage reduction effect, in the wearing state, the included angle between the first connection line from the center CC of the clamping region to the clamping fulcrum CP and the second connection line from the ear hook clamping point EP to the clamping fulcrum CP may be within a range of 8°-9.8°.

In some embodiments, the headphone 10 may include the wearing state and the non-wearing state, and a difference between the included angle between the connection lines in the wearing state and the included angle between the connection lines in the non-wearing state may keep within a specific range. It should be noted that the included angle between the connection lines in the wearing state may be the included angle between the first connection line from the center CC of the clamping region to the clamping fulcrum CP and the second connection line from the ear hook clamping point EP to the clamping fulcrum CP in the wearing state; and the included angle between the connection lines in the non-wearing state may be the included angle between the first connection line from the center CC of the clamping region to the clamping fulcrum CP and the second connection line from the ear hook clamping point EP to the clamping fulcrum CP in the non-wearing state. When the clamping coefficient of the clamping fulcrum CP is constant, if the aforementioned difference is too small, the clamping force may be too small, the ear hook may not be effectively clamped on both sides of the ear 100 after wearing, and the gap between the sound production component 11 and the concha cavity 102 may be too large, i.e., the opening of the formed quasi-cavity may be too large, resulting in a smaller listening index. When the clamping coefficient of the clamping fulcrum CP is constant, if the above-mentioned difference is too large, the clamping force may be too large, the headphone 10 may exert a strong pressure on the ear 100 of the user in the wearing state, and make it difficult to adjust the wearing position after wearing. Besides, the sidewall of the sound production component 11 may be attached to the upper edge of the concha cavity 102, and the gap between the sidewall of the sound production component 11 and the concha cavity 102 may be too small (or the count of the gap may be too small), resulting in a poor sound leakage reduction effect. In some embodiments, in order to meet the wearing requirements, the difference between the included angle between the connection lines in the wearing state and the included angle between the connection lines in the non-wearing state may be within a range of 2°-4°. In some embodiments, in order to increase the adjustability after wearing, the difference between the included angle between the connection lines in the wearing state and the included angle between the connection lines in the non-wearing state may be within a range of 2.1°-3.8°. In some embodiments, in order to increase stability after wearing, the difference between the included angle between the connection lines in the wearing state and the included angle between the connection lines in the non-wearing state may be within a range of 2.3°-3.7°. In some embodiments, in order to make the headphone have a better listening index in the wearing state, the difference between the included angle between the connection lines in the wearing state and the included angle between the connection lines in the non-wearing state may be within a range of 2.5°-3.6°. In some embodiments, in order to further improve the sound leakage reduction effect, the difference between the included angle between the connection lines in the wearing state and the included angle between the connection lines in the non-wearing state may be within a range of 2.6°-3.4°.

Figure 14:
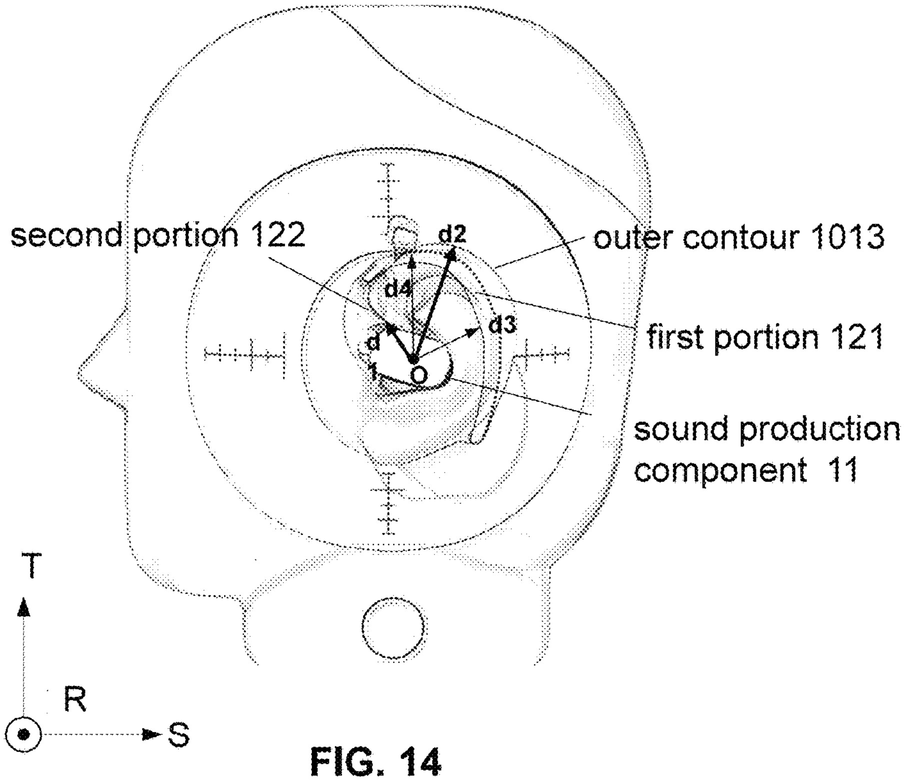
FIG. 14 is a schematic diagram illustrating an exemplary wearing state of a headphone according to some embodiments of the present disclosure.

When the user wears the headphone, the ear hook needs to be located at a connection region between the rear inner side of the auricle and the head, so that the ear hook and the sound production component may clamp the ear, which may in turn provide the clamping force when wearing the headphone. Considering that the ear hook may not fit perfectly in the connection region between the rear inner side of the auricle and the head, there is a certain difference in a positional relationship of the sound production component relative to the auricle and a positional relationship of the sound production component relative to the ear hook (in particular, the first portion of the ear hook). This allows the headphone to be worn on the ear of the user more stably. The positional relationship of the sound production component relative to the auricle may be reflected by a distance between a centroid of a first projection and a contour of a second projection; the positional relationship of the sound production component relative to the first portion of the ear hook may be reflected by a distance between a centroid of the first projection and a projection of the first portion of the ear hook on a sagittal plane. More descriptions can be found in FIG. 14 and related descriptions thereof. FIG. 14 is a schematic diagram illustrating an exemplary wearing state of a headphone according to some embodiments of the present disclosure.

Referring to FIG. 3 and FIG. 14, when the user wears the headphone 10 and the sound production component 11 is inserted into the concha cavity, the centroid O of the first projection may be located in a region enclosed by the contour of the second projection. The contour of the second projection may be understood as projections of contours including an outer contour of a helix of the user, an earlobe contour, a tragus contour, an intertragic notch, an antitragus tip, a notch between the antitragus and the anthelix, etc. on the sagittal plane. In some embodiments, a listening volume of the sound production component, a sound leakage reduction effect, and wearing comfort and stability may be improved by adjusting the distance between the centroid O of the first projection and the contour of the second projection. For example, when the sound production component 11 is located at a top of the auricle, an earlobe, a facial region on the front side of the auricle, or between the inner contour 1014 of the auricle and the outer edge of the concha cavity, a distance between the centroid O of the first projection and a point of a certain region of the contour of the second projection is too small, a distance between the centroid O of the first projection and a point of another region of the contour of the second projection is too large, and the sound production component may not form a quasi-cavity structure (an acoustic model in FIG. 4) with the concha cavity, affecting the acoustic output effect of the headphone 10. In order to ensure the acoustic output quality when the user wears the headphone 10, in some embodiments, the distance between the centroid O of the first projection and the contour of the second projection may be within a range of 10 mm-52 mm, i.e., the distance between the centroid O of the first projection and any point of the contour of the second projection may be within a range of 10 mm-52 mm. In some embodiments, in order to further improve the wearing comfort of the headphone 10 and optimize the quasi-cavity structure formed by the sound production component 11 and the concha cavity, the distance between the centroid O of the first projection and the contour of the second projection may be within a range of 12 mm-50.5 mm. In some embodiments, the distance between the centroid O of the first projection and the contour of the second projection may also be within a range of 13.5 mm-50.5 mm. In some embodiments, by controlling the distance between the centroid O of the first projection and the contour of the second projection to be within a range of 10 mm-52 mm, most portion of the sound production component 11 may be located near the ear canal of the user, and at least a portion of the sound production component may be inserted into the concha cavity of the user to form the acoustic model in FIG. 4, thereby ensuring that the sound output by the sound production component 11 may be better transmitted to the user. For example, in some embodiments, a minimum distance d1 between the centroid O of the first projection and the contour of the second projection may be 20 mm, and a maximum distance d2 between the centroid O of the first projection and the contour of the second projection may be 48.5 mm.

In some embodiments, if the distance between the centroid O of the first projection and a point of a certain region of the contour of the second projection is too small, and a distance between the centroid O of the first projection and a point of another region of the contour of the second projection is too large, the antihelix region may not cooperate with the sound production component 11 to act as a baffle, affecting the acoustic output effect of the headphone. In addition, if the distance between the centroid O of the first projection and the point of the certain region of the edge of the second projection is too large, a gap may be formed between the end FE of the sound production component 11 and the inner contour 1014 of the auricle, and the sound emitted from a sound guiding hole and the sound emitted from a pressure relief hole may produce an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In some embodiments, when the wearing state of the headphone 10 is that at least a portion of the sound production component 11 covers the antihelix region of the user, the centroid O of the first projection of the sound production component 11 on the sagittal plane of the head of the user may also be located in a region enclosed by the contour of the second projection, but compared with the wearing state in which at least a portion of the sound production component 11 inserted into the concha cavity of the user, in the wearing state, the distance between the centroid O of the first projection of the sound production component 11 on the sagittal plane of the head of the user and the contour of the second projection may be different. In the headphones in FIGS. 16-24, at least a portion of the structure of the sound production component 11 may cover the antihelix region, which may fully expose the opening of the ear canal, and make the user better receive sounds from the external environment. In some embodiments, in order to consider the listening volume of the sound production component 11, the sound leakage reduction effect, the effect of receiving the sound of the external environment, and reducing the region between the end FE of the sound production component 11 and the inner contour 1014 of the auricle as much as possible in the wearing state in which the at least a portion of the structure of the sound production component 11 covers the antihelix region, to make the sound production component 11 have better acoustic output quality, the distance between the centroid O of the first projection and the contour of the second projection may be within a range of 13 mm-54 mm. In some embodiments, the distance between the centroid O of the first projection and the contour of the second projection may be within a range of 18 mm-50 mm. In some embodiments, the distance between the centroid O of the first projection and the contour of the second projection may be within a range of 20 mm-45 mm. In some embodiments, by controlling the distance between the centroid O of the first projection of the sound production component 11 on the sagittal plane of the head of the user and the contour of the second projection to be within a range of 23 mm-40 mm, the sound production component 11 may be roughly located in the antihelix region of the user. Besides, at least a portion of the sound production component 11 may form the baffle with the antihelix region, to increase the sound path of the sound emitted from the pressure relief hole to the external ear canal 101, thereby increasing the sound path difference from the sound guiding hole and the pressure relief hole to the external ear canal 101, increasing the sound intensity at the external ear canal 101, and reducing the volume of far-field sound leakage.

In some embodiments, considering that when the user wears the headphone 10, if a distance between the centroid O of the first projection and a projection of the first portion 121 of the ear hook on the sagittal plane is too large, it may cause unstable wearing (at this time, an effective clamping of the ear may not be formed between the sound production component 11 and the ear hook) and the problem that the sound production component 11 may not be effectively inserted into the concha cavity. If the distance is too small, it may affect the relative position of the sound production component to the concha cavity of the user and the opening of the ear canal, and may also cause the sound production component 11 or the ear hook to press the ear, resulting in poor wearing comfort. Accordingly, in order to avoid the problems, in some embodiments, the distance between the centroid O of the first projection and the projection of the first portion 121 of the ear hook on the sagittal plane may be within a range of 18 mm-43 mm. By controlling the distance to be within the range of 18 mm-43 mm, the ear hook may fit the ear of the user better, the sound production component 11 may be ensured to be just located at the concha cavity of the user, and the acoustic model in FIG. 4 may be formed, thereby ensuring that the sound output by the sound production component 11 may be better transmitted to the user. In addition, in a certain direction along the sagittal plane, the distance between the centroid O of the first projection and the projection of the first portion 121 of the ear hook on the sagittal plane may be slightly smaller than the distance between the centroid O of the first projection and the contour of the second projection. In such cases, the first portion of the ear hook may be made to be hung at the connection region between the rear inner side of the auricle and the head so that the ear hook and the sound production component may clamp the ear to produce a clamping force when wearing, ensuring the stability when the user wears the headphone. In some embodiments, the distance between the centroid O of the first projection and the projection of the first portion 121 of the ear hook on the sagittal plane may be within the range of 20 mm-41 mm, at which time the first portion 121 of the ear hook may better fit the connection region between the rear inner side of the ear and the head to further improve the wearing stability of the headphone. In some embodiments, the distance between the centroid O of the first projection and the projection of the first portion 121 of the ear hook on the sagittal plane may be within a range of 22 mm-40.5 mm. For example, the minimum distance d3 between the projection of the centroid O of the first projection on the sagittal plane of the user and the projection of the first portion 121 of the ear hook on the sagittal plane may be 21 mm, and the maximum distance d4 between the projection of the centroid O of the first projection on the sagittal plane of the user and the projection of the first portion 121 of the ear hook on the sagittal plane may be 41.2 mm.

In some embodiments, due to the elasticity of the ear hook, the distance between the sound production component 11 and the ear hook may vary (usually the distance in the non-wearing state may be smaller than that in the wearing state) in the wearing state and the non-wearing state. For example, in some embodiments, when the headphone 10 is not worn, a distance between a centroid of a projection of the sound production component 11 on a specific reference plane and a centroid of a projection of the first portion 121 of the ear hook on the specific reference plane may be within a range of 15 mm-38 mm. In some embodiments, when the headphone 100 is not worn, the distance between the centroid of the projection of the sound production component 11 on the specific reference plane and the centroid of the projection of the first portion 121 of the ear hook on the specific reference plane may be within a range of 16 mm-36 mm.

In some embodiments, in order to avoid that the distance between the centroid O of the first projection and the projection of the first portion 121 of the ear hook on the sagittal plane is too large to cause unstable wearing and the problem that the region between the end FE of the sound production component 11 and the inner contour 1014 of the auricle is relatively large, and avoid that the distance between the centroid O of the first projection and the projection of the first portion 121 of the ear hook 12 on the sagittal plane is too small to cause poor wearing comfort and be unable to match with the antihelix region to achieve relatively good acoustic output quality, the distance between the centroid O of the first projection of the sound production component 11 on the sagittal plane of the user and the first portion 121 of the ear hook on the sagittal plane may be controlled to be within 8 mm-45 mm. It may be understood that by controlling the distance to be within the range of 8 mm-45 mm, the first portion 121 of the ear hook may fit well with the rear inner side of the auricle of the user when wearing the headphone, and the sound production component 11 may be ensured to be just located in on the antihelix region of the user to make the sound production component 11 form the baffle with the antihelix region and increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage. In addition, the distance between the centroid O of the first projection of the sound production component 11 on the sagittal plane of the user and the projection of the first portion 121 of the ear hook on the sagittal plane may be controlled to be within the range of 8 mm-45 mm, which may make the region between the end FE of the sound production component 11 and the inner contour 1014 of the auricle minimized to reduce the acoustic short circuit region around the sound production component 11, thereby increasing the listening volume at the opening of the ear canal of the user. In some embodiments, in order to further improve the wearing stability of the headphone, in some embodiments, the distance between the centroid O of the first projection of the sound production component 11 on the sagittal plane of the user and the first portion 121 of the ear hook on the sagittal plane may be within a range of 10 mm-41 mm. In some embodiments, the distance between the centroid O of the first projection of the sound production component 11 on the sagittal plane of the user and the first portion 121 of the ear hook on the sagittal plane may be within a range of 13 mm-37 mm. In some embodiments, the distance between the centroid O of the first projection of the sound production component 11 on the sagittal plane of the user and the first portion 121 of the ear hook on the sagittal plane may be within a range of 15 mm-33 mm. In some embodiments, the distance between the centroid O of the first projection of the sound production component 11 on the sagittal plane of the user and the first portion 121 of the ear hook on the sagittal plane may be within a range of 20 mm-25 mm.

In some embodiments, the ear hook 12 may be elastic, and may deform to a certain extent in the wearing state compared with the non-wearing state. For example, in some embodiments, the distance between the centroid O of the first projection of the sound production component 11 on the sagittal plane of the user and the first portion 121 of the ear hook on the sagittal plane in the wearing state may be greater than that in the non-wearing state. For example, in some embodiments, when the headphone 100 is in the non-wearing state, the distance between the centroid of the projection of the sound production component 11 on a specific reference plane and the first portion 121 of the ear hook on the specific reference plane may be within a range of 6 mm-40 mm. In some embodiments, the distance between the centroid of the projection of the sound production component 11 on the specific reference plane and the first portion 121 of the ear hook on the specific reference plane may be within a range of 9 mm-32 mm. It may be understood that in some embodiments, by making the distance between the centroid of the projection of the sound production component 11 on the specific reference plane and the first portion 121 of the ear hook on the specific reference plane in the non-wearing state slightly smaller than that in the wearing state, when the headphone 10 is in the wearing state, the ear hook and the sound production component may produce a certain clamping force on the ear of the user to improve the wearing stability for the user without affecting the wearing experience of the user.

In some embodiments, the distance between the centroid of the projection of the sound production component on the specific reference plane and the centroid of the projection of the first portion 121 of the ear hook on the specific reference plane may be slightly smaller in the non-wearing state than in the wearing state, so that when the headphone 100 is in the wearing state, the ear hook may produce a certain clamping force on the ear of the user, thereby improving the wearing stability for the user without affecting the wearing experience of the user. In some embodiments, the specific reference plane may be the sagittal plane. At this time, in the non-wearing state, the centroid of the projection of the sound production component on the sagittal plane may be regarded as the centroid of the projection of the sound production component on the specific reference plane. For example, the non-wearing state may be represented by removing the auricle structure from a human head model and fixing the sound production component on the human head model in the same posture as the wearing state by using a fixing component or adhesive. In some embodiments, the specific reference plane may be a plane of the ear hook. An ear hook structure may be an arc structure. The plane of the ear hook may be a plane formed by three most protruding points on the ear hook, i.e., the plane that supports the ear hook when the ear hook is placed freely (i.e., not subject to external force). For example, when the ear hook is freely placed on a horizontal plane, the horizontal plane may support the ear hook, and the horizontal plane may be regarded as the plane of the ear hook. In other embodiments, the plane of the ear hook also refers to a plane formed by a bisector that bisects or roughly bisects the ear hook along a length extension direction of the ear hook. In the wearing state, although the plane of the ear hook has a certain angle relative to the sagittal plane, the ear hook may be approximately regarded as fitting the head at this time, and thus the angle is very small. For the convenience of calculation and description, it may also be possible to use the plane of the ear hook as the specific reference plane instead of the sagittal plane.

Figure 15:
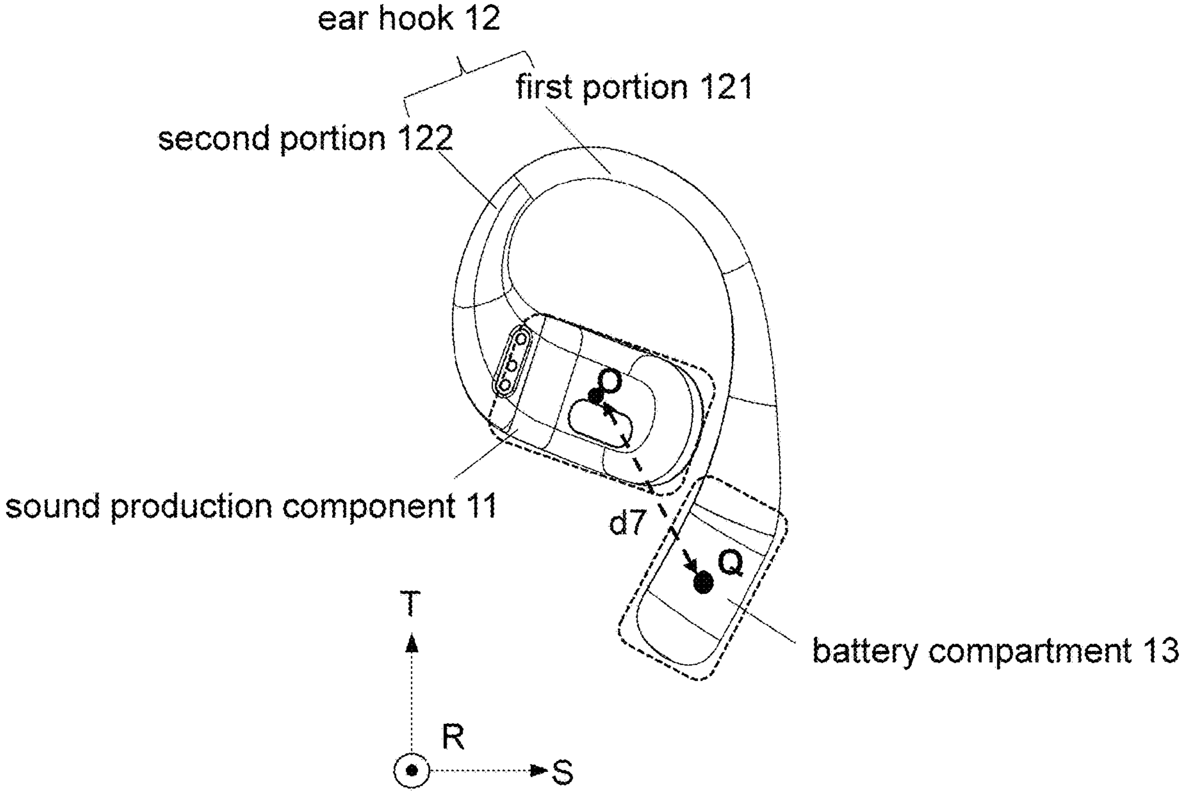
FIG. 15 is a schematic diagram illustrating an exemplary structure of a headphone according to some embodiments of the present disclosure.
Figure 16:
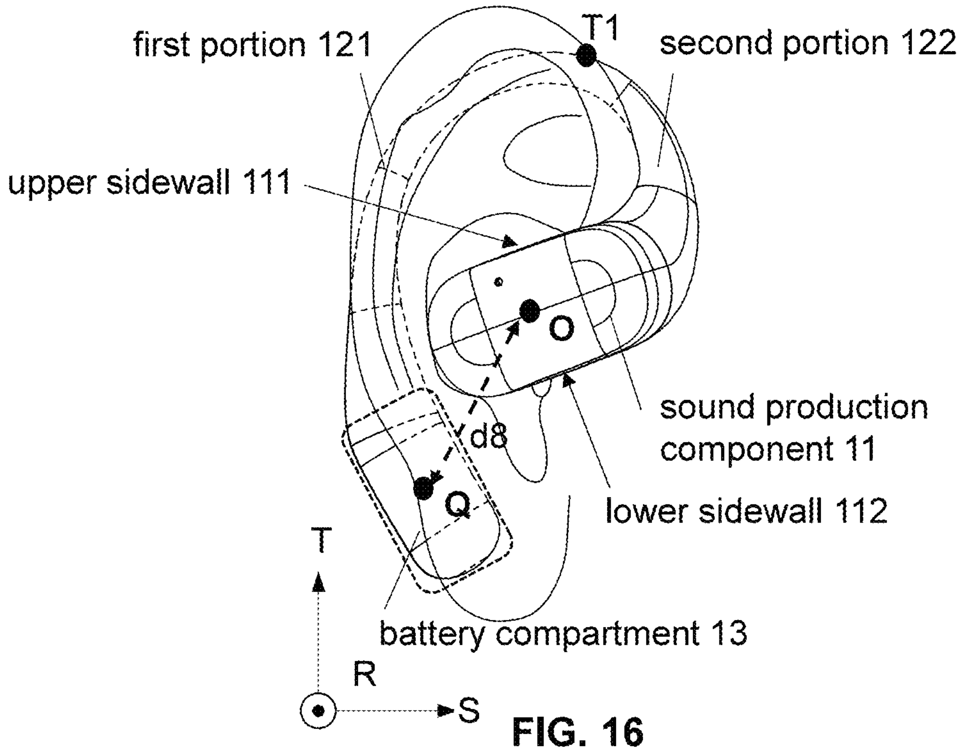
FIG. 16 is a schematic diagram illustrating a headphone worn by a user according to some embodiments of the present disclosure.
Figure 17:
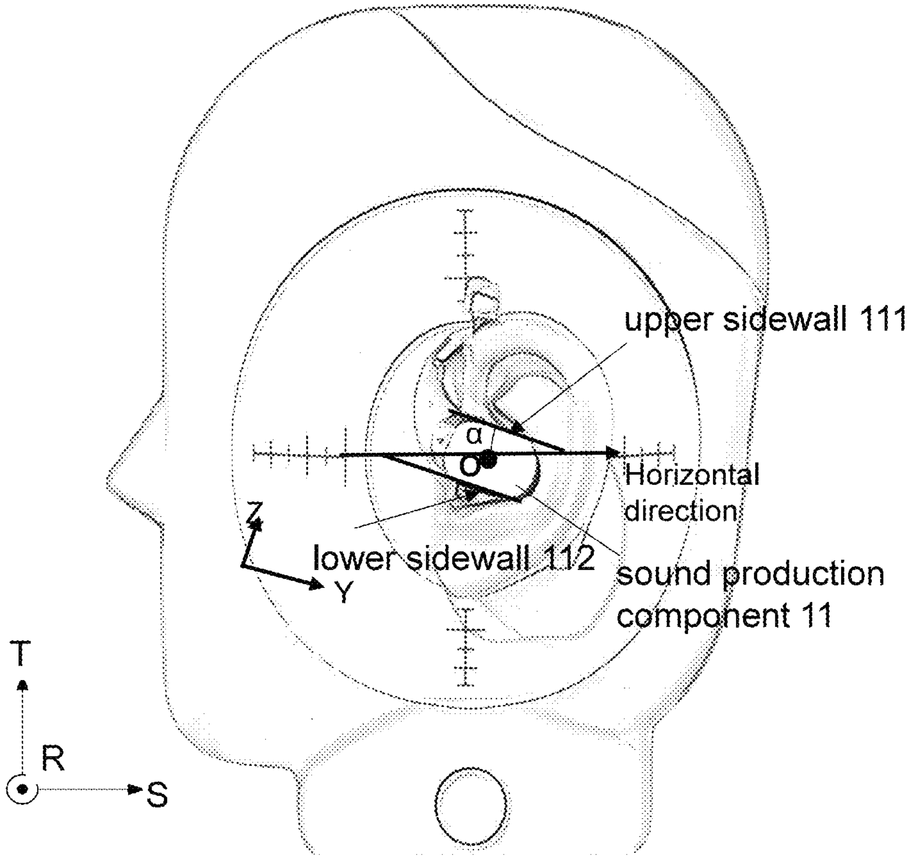
FIG. 17 is a schematic diagram illustrating another exemplary wearing state of a headphone according to some embodiments of the present disclosure.

FIG. 15 is a schematic diagram illustrating an exemplary structure of a headphone according to some embodiments of the present disclosure. As shown in FIG. 15 and FIG. 16, the headphone 10 may include a suspension structure 12, a sound production component 11, and a battery compartment 13, wherein the sound production component 11 and the battery compartment 13 may be respectively located at two ends of the suspension structure 12. In some embodiments, the suspension structure 12 may be the ear hook in FIG. 15 or FIG. 16. The ear hook may include a first portion 121 and a second portion 122 connected in sequence. The first portion 121 may be configured to be hung between the rear inner side of the auricle of the user and the head of the user, and extend toward the neck along the rear inner side of the auricle. The second portion 122 may extend to the front outer side of the auricle and connect the sound production component 11 to place the sound production component 11 at a position close to the ear canal without blocking the opening of the ear canal. An end of the first portion 121 away from the sound production component 11 may be connected to the battery compartment 13, and a battery electrically connected to the sound production component 11 may be arranged in the battery compartment 3. In some embodiments, the ear hook may be an arc structure adapted to a connection part between the auricle and the head. When the user wears the headphone 10, the sound production component 11 and the battery compartment 13 may be respectively located on the front outer side and the rear inner side of the auricle. The sound production component 11 may extend toward the first portion 121 of the ear hook, and the whole or a portion of the structure of the sound production component 11 may be inserted into the concha cavity and cooperate with the concha cavity to form a quasi-cavity structure. When the size (length) of the first portion 121 in an extension direction of the first portion 121 is too small, the battery compartment 13 may be near the top of the auricle of the user, then the first portion 121 and the second portion 122 may not provide sufficient contact area to the ear or the head for the headphone 10, causing the headphone 10 to fall off easily from the ear. Therefore, the length of the first portion 121 of the ear hook may be long enough to ensure that the ear hook may provide sufficient contact area to the ear or the head, thereby increasing the resistance preventing the acoustic device from falling off from the human ear or the head. In addition, when the distance between the end of the sound production component 11 and the first portion 121 of the ear hook is too large, the battery compartment 13 may be away from the auricle in the wearing state, which may not provide sufficient clamping force for the headphone, and the headphone may be liable to fall off. When the distance between the end of the sound production component 11 and the first portion 121 of the ear hook is too small, the battery compartment 13 or the sound production component 11 may squeeze the auricle, which may affect the wearing comfort when the user wears the headphone for a long time. Taking the user wearing the headphone as an example, the length of the first portion 121 of the ear hook in the extension direction and a distance between the end of the sound production component 11 and the first portion 121 may be represented by a distance between the centroid O of the projection (i.e., the first projection) of the sound production component 11 on the sagittal plane and a centroid Q of the projection of the battery compartment 13 on the sagittal plane. In order to ensure that the ear hook may provide a large enough contact area to the ear or the head, the distance of the centroid Q of the projection of the battery compartment 13 on the sagittal plane relative to the horizontal plane (e.g., the ground plane) may be smaller than a distance of the centroid O of the projection of the sound production component 11 on the sagittal plane relative to the horizontal plane, i.e., in the wearing state, the centroid Q of the projection of the battery compartment 13 on the sagittal plane may be located below the centroid O of the projection of the sound production component 11 on the sagittal plane. In the wearing state, the portion or whole position of the sound production component 11 may extend into the concha cavity, and the position of the sound production component 11 may be relatively fixed. If the distance between the centroid O of the projection of the sound production component 11 on the sagittal plane and the centroid Q of the projection of the battery compartment 13 on the sagittal plane is too small, the battery compartment 13 may be tightly attached to or even press against the rear inner side of the auricle, which may affect the wearing comfort of the user. If the distance between the centroid O of the projection of the sound production component 11 on the sagittal plane and the centroid Q of the projection of the battery compartment 13 on the sagittal plane is too large, the length of the first portion 121 of the ear hook may also be relatively long, causing the user to feel that the part of headphone located on the rear inner side of the auricle is heavy or the position of the battery compartment 13 relative to the auricle is far away when wearing the headphone, the headphone being prone to fall off during exercise of the user, thereby affecting the wearing comfort of the user and the wearing stability of the headphone. In order to make the user have better stability and comfort when wearing the headphone 10, in the wearing state, a fourth distance d8 between the centroid O of the projection of the sound production component 11 on the sagittal plane and the centroid Q of the projection of the battery compartment 13 on the sagittal plane may be within a range of 20 mm-30 mm. In some embodiments, the fourth distance d8 between the centroid O of the projection of the sound production component 11 on the sagittal plane and the centroid Q of the projection of the battery compartment 13 on the sagittal plane may be within a range of 22 mm-28 mm. In some embodiments, the fourth distance d8 between the centroid O of the projection of the sound production component 11 on the sagittal plane and the centroid Q of the projection of the battery compartment 13 on the sagittal plane may be within a range of 23 mm-26 mm. Due to the elasticity of the ear hook, the distance between the centroid O of the projection of the sound production component 11 on the sagittal plane and the centroid Q of the projection of the battery compartment 13 on the sagittal plane may vary in the wearing state and the non-wearing state of the headphone. In some embodiments, in the non-wearing state, a third distance d7 between the centroid of the projection of the sound production component 11 on a specific reference plane and the centroid of the projection of the battery compartment 13 on the specific reference plane may be within a range of 16.7 mm-25 mm. In some embodiments, in the non-wearing state, the third distance d7 between the centroid of the projection of the sound production component 11 on the specific reference plane and the centroid of the projection of the battery compartment 13 on the specific reference plane may be within a range of 18 mm-23 mm. In some embodiments, in the non-wearing state, the third distance d7 between the centroid of the projection of the sound production component 11 on the specific reference plane and the centroid of the projection of the battery compartment 13 on the specific reference plane may be within a range of 19.6 mm-21.8 mm. In some embodiments, the specific reference plane may be the sagittal plane of the human body or a plane of the ear hook. In some embodiments, the specific reference plane may be the sagittal plane. At this time, in the non-wearing state, the centroid of the projection of the sound production component on the sagittal plane may be regarded as the centroid of the projection of the sound production component on the specific reference plane, and the centroid of the projection of the battery compartment on the sagittal plane may be regarded as the centroid of the projection of the battery compartment on the specific reference plane. For example, the non-wearing state may be represented by removing the auricle structure from the human head model and fixing the sound production component on the human head model in the same posture as the wearing state using a fixing component or adhesive. In some embodiments, the specific reference plane may be the plane of the ear hook. The ear hook structure may be an arc structure. The plane of the ear hook may be a plane formed by three most protruding points on the ear hook, i.e., the plane that supports the ear hook when the ear hook is placed freely. For example, when the ear hook is placed on a horizontal plane, the horizontal plane may support the ear hook, and the horizontal plane may be regarded as the plane of the ear hook. In other embodiments, the plane of the ear hook also refers to a plane formed by a bisector that bisects or roughly bisects the ear hook along a length extension direction of the ear hook. In the wearing state, although the plane of the ear hook has a certain angle relative to the sagittal plane, the ear hook may be approximately regarded as fitting the head at this time, and thus the angle may be very small. For the convenience of calculation and description, it may also be possible to use the plane of the ear hook as the specific reference plane instead of the sagittal plane.

Taking the specific reference plane as the sagittal plane as an example, the distance between the centroid O of the projection of the sound production component 11 on the sagittal plane and the centroid Q of the projection of the battery compartment 13 on the sagittal plane may vary in the wearing state and the non-wearing state of the headphone 10. A variation value may reflect the softness of the ear hook. When the softness of the ear hook is too large, the overall structure and shape of the headphone 10 may be unstable, and may not provide strong support for the sound production component 11 and the battery compartment 13, the wearing stability may also be poor, and the headphone may be liable to fall off. Considering that the ear hook may be hung at the connection part between the auricle and the head, when the softness of the ear hook is too small, the headphone 10 may not be liable to deform. When the user wears the headphone, the ear hook may closely fit or even press against a region between the ears and the head, affecting wearing comfort. In order to make the user have better stability and comfort when wearing the headphone 10, in some embodiments, a ratio of a variation value of the distances between the centroid O of the projection of the sound production component 11 on the sagittal plane and the centroid Q of the projection of the battery compartment 13 on the sagittal plane in the wearing state and the non-wearing state of the headphone 10 to the distance between the centroid O of the projection of the sound production component 11 on the sagittal plane and the centroid Q of the projection of the battery compartment 13 on the sagittal plane in the non-wearing state of the headphone may be within a range of 0.3-0.8. In some embodiments, the ratio of the variation value of the distances between the centroid O of the projection of the sound production component 11 on the sagittal plane and the centroid Q of the projection of the battery compartment 13 on the sagittal plane in the wearing state and the non-wearing state of the headphone 10 to the distance between the centroid O of the projection of the sound production component 11 on the sagittal plane and the centroid Q of the projection of the battery compartment 13 on the sagittal plane in the non-wearing state of the headphone may be within a range of 0.45-0.68.

It should be noted that, more descriptions regarding the shape and the centroid Q of the projection of the battery compartment 13 on the sagittal plane may be found in the relevant descriptions of the shape and the centroid O of the projection of the sound production component 11 on the sagittal plane in the present disclosure. In addition, the battery compartment 13 and the first portion 121 of the ear hook may be mutually independent structures. The battery compartment 13 and the first portion 121 of the ear hook may be connected in an inserting mode, a clamping mode, etc. The projection of the battery compartment 13 on the sagittal plane may be obtained more accurately by using a splicing point or a splicing line between the battery compartment 13 and the first portion 121 when the projection of the battery compartment 13 is determined.

In some embodiments, the sound production component 11 may be a cuboid, quasi-cuboid, cylinder, ellipsoid, or other regular or irregular three-dimensional structures. When the sound production component 11 is inserted into the concha cavity, as the overall contour of the concha cavity is an irregular structure similar to an arc, the sound production component 11 may not completely cover or fit the contour of the cavity, thus a plurality of gaps may be formed. The overall size of the gaps may be approximately regarded as the opening S of the leakage structure in the quasi-cavity model in FIG. 6. A size of the portion of the sound production component 11 that fits or covers the contour of the concha cavity may be approximately regarded as an unperforated area S0 of the quasi-cavity structure in FIG. 6. As shown in FIG. 7, the larger the relative opening size S/S0, the smaller the listening index. As the larger the relative opening, the more sound components that the contained sound source radiates directly outward, and the less sound reaching the listening position, which causes the listening volume to decrease with the increase of the relative opening, which in turn leads to the decrease in the listening index. In some embodiments, while ensuring that the ear canal is not blocked, the size of the gaps formed between the sound production component 11 and the concha cavity may be as small as possible, the size of the baffle formed by the sound production component 11 and the antihelix region (especially the size along the long axis direction of the first projection) may be as large as possible, and the overall volume of the sound production component 11 may not be too large or too small. On the premise that the overall volume or shape of the sound production component 11 is constant, the wearing angle of the sound production component 11 relative to the auricle and the concha cavity may be considered. For example, when the sound production component 11 is a quasi-cuboid structure and the user wears the headphone 10, and an upper sidewall 111 (also referred to as an upper side) or a lower sidewall 112 (also referred to as a lower side) of the sound production component 11 is parallel or approximately parallel and vertically or approximately vertical (also be understood that a projection of the upper sidewall 111 or the lower sidewall 112 of the sound production component 11 on the sagittal plane is parallel or approximately parallel and vertically or approximately vertical to the sagittal axis) relative to the horizontal plane, a large gap may be formed when the whole or a portion of the sound production component 11 fits or covers of the concha cavity, which may affect the listening volume of the user. In order to make the whole or a portion of the sound production component 11 be inserted into the concha cavity, increase an area of the region of the concha cavity covered by the sound production component 11, reduce the size of the gap formed between the sound production component 11 and the edge of the concha cavity, and improve the listening volume at the opening of the ear canal, in some embodiments, an inclination angle α between a projection of the upper sidewall 111 or the lower sidewall 112 of the sound production component 11 on the sagittal plane and the horizontal direction may be within a range of 10°-28° in the wearing state of the headphone 10. In some embodiments, the inclination angle α between the projection of the upper sidewall 111 or the lower sidewall 112 of the sound production component 11 on the sagittal plane and the horizontal direction may be within a range of 13°-21° in the wearing state of the headphone 10. In some embodiments, the inclination angle α between the projection of the upper sidewall 111 or the lower sidewall 112 of the sound production component 11 on the sagittal plane and the horizontal direction may be within a range of 15°-19° in the wearing state of the headphone 10. It should be noted that the inclination angle between the projection of the upper sidewall 111 of the sound production component 11 on the sagittal plane and the horizontal direction and the inclination angle between the projection of the lower sidewall 112 of the sound production component 11 on the sagittal plane and the horizontal direction may be the same or different. For example, when the upper sidewall 111 is parallel to the lower sidewall 112 of the sound production component 11, the inclination angle between the projection of the upper sidewall 111 on the sagittal plane and the horizontal direction and the inclination angle between the projection of the lower sidewall 112 on the sagittal plane and the horizontal direction may be the same. As another example, when the upper sidewall 111 is not parallel to the lower sidewall 112 of the sound production component 11, or one of the upper sidewall 111 or the lower sidewall 112 is a planar wall, and the other of the upper sidewall 111 or the lower sidewall 112 is a non-planar wall (e.g., a curved wall), the inclination angle between the projection of the upper sidewall 111 on the sagittal plane and the horizontal direction and the inclination angle between the projection of the lower sidewall 112 on the sagittal plane and the horizontal direction may be different. In addition, when the upper sidewall 111 or the lower sidewall 112 is a curved surface, the projection of the upper sidewall 111 or the lower sidewall 112 on the sagittal plane may be a curved line or a broken line. At this time, the inclination angle between the projection of the upper sidewall 111 on the sagittal plane and the horizontal direction may be an included angle between a tangent line to a point at which the curved line or the broken line has the largest distance from a plane and the horizontal direction, and the inclination angle between the projection of the lower sidewall 111 on the sagittal plane and the horizontal direction may be an included angle between a tangent line to a point at which the curved line or the broken line has the smallest distance from the plane and the horizontal direction. In some embodiments, when the upper sidewall 111 or the lower sidewall 112 is the curved surface, a tangent line parallel to the long axis direction Y on the projection may also be selected, and an included angle between the tangent line and the horizontal direction may be used to represent the inclination angle between the projection of the upper sidewall 111 or the lower sidewall 112 on the sagittal plane and the horizontal direction.

It should be noted that one end of the sound production component 11 in the embodiments of the present disclosure may be connected to the second portion 122 of the suspension structure. The end may be referred to as a fixed end. An end of the sound production component 11 away from the fixed end may be referred to as a free end or an end. The end of the sound production component 11 may face the first portion 121 of the ear hook. In the wearing state, the suspension structure 12 (e.g., the ear hook) may have a vertex (e.g., vertex T1 in FIG. 10B), i.e., a position with the highest distance relative to the horizontal plane. The vertex T1 may be close to a connection part between the first portion 121 and the second portion 122. The upper sidewall may be a sidewall of the sound production component 11 (e.g., the upper sidewall 111 in FIG. 10B and FIG. 17) other than the fixed end and the end, and a center point (e.g., a geometric center point) of which has the least distance from an upper vertex of the ear hook (also referred to as the clamping fulcrum CP) in the vertical axis direction. Correspondingly, the lower sidewall may be a sidewall opposite to the upper sidewall of the sound production component 11, i.e., a sidewall of sound production component 11 (e.g., the lower sidewall 112 in FIG. 10B and FIG. 17) other than the fixed end and the end, and a center point (e.g., the geometric center point) of which has the largest distance from the upper vertex of the ear hook in the vertical axis direction.

Figure 18:
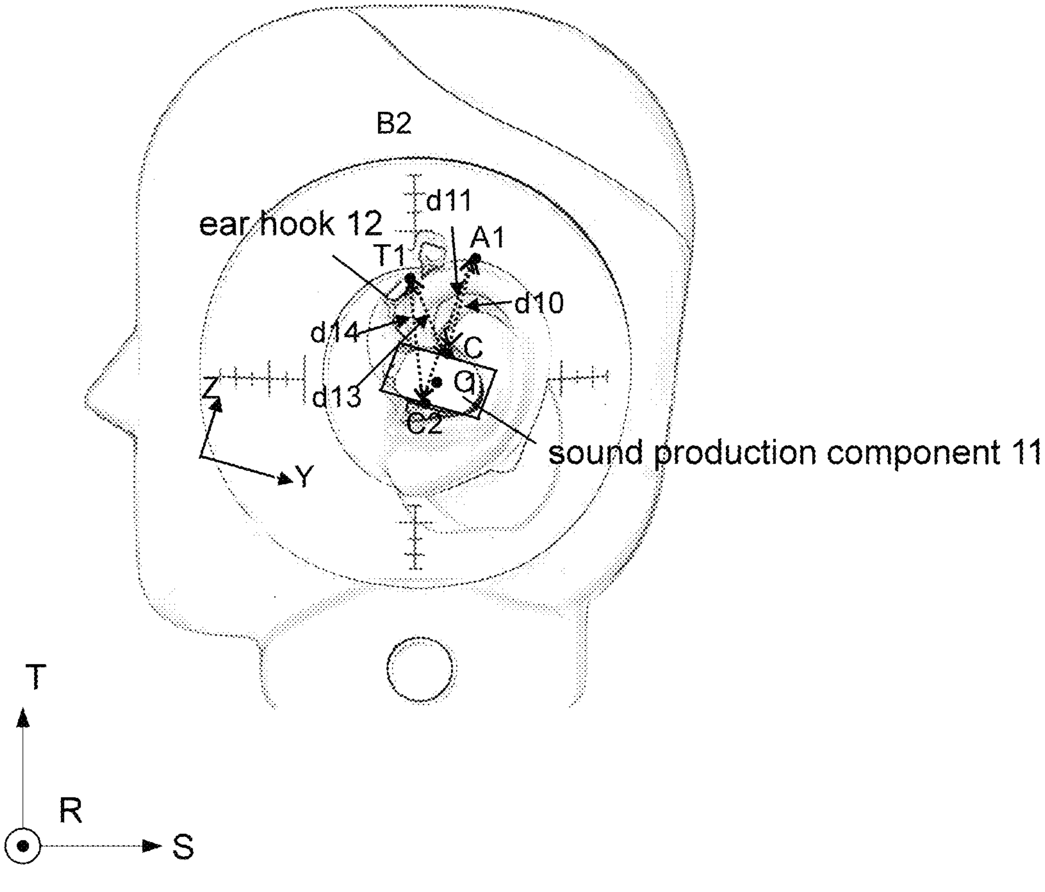
FIG. 18 is a schematic diagram illustrating another exemplary wearing state of a headphone according to some embodiments of the present disclosure.

The whole or a portion of the structure of the sound production component 11 may be inserted into the concha cavity to form the quasi-cavity structure as shown in FIG. 4. The listening volume when the user wears the headphone 10 may be related to the size of the gap formed between the sound production component 11 and the edge of the concha cavity. The smaller the size of the gap, the greater the listening volume at the opening of the ear canal of the user. The size of the gap formed between the sound production component 11 and the edge of the concha cavity may not only be related to the inclination angle between the projection of the upper sidewall 111 or the lower sidewall 112 of the sound production component 11 on the sagittal plane and the horizontal plane, but also be related to the size of the sound production component 11. For example, if the size of the sound production component 11 (especially the size along the short axis direction Z in FIG. 18) is too small, the gap formed between the sound production component 11 and the edge of the concha cavity may be too large, affecting the listening volume at the opening of the ear canal of the user. When the size of the sound production component 11 (especially the size along the short axis direction Z in FIG. 18) is too large, the sound production component 11 may have few parts extending into the concha cavity, or the sound production component 11 may completely cover the concha cavity. At this time, the opening of the ear canal may be equivalent to being blocked, the connection between the opening of the ear canal and the external environment may not be realized, and the original design intention of the headphone may not be achieved. In addition, the excessively large size of the sound production component 11 may affect the wearing comfort of the user and the convenience of carrying around. As shown in FIG. 18, in some embodiments, distances from midpoints of the projections of the upper sidewall 111 and the lower sidewall 112 of the sound production component 11 on the sagittal plane to the highest point of the second projection may reflect the size of the sound production component 11 along the short axis direction Z (the direction indicated by the arrow Z in FIG. 18) and a position of the sound production component 11 relative to the concha cavity. In order to improve the listening effect of the headphone 10 while ensuring that the headphone 10 does not block the opening of the ear canal of the user, in some embodiments, a distance d10 between a midpoint C1 of the projection of the upper sidewall 111 of the sound production component 11 on the sagittal plane and the highest point A1 of the second projection may be within a range of 20 mm-38 mm, and a distance d11 between a midpoint C2 of the projection of the lower sidewall 112 of the sound production component 11 on the sagittal plane and the highest point A1 of the second projection may be within a range of 32 mm-57 mm. In some embodiments, the distance d10 between the midpoint C1 of the projection of the upper sidewall 111 of the sound production component 11 on the sagittal plane and the highest point A1 of the second projection may be within a range of 24 mm-36 mm, and the distance d11 between the midpoint C2 of the projection of the lower sidewall 112 of the sound production component 11 on the sagittal plane and the highest point A1 of the second projection may be within a range of 36 mm-54 mm. In some embodiments, the distance between the midpoint C1 of the projection of the upper sidewall 111 of the sound production component 11 on the sagittal plane and the highest point A1 of the second projection may be within a range of 27 mm-34 mm, and the distance between the midpoint C2 of the projection of the lower sidewall 112 of the sound production component 11 on the sagittal plane and the highest point A1 of the second projection may be within a range of 38 mm-50 mm. It should be noted that, when the projection of the upper sidewall 111 of the sound production component 11 on the sagittal plane is the curved line or the broken line, the midpoint C1 of the projection of the upper sidewall 111 of the sound production component 11 on the sagittal plane may be selected by the following example. A line segment may be drawn by selecting two farthest points on the projection of the upper sidewall 111 on the sagittal plane along the long axis direction, a mid-perpendicular line may be drawn by selecting a midpoint on the line segment, and an interaction point of the mid-perpendicular line and the projection may be the midpoint of the projection of the upper sidewall 111 of the sound production component 11 on the sagittal plane. In some alternative embodiments, a point of the projection of the upper sidewall 111 on the sagittal plane with the smallest distance from the highest point of the second projection may be selected as the midpoint C1 of the projection of the upper sidewall 111 of the sound production component 11 on the sagittal plane. The midpoint of the projection of the lower sidewall 112 of the sound production component 11 on the sagittal plane may be selected in the same manner as above. For example, a point of the projection of the lower sidewall 112 on the sagittal plane with the largest distance from the highest point of the second projection may be selected as the midpoint C2 of the projection of the lower sidewall 112 of the sound production component 11 on the sagittal plane.

In some embodiments, the distances from the midpoints of the projection of the upper sidewall 111 and the lower sidewall 112 of the sound production component 11 on the sagittal plane to the projection of the upper vertex of the ear hook on the sagittal plane may reflect the size of the sound production component 11 along the short axis direction Z (the direction indicated by the arrow Z in FIG. 3). The upper vertex of the ear hook may be a position on the ear hook that has the largest distance relative to a specific point on the neck of the user in the vertical axis direction when the user wears the headphone, e.g., the vertex T1 in FIG. 8. In order to improve the listening effect of the headphone 10 while ensuring that the headphone 10 does not block the opening of the ear canal of the user, in some embodiments, a distance d13 between the midpoint C1 of the projection of the upper sidewall 111 of the sound production component 11 on the sagittal plane and the projection of the upper vertex T1 of the ear hook on the sagittal plane may be within a range of 17 mm-36 mm, and a distance d14 between the midpoint C2 of the projection of the lower sidewall 112 of the sound production component 11 on the sagittal plane and the projection of the upper vertex of the ear hook on the sagittal plane may be within a range of 28 mm-52 mm. In some embodiments, the distance d13 between the midpoint C1 of the projection of the upper sidewall 111 of the sound production component 11 on the sagittal plane and the projection of the upper vertex T1 of the ear hook on the sagittal plane may be within a range of 21 mm-32 mm, and the distance d14 between the midpoint C2 of the projection of the lower sidewall 112 of the sound production component 11 on the sagittal plane and the projection of the upper vertex T1 of the ear hook on the sagittal plane may be within a range of 32 mm-48 mm. In some embodiments, the distance d13 between the midpoint C1 of the projection of the upper sidewall 111 of the sound production component 11 on the sagittal plane and the projection of the upper vertex T1 of the ear hook on the sagittal plane may be within a range of 24 mm-30 mm, and the distance d14 between the midpoint C2 of the projection of the lower sidewall 112 of the sound production component 11 on the sagittal plane and the projection of the upper vertex T1 of the ear hook on the sagittal plane may be within a range of 35 mm-45 mm.

Figure 19A:
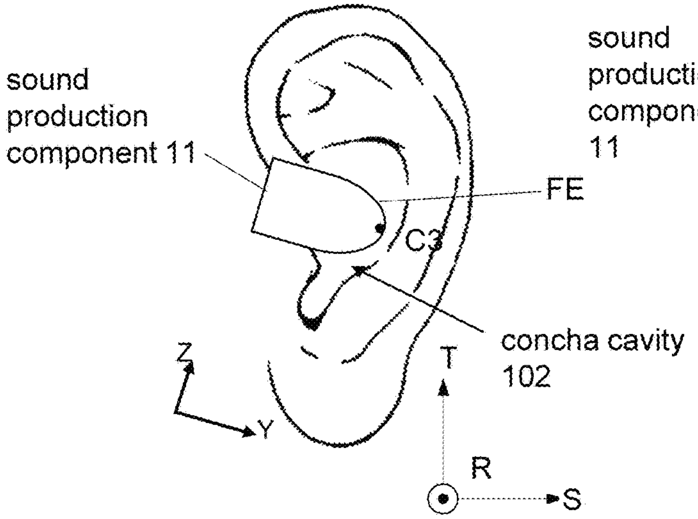
FIG. 19A is a schematic diagram illustrating an exemplary matching position between a headphone and an ear canal of a user according to some embodiments of the present disclosure.
Figure 19B:
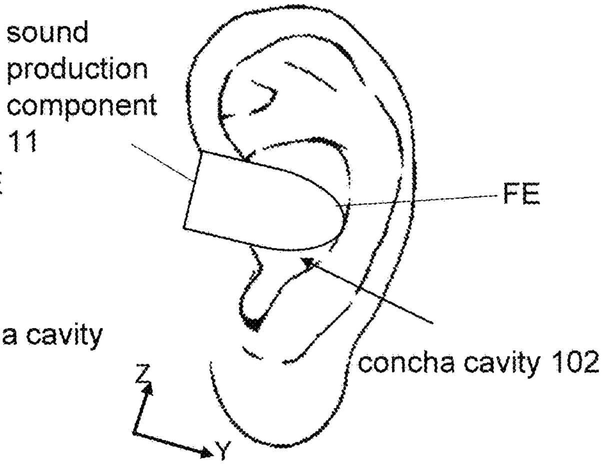
FIG. 19B is a schematic diagram illustrating another exemplary matching position between a headphone and an ear canal of a user according to some embodiments of the present disclosure.
Figure 19C:
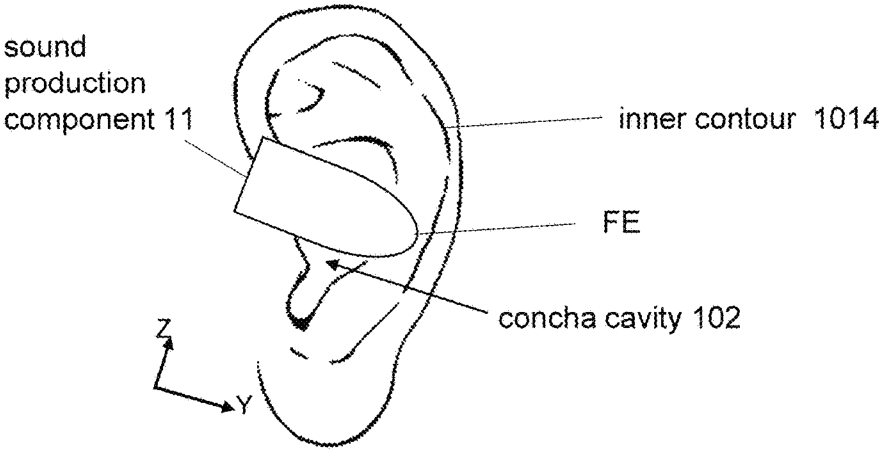
FIG. 19C is a schematic diagram illustrating another exemplary matching position between a headphone and an ear canal of a user according to some embodiments of the present disclosure.

FIG. 19A-FIG. 19C are schematic diagrams illustrating different exemplary matching positions between a headphone and an ear canal of a user according to some embodiments of the present disclosure.

Size of a gap formed between the sound production component 11 and an edge of a concha cavity may be related to an inclination angle between a projection of the upper sidewall 111 or the lower sidewall 112 of the sound production component 11 on a sagittal plane and a horizontal plane, a size of the sound production component 11 (e.g., the size in the short axis direction Z in FIG. 3), and a distance between the end FE of the sound production component 11 and the edge of the concha cavity. It should be noted that the end FE of the sound production component 11 refers to an end of the sound production component 11 opposite to the fixed end connected to the suspension structure 12, and is also referred to as a free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the fixed end connected to the suspension structure 12 in the sound production component 11. As another example, when the sound production component 11 is a sphere, an ellipsoid or an irregular structure, the end FE of the sound production component 11 refers to a specific region away from the fixed end obtained by cutting the sound production component 11 along a Y-Z plane (a plane formed by the short axis direction Z and a thickness direction X). A ratio of the size of the specific region along the long axis direction Y to the size of the sound production component along the long axis direction Y may be within a range of 0.05-0.2.

Specifically, one end of the sound production component 11 may be connected to the suspension structure 12 (the second portion 122 of the ear hook). When the user wears the headphone, the fixed end may be relatively forward, and a distance between the end FE (free end) of the sound production component 11 and the fixed end may reflect the size of the sound production component 11 in the long axis direction (the direction indicated by the arrow Y in FIG. 3). Therefore, the position of the end FE of the sound production component 11 relative to the concha cavity may affect an area of the concha cavity covered by the sound production component 11, and the size of the gap formed between the sound production component 11 and the contour of the concha cavity may be affected, thereby affecting the listening volume at an opening of an ear canal of the user. A distance between the midpoint of the projection of the end FE of the sound production component 11 on the sagittal plane and the projection of the edge of the concha cavity on the sagittal plane may reflect the position of the end FE of the sound production component 11 relative to the concha cavity and an extent to which the sound production component 11 covers the concha cavity of the user. The concha cavity refers to a concave region below the crus of helix, i.e., the edge of the concha cavity may be at least defined by the sidewall below the crus of helix, the contour of the tragus, the intertragic notch, the antitragus tip, the notch between the antitragus and the antihelix, and the contour of the antihelix corresponding to the concha cavity. It should be noted that when the projection of the end FE of the sound production component 11 on the sagittal plane is a curved line or a broken line, a midpoint of the projection of the end FE of the sound production component 11 on the sagittal plane may be selected by the following exemplary manner. A line segment may be drawn by selecting two farthest points on the projection of the end FE on the sagittal plane along the short axis direction, a mid-perpendicular line may be drawn by selecting a midpoint on the line segment, and an interaction point of the mid-perpendicular line and the projection may be the midpoint of the projection of the end of the sound production component 11 on the sagittal plane. In some embodiments, when the end FE of the sound production component 11 is a curved surface, a tangent point where a tangent line parallel to the short axis direction Z on the projection may also be selected as the midpoint of the projection of the end FE of the sound production component 11 on the sagittal plane.

As shown in FIG. 19A, when the sound production component 11 does not abut against the edge of the concha cavity 102, the end FE of the sound production component 11 may be located in the concha cavity 102, i.e., the midpoint of the projection of the end FE of the sound production component 11 on the sagittal plane may not overlap with the projection of the edge of the concha cavity 102 on the sagittal plane. As shown in FIG. 19B, the sound production component 11 of the headphone 10 may be inserted into the concha cavity 102, and the end FE of the sound production component 11 may abut against the edge of the concha cavity 102. It should be noted that, in some embodiments, when the end FE of the sound production component 11 abuts against the edge of the concha cavity 102, the midpoint of the projection of the end FE of the sound production component 11 on the sagittal plane may overlap with the projection of the edge of the concha cavity 102 on the sagittal plane. In some embodiments, when the end FE of the sound production component 11 abuts against the edge of the concha cavity 102, the midpoint of the projection of the end FE of the sound production component 11 on the sagittal plane may not overlap with the projection of the edge of the concha cavity 102 on the sagittal plane. For example, the concha cavity 102 may be the concave structure, the sidewall corresponding to the concha cavity 102 may not be a flat wall surface, and the projection of the edge of the concha cavity on the sagittal plane may be an irregular two-dimensional shape. The projection of the sidewall corresponding to the concha cavity 102 on the sagittal plane may be on or outside the contour of the shape. Therefore, the midpoint of the projection of the end FE of the sound production component 11 on the sagittal plane may not overlap with the projection of the edge of the concha cavity 102 on the sagittal plane. For example, the midpoint of the projection of the end FE of the sound production component 11 on the sagittal plane may be located on an inner side or an outer side of the projection of the edge of the concha cavity 102 on the sagittal plane. In the embodiments of the present disclosure, when the end FE of the sound production component 11 is located in the concha cavity 102, the distance between the midpoint of the projection of the end FE of the sound production component 11 on the sagittal plane and the projection of the edge of the concha cavity 102 on the sagittal plane may be within a specific range (e.g., not greater than 6 mm), which may be considered that the end FE of the sound production component 11 may abut against the edge of the concha cavity 102. As shown in FIG. 19C, the sound production component 11 of the headphone 10 may cover the concha cavity, and the end FE of the sound production component 11 may be located between the edge of the concha cavity 102 and an inner contour 1014 of the auricle.

Referring to FIGS. 19A-19C, when the end FE of the sound production component 11 is located in the edge of the concha cavity 102, if the distance between the midpoint C3 of the projection of the end FE of the sound production component 11 on the sagittal plane and the projection of the edge of the concha cavity 102 on the sagittal plane is too small, the area of the concha cavity 102 covered by the sound production component 11 may be too small, and the size of the gap formed between the sound production component 11 and the edge of the concha cavity may be relatively large, which may affect the listening volume at the opening of the ear canal of the user. When the midpoint C3 of the projection of the end FE of the sound production component on the sagittal plane is located at a position between the projection of the edge of the concha cavity 102 on the sagittal plane and a projection of the inner contour 1014 of the auricle on the sagittal plane, if the distance between the midpoint C3 of the projection of the end FE of the sound production component on the sagittal plane and the projection of the edge of the concha cavity 102 on the sagittal plane is too large, the end FE of the sound production component 11 may interfere with the auricle, and the area of the concha cavity 102 covered by the sound production component 11 may not be increased. In addition, when the user wears the headphone, if the end FE of the sound production component 11 is not located in the concha cavity 102, the edge of the concha cavity 102 may not limit the sound production component 11, and the headphone may be liable to fall off. In addition, an increase in the size of the sound production component 11 in a certain direction may increase the weight of the sound production component 11, which may affect the wearing comfort and portability of the user. Accordingly, in order to ensure that the headphone 10 has a better listening effect and the wearing comfort and stability of the user, in some embodiments, the distance between the midpoint C3 of the projection of the end FE of the sound production component 11 on the sagittal plane and the projection of the edge of the concha cavity on the sagittal plane may not be greater than 16 mm. In some embodiments, the distance between the midpoint C3 of the projection of the end FE of the sound production component 11 on the sagittal plane and the projection of the edge of the concha cavity on the sagittal plane may not be greater than 13 mm. In some embodiments, the distance between the midpoint C3 of the projection of the end FE of the sound production component 11 on the sagittal plane and the projection of the edge of the concha cavity on the sagittal plane may not be greater than 8 mm. It should be noted that, in some embodiments, the distance between the midpoint C3 of the projection of the end FE of the sound production component 11 on the sagittal plane and the projection of the edge of the concha cavity 102 on the sagittal plane may be a minimum distance between the midpoint C3 of the projection of the end FE of the sound production component 11 on the sagittal plane and the projection of the edge of the concha cavity 102 on the sagittal plane. In some embodiments, the distance between the midpoint C3 of the projection of the end FE of the sound production component 11 on the sagittal plane and the projection of the edge of the concha cavity 102 on the sagittal plane also refers to a distance along the sagittal axis. In addition, in a specific wearing scenario, it may also be that the points, other than the midpoint C3, of the projection of the end FE of the sound production component 11 on the sagittal plane may abut against the edge of the concha cavity. At this time, the distance between the midpoint C3 of the projection of the end FE of the sound production component 11 on the sagittal plane and the projection of the edge of the concha cavity on the sagittal plane may be greater than 0 mm. In some embodiments, the distance between the midpoint C3 of the projection of the end FE of the sound production component 11 on the sagittal plane and the projection of the edge of the concha cavity on the sagittal plane may be within a range of 2 mm-16 mm. In some embodiments, the distance between the midpoint C3 of the projection of the end FE of the sound production component 11 on the sagittal plane and the projection of the edge of the concha cavity on the sagittal plane may be within a range of 4 mm-10.48 mm.

Figure 20:
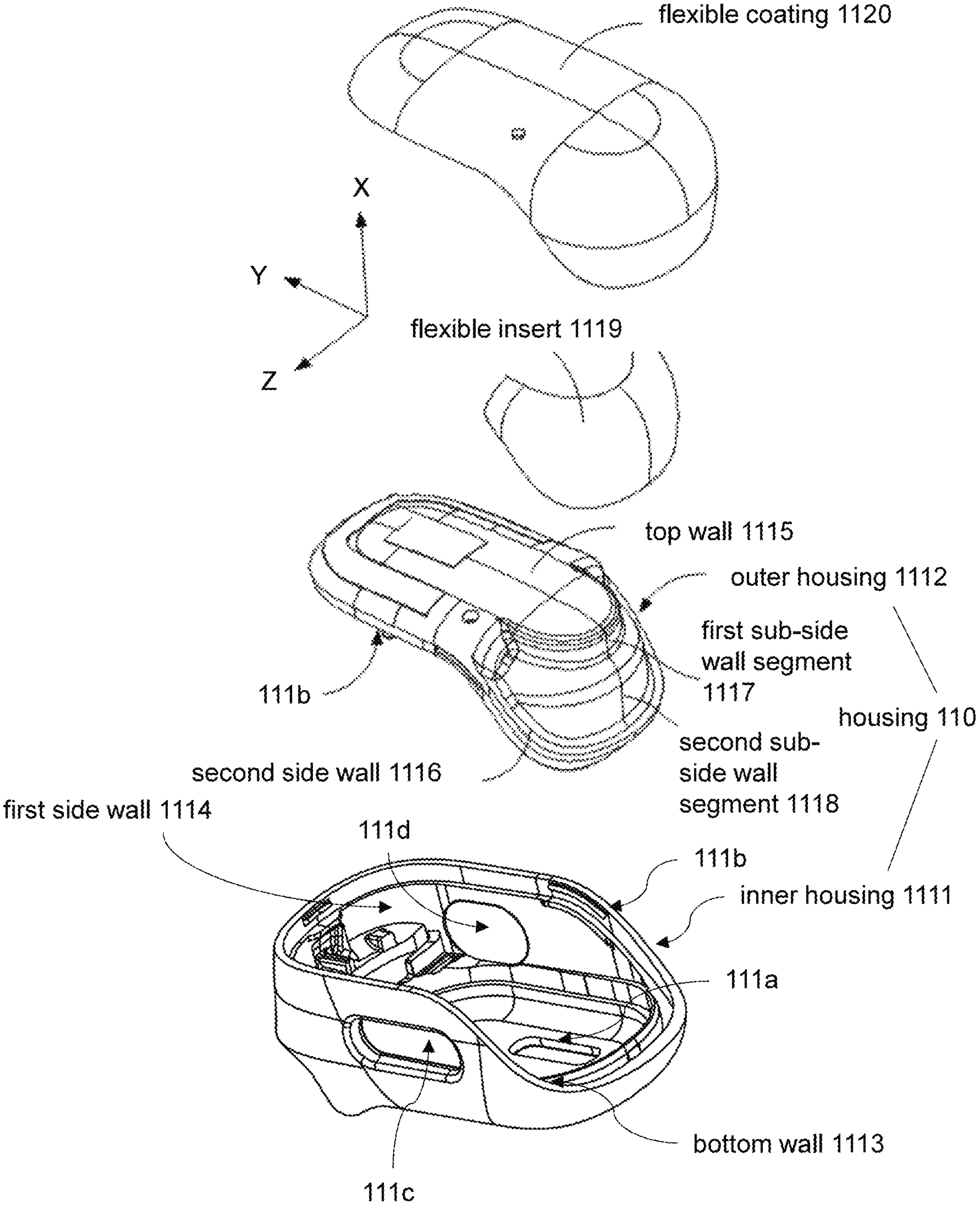
FIG. 20 is a schematic diagram illustrating an exploded view of an exemplary sound production component of the headphone illustrated in FIG. 3.

As shown in FIG. 20, in some embodiments, a clamping region of the housing 110 inserted into the concha cavity 102 of the user and/or the inner side of the clamping region may be provided with a flexible material. Shore hardness of the flexible material may keep in a specific range. If the Shore hardness of the flexible material is too large, the comfort of the sound production component 11 in the wearing state may deteriorate. In some embodiments, in order to meet wearing requirements, the Shore hardness of the flexible material may be within a range of 0 HA-40 HA. In some embodiments, in order to improve comfort, the Shore hardness of the flexible material may be within a range of 0 HA-20 HA.

The flexible material may be a flexible insert 1119, and the hardness of the flexible insert 1119 may be less than the hardness of the housing 110. The housing 110 may be a plastic part, and the material of the flexible insert 1119 may be silicone, rubber, etc., and the flexible insert 1119 may be formed on the clamping region and/or the inner side of the clamping region by injection molding. Further, the flexible insert 1119 may at least partially cover a region of the housing 110 corresponding to the free end FE, i.e., cover the clamping region and/or the inner side of the clamping region, so that the sound production component 11 may at least partially abut against the concha cavity 102 through the flexible insert 1119. In other words, a portion of the housing 110 extending into the concha cavity 102 and in contact with the concha cavity 102 may be covered by the flexible insert 1119. In this way, when the sound production component 11 abuts against the concha cavity 102, for example, when the sound production component 11 and the suspension structure 12 are arranged to jointly clamp the ear from the front and rear sides of an ear region corresponding to the concha cavity 102 of the ear 100, the flexible insert 1119 may act as a buffer between the housing 110 and the ear 100 (e.g., the ear region) to relieve the pressure of the acoustic device 10 on the ear 100, which is conducive to improving the comfort of the acoustic device 10 in the wearing state.

In some embodiments, the flexible insert 1119 may continuously cover at least partial regions of the housing 110 corresponding to the rear side RS, the upper side US, and the lower side LS. For example, a region of the housing 110 corresponding to the rear side RS may be covered more than 90% by the flexible insert 1119, and regions of the housing 110 corresponding to the upper side US and the lower side LS may be respectively covered about 30% by the flexible insert 1119. In this way, the comfort of the acoustic device 10 in the wearing state and the need for structural components such as the transducer arranged in the housing 110 may be considered.

In some embodiments, viewed along the thickness direction X, the flexible insert 1119 may be provided in a U shape.

In some embodiments, a portion of the flexible insert 1119 corresponding to the lower side LS may abut against an antitragus. A thickness of a portion of the flexible insert 1119 corresponding to the rear side RS may be smaller than a thickness of a portion of the flexible insert 1119 corresponding to the upper side US and a thickness of a portion of the flexible insert 1119 corresponding the lower side LS, respectively, so that good comfort can also be obtained when the sound production component 11 abuts against an uneven position in the concha cavity 102.

FIG. 20 is a schematic diagram illustrating an exploded view of an exemplary sound production component of a headphone shown in FIG. 3. In some embodiments, the housing 110 may include an inner housing 1111 and an outer housing 1112 snap-fit with each other along the thickness direction X. The inner housing 1111 may be closer to the ear 100 than the outer housing 1112 in the wearing state. A sound guiding hole 111*a*, a first pressure relief hole 111*c*, and a second pressure relief hole 111*d* may be arranged on the inner housing 1111. A diaphragm of the transducer may be arranged toward the inner housing 1111. A first acoustic cavity may be formed between the transducer and the inner housing 1111. A parting surface 111*b* between the outer housing 1112 and the inner housing 1111 may be inclined to a side where a core inner housing 1111 is located in a direction close to the free end FE, so that the flexible insert 1119 may be arranged as much as possible in a region of the outer housing 1112 corresponding to the free end FE. For example, the whole flexible insert 1119 may be arranged in the region of the core outer housing 1112 corresponding to the free end FE to simplify the structure of the sound production component 11 and reduce the processing cost.

In some embodiments, a wrapping layer may be provided outside the housing 110, and the Shore hardness of the wrapping layer may be kept within a specific range. If the Shore hardness is too large, the comfort of the sound production component 11 in the wearing state may deteriorate, and when a flexible coating 1120 can integrally cover at least part of an outer surface of the flexible insert 1119, the flexible insert 1119 may not achieve a proper function (e.g., relieve the pressure of the acoustic device 10 on the ear 100, and improve the comfort of the acoustic device 10 in the wearing state). If the Shore hardness is too small, the sidewall of the sound production component 11 may be completely attached to the structure of the concha cavity 102, so that the internal environment may be completely sealed and isolated from the external environment, and the quasi-cavity structure may not be formed, resulting in failing to reduce the far-field sound leakage effect, and failing to shape during the assembly process. In some embodiments, in order to improve the sound leakage reduction effect, the Shore hardness of the wrapping layer may be within a range of 10 HA-80 HA. In some embodiments, in order to improve the comfort of the sound production component 11 in the wearing state, the Shore hardness of the wrapping layer may be within a range of 15 HA-70 HA. In some embodiments, in order to make the quasi-cavity structure formed by the sound production component 11 and the concha cavity 102 have a better opening size, the Shore hardness of the wrapping layer may be within a range of 25 HA-55 HA. In some embodiments, in order to ensure better shaping during assembly, the Shore hardness of the wrapping layer may be within a range of 30 HA-50 HA.

The wrapping layer may be the flexible coating 1120, and the hardness of the flexible coating 1120 may be less than that of the housing 110. The housing 110 may be a plastic part, the material of the flexible coating 1120 may be silicone, rubber, etc., and the flexible coating 1120 may be formed on a preset region of the housing 110 by injection molding, glue connection, etc. Further, the flexible coating 1120 may integrally cover at least part of the outer surface of the flexible insert 1119 and at least part of the outer surface of the housing 1112 not covered by the flexible insert 1119, which is conducive to enhancing the consistency of the appearance of the sound production component 11. Certainly, the flexible coating 1120 may further cover the outer surface of the inner housing 1111. The hardness of the flexible insert 1119 may be smaller than that of the flexible coating 1120, thereby making the flexible insert 1119 sufficiently soft. In addition, the flexible coating 1120 may also improve the comfort of the acoustic device 10 in the wearing state, and have a certain structural strength to protect the flexible insert 1119. Further, an area of the outer surface of the flexible insert 1119 may be between 126 mm$^2$ and 189 mm$^2$. If the area of the outer surface of the flexible insert 1119 is too small, the comfort of the sound production component 11 in the wearing state may deteriorate. If the area of the outer surface of the flexible insert 1119 is too large, the volume of the sound production component 11 may be too large, and an area where the flexible insert 1119 does not abut against the concha cavity 102 may be too large, which may deviate from the original intention of the flexible insert 1119. In some embodiments, the thickness of the flexible coating 1120 may be less than the thickness of the housing 1112.

In some embodiments, the inner housing 1111 may include a bottom wall 1113 and a first side wall 1114 connected with the bottom wall 1113, and the outer housing 1112 may include a top wall 1115 and a second side wall 1116 connected with the top wall 1115. The second side wall 1116 and the first side wall 1114 may be snap-fit with each other along the parting surface 111*b* and may support each other. Viewed along the short axis direction Z, in a reference direction of the connection end CE pointing to the free end FE (e.g., an opposite direction of an arrow in the long axis direction Y in FIG. 20), a portion of the first side wall 1114 close to the free end FE may gradually approach the bottom wall 1113 in the thickness direction X, and a portion of the second side wall 1116 close to the free end FE may be gradually away from the top wall 1115 in the thickness direction X, so that the parting surface 111*b* may be inclined to a side where the inner housing 1111 is located in a direction close to the free end FE. In this case, the flexible insert 1119 may be at least partially arranged on the outer side of the second side wall 1116. For example, referring to FIG. 20, the flexible insert 1119 may not only be arranged on the outer side of the second side wall 1116 but also partially arranged on the outer side of the top wall 1115.

In some embodiments, the housing 1102 may be provided with an insertion groove at least partially located on the second side wall 1116, and the flexible insert 1119 may be embedded in the insertion groove, so that an outer side of a region of the housing 1102 not covered by the flexible insert 1119 and an outer surface of the flexible insert 1119 may have a continuous transition. A region where the flexible insert 1119 in FIG. 20 is located may simply be regarded as the insertion groove. In this way, it is not only conducive for the flexible insert 1119 to accumulate on the outer housing 1112 during the injection molding process, avoiding the overflow of the flexible insert 1119, but also conducive to improving the appearance quality of the sound production component 11 and preventing the surface of the sound production component 11 from being bumpy.

In some embodiments, the second side wall 1116 may include a first sub-side wall segment 1117 and a second sub-side wall segment 1118 connected with the first sub-side wall segment 1117. The first sub-side wall segment 1117 may be closer to the top wall 1115 than the second sub-side wall segment 1118 in the thickness direction X, and the second sub-side wall segment 1118 may further protrude toward an outer side of the housing 111 than the first sub-side wall segment 1117. In short, the second side wall 1116 may have a stepped structure. With application of the structure, the flexible insert 1119 may be accumulated on the outer housing 1112 during an injection molding process, avoiding the overflow of the flexible insert 1119, the sound production component 11 may better abut against the concha cavity 102 through the flexible insert 1119, thereby improving the comfort of the acoustic device 10 in the wearing state.

Figure 21:
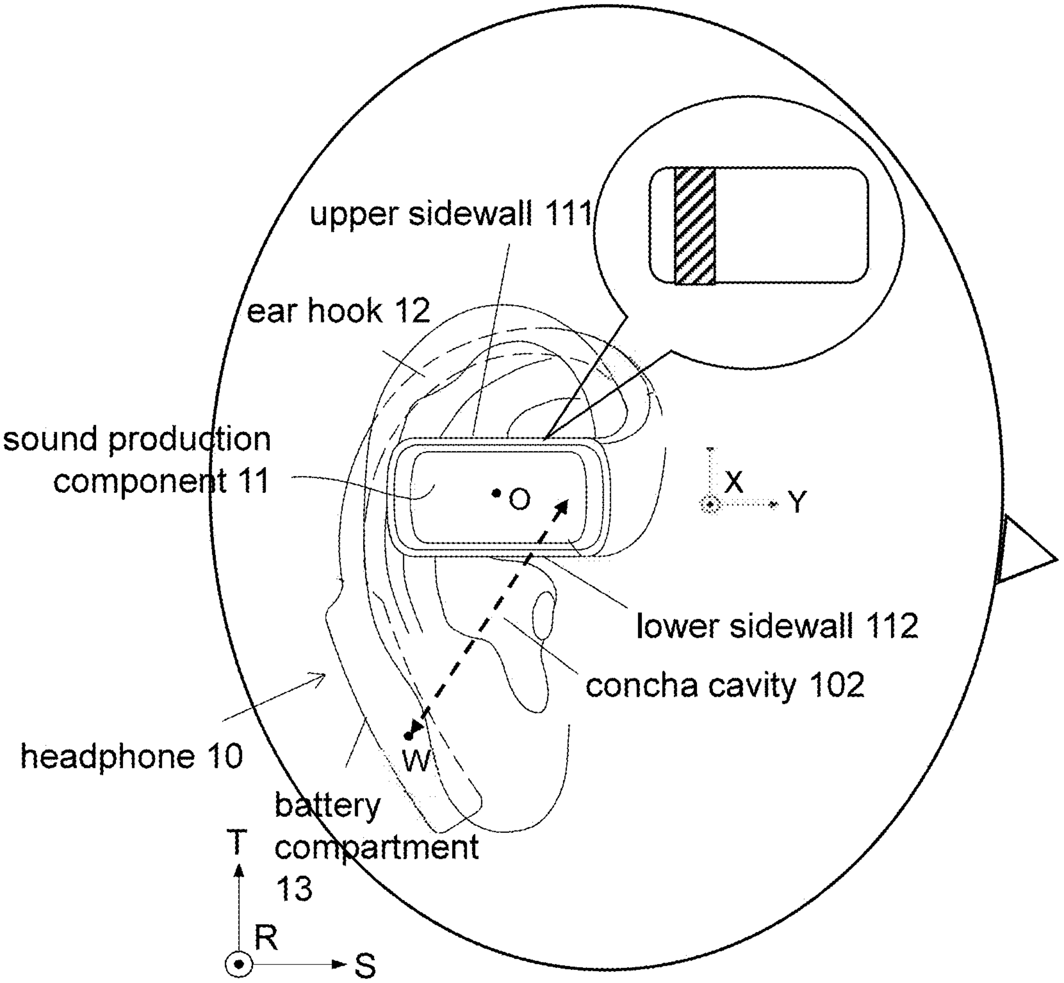
FIG. 21 is a schematic diagram illustrating an exemplary wearing state in which a sound production component of a headphone covers an antihelix region according to some embodiments of the present disclosure.

FIG. 21 is a schematic diagram illustrating an exemplary wearing state in which a sound production component of a headphone covers an antihelix region according to some embodiments of the present disclosure.

Referring to FIG. 21, in some embodiments, when the headphone is in the wearing state, at least a portion of the sound production component 11 may cover the antihelix region of the user, wherein the antihelix region may include any one or more of the antihelix 105, the upper antihelix crus 1011, and the lower antihelix crus 1012 in FIG. 1. At this time, the sound production component 11 may be located above the concha cavity 102 and the opening of the ear canal, and the opening of the ear canal of the user may be in an open state. In some embodiments, the housing of the sound production component 11 may include at least a sound guiding hole and a pressure relief hole. The sound guiding hole may be acoustically coupled with a front cavity of the headphone 10, and the pressure relief hole may be acoustically coupled with a rear cavity of the headphone 10. The sound output from the sound guiding hole and the sound output from the pressure relief hole may be approximately regarded as two sound sources. The sounds of the two sound sources may have anti-phases to form a dipole. When the user wears the headphone, the sound guiding hole may be located on a sidewall of the sound production component 11 facing or close to the opening of the ear canal of the user, and the pressure relief hole may be located on a sidewall of the sound production component 11 away from the opening of the ear canal of the user. The housing of the sound production component 11 may act as a baffle to increase a sound path difference from the sound guiding hole and the pressure relief hole to an external ear canal 101, thereby increasing a sound intensity at the external ear canal 101. Furthermore, in the wearing state, the inner side of the sound production component 11 may be in contact with the antihelix region, and a concave-convex structure of the antihelix region may also act as a baffle, which may increase a sound path of the sound emitted from the pressure relief hole to the external ear canal 101, thereby increasing the sound path difference from the sound guiding hole and the pressure relief hole to the external ear canal 101.

Figure 22:
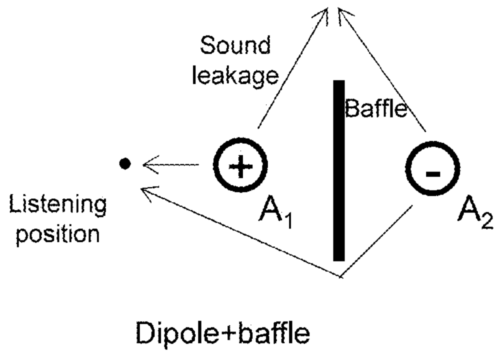
FIG. 22 is a schematic diagram illustrating an exemplary baffle structure arranged between two sound sources of double sound sources according to some embodiments of the present disclosure.

The output effect of the headphone can be improved by arranging at least a portion of the sound production component 11 at the antihelix 105 of the user, i.e., a sound intensity at a near-field listening position may be increased, and the volume of the far-field leakage sound may also be reduced. When the user wears the headphone 10, one or more sound guiding holes may be provided on a side of the housing of the sound production component 11 near or facing the ear canal of the user, and one or more pressure relief holes may be provided on another sidewall of the housing of the sound production component 11 (e.g., a sidewall away from or back to the ear canal of the user). The sound guiding holes may be acoustically coupled with a front cavity of the headphone 10 and the pressure relief holes may be acoustically coupled with a rear cavity of the headphone 10. Taking the sound production component 11 including a sound guiding hole and a pressure relief hole as an example, sound output by the sound guiding hole and sound output by the pressure relief hole may be approximately regarded as two sound sources, and sound waves of the two sound sources may be in opposite phases. The sound output by the sound guiding hole may be directly transmitted to the opening of the ear canal of the user without hindrance, while the sound output by the pressure relief hole may bypass the housing of the sound production component 11 or pass through a gap formed between the sound production component 11 and the antihelix 105. In this case, the sound production component 11 and the antihelix 105 may form a structure similar to a baffle (the antihelix 105 may be equivalent to a baffle), wherein a sound source corresponding to the sound guiding hole may be located on one side of the baffle, and a sound source corresponding to the pressure relief hole may be located on another side of the baffle, thereby forming the acoustic model shown in FIG. 22. As shown in FIG. 22, when the baffle is provided between a point sound source A1 and a point sound source A2, in the near-field, a sound field of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, an amplitude difference between the sound waves of the point sound source A1 and the point sound source A2 at the listening position may increase compared to the case without the baffle, thus reducing a degree of cancellation of the two sounds at the listening position and making the volume at the listening position increase. In the far field, since the sound waves generated by the point sound source A1 and the point sound source A2 may interfere without bypassing the baffle in a large spatial area (similar to the case without the baffle), the sound leakage in the far-field may not increase significantly compared to the case without the baffle. Therefore, the baffle structure around one of the point sound sources A1 and A2 may significantly increase the volume of the near-field listening position without significantly increasing the volume of the far-field sound leakage.

In some embodiments, when the sound production component 11 covers the antihelix 105, the housing of the sound production component 11 may include at least one sound guiding hole and at least one pressure relief hole, the sound guiding hole may be acoustically coupled to the front cavity of the headphone 10, and the pressure relief hole acoustically coupled to the rear cavity of the headphone 10. The sound output from the sound guiding hole and the sound output from the pressure relief hole may be approximately regarded as two point sound sources, and the two point sound sources may be in opposite phases to form a dipole. When the user wears the headphones 10, the sound guiding hole may be located on the sidewall of the sound production component 11 facing or near the opening of the ear canal of the user, and the pressure relief hole may be located on the sidewall of the sound production component 11 away from or back to the opening of the ear canal of the user. At this time, the housing of the sound production component 11 may act as a baffle to increase the sound path difference from the sound guiding hole and the pressure relief hole to the external ear canal 101, thereby increasing a sound intensity at the external ear canal 101. Furthermore, in the wearing state, the inner side of the sound production component 11 may be in contact with the antihelix region 105, and a concave-convex structure of the antihelix region may also act as a baffle, which may increase a sound path of the sound emitted from the pressure relief hole to the external ear canal 101, thereby increasing the sound path difference from the sound guiding hole and the pressure relief hole to the external ear canal 101.

Figure 23:
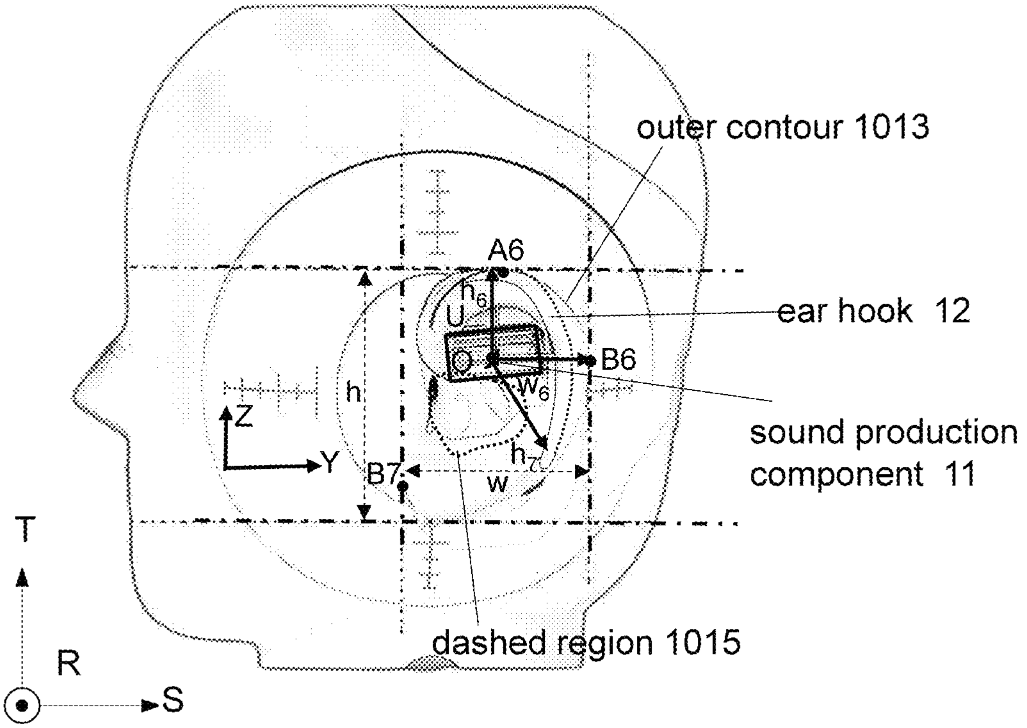
FIG. 23 is a schematic diagram illustrating another exemplary wearing state of a headphone according to some embodiments of the present disclosure.
Figure 24:
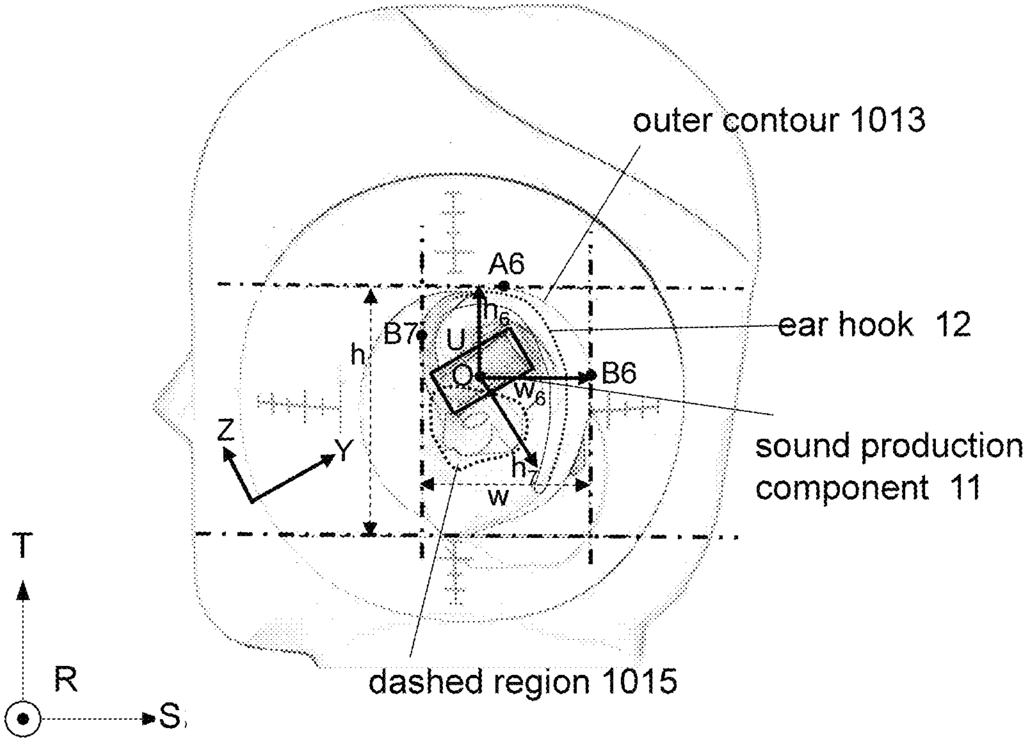
FIG. 24 is a schematic diagram illustrating another exemplary wearing state of a headphone according to some embodiments of the present disclosure.

FIG. 23 and FIG. 24 are schematic diagrams illustrating other exemplary wearing states of a headphone according to embodiments of the present disclosure. As shown in FIG. 23 and FIG. 24, in some embodiments, when the headphone 10 is in the wearing state, the sound production component may be approximately parallel or inclined at a certain angle relative to the horizontal direction, which may ensure an appropriate clamping force between the headphone 10 and the ear 100 (the antihelix region) of the user. In some embodiments, when the headphone 10 is in the wearing state, the sound production component 11 and the auricle of the user may have a first projection (a rectangular region defined by a solid line box U in FIG. 23 and FIG. 24 may be approximately equivalent to the first projection) and a second projection on the sagittal plane (e.g., an S-T plane in FIG. 23 and FIG. 24) of the head of the user, respectively. In order to make the whole or a portion of the structure of the sound production component 11 cover the antihelix region of the user (e.g., positions of the antihelix, the triangular fossa, the upper anticrus of helix, or the lower anticrus of helix), a ratio of a distance h6 between the centroid O of the first projection and the highest point A6 of the second projection in the vertical axis direction (e.g., a T-axis direction in FIG. 23 and FIG. 24) to a height h of the second projection in the vertical axis direction may be within a range of 0.25-0.4. A ratio of a distance w6 between the centroid O of the first projection U and an end point B6 of the second projection in the sagittal axis direction (e.g., an S-axis direction in FIG. 23 and FIG. 24) to a width w of the second projection in the sagittal axis direction may be within a range of 0.4-0.6.

Considering that the sidewall of the sound production component 11 may abut against the antihelix region, the sound production component 11 may abut against a larger antihelix region such that the concave-convex structure of the region may also act as a baffle to increase the sound path of the sound emitted from the pressure relief hole to the external ear canal 101, thereby increasing a sound path difference between a sound guiding hole and a pressure relief hole to the external ear canal 101, increasing a sound intensity at the external ear canal 101, and reducing a volume of far-field leakage sound. Accordingly, in order to balance the listening volume and the sound leakage volume of the sound production component 11 to ensure the acoustic output quality of the sound production component 11, the sound production component 11 may be fit as closely as possible to the antihelix region of the user. Correspondingly, the ratio of the distance h6 between the centroid O of the first projection of the sound production component on the sagittal plane of the head of the user and the highest point A6 of the second projection of the auricle of the user on the sagittal plane in the vertical axis direction to the height h of the second projection in the vertical axis direction may be controlled to be within a range of 0.25-0.4. Meanwhile, the ratio of the distance w6 between the centroid O of the first projection of the sound production component 11 on the sagittal plane and the end point B6 of the second projection of the auricle of the user on the sagittal plane to the width w of the second projection in the sagittal axis direction may be controlled to be within a range of 0.4-0.6. In some embodiments, in order to improve the wearing comfort of the headphone while ensuring the acoustic output quality of the sound production component 11, the ratio of the distance h6 between the centroid O of the first projection and the highest point A6 of the second projection in the vertical axis direction to the height h of the second projection in the vertical axis direction may be within a range of 0.25-0.35, and the ratio of the distance w6 between the centroid O of the first projection and the end point B6 of the second projection in the sagittal axis direction to the width w of the second projection in the sagittal axis direction may be within a range of 0.42-0.6. In some embodiments, the ratio of the distance h6 between the centroid O of the first projection and the highest point A6 of the second projection in the vertical axis direction to the height h of the second projection in the vertical axis direction may be within a range of 0.25-0.34, and the ratio of the distance w6 between the centroid O of the first projection and the end point B6 of the second projection in the sagittal axis direction to the width w of the second projection in the sagittal axis direction may be within a range of 0.42-0.55.

Similarly, when the shapes and the sizes of the ears of users are different, the ratio may fluctuate within a specific range. For example, when the earlobe of the user is long, the height h of the second projection in the vertical axis direction may be larger than that of the general situation. At this time, when the user wears the headphone 100, the ratio of the distance h6 between the centroid O of the first projection and the highest point A6 of the second projection in the vertical axis direction to the height h of the second projection in the vertical axis direction may be smaller, e.g., which may be within a range of 0.2-0.35. Similarly, in some embodiments, when the helix of the user is bent forward, the width w of the second projection in the sagittal axis direction may be smaller than that of the general situation, and the distance w6 between the centroid O of the first projection and the end point B6 of the second projection in the sagittal axis direction may also be smaller. At this time, the ratio of the distance w6 between the centroid O of the first projection and the end point B6 of the second projection in the sagittal axis direction to the width w of the second projection in the sagittal axis direction may be larger, e.g., which may be within a range of 0.4-0.7. In some embodiments, the sound production component 11 may include a transducer and a housing accommodating the transducer. The housing may be at least partially located at the antihelix 105 of the user, and a side of the housing facing the antihelix 105 of the user may include a clamping region in contact with the antihelix 105 of the user. Since the distance of the sound production component 11 relative to a plane of the ear hook in the thickness direction X is enlarged after wearing, the sound production component 11 may tend to approach the plane of the ear hook, thereby forming clamping in the wearing state. In some embodiments, an orthographic projection of the ear hook 12 on a reference plane (e.g., the YZ plane in FIG. 21) perpendicular to the thickness direction X may partially overlap with an orthographic projection of a middle section or a middle front section of the sound production component 11 on the same reference plane (as shown in a shaded portion of the side of the housing facing the antihelix 105 of the user in the figure), thereby forming a projection overlapped region. The projection overlapped region formed by the orthographic projection of the ear hook 12 on the reference plane and the orthographic projection of the free end FE on the same reference plane may be located on a side facing the antihelix 105 of the user. In this way, not only the sound production component 11 and the ear hook 12 may jointly clamp the ear 100 from the side of the ear 100 away from the head to the side of the ear 100 facing the head, but also the formed clamping force may be mainly expressed as compressive stress, which is conducive to improving the stability and the comfort of the acoustic device 10 in the wearing state. It should be noted that the above clamping region refers to a region clamping the antihelix 105. However, different users may have individual differences, resulting in different shapes, sizes, etc., of ears. In the actual wearing state, the clamping region may not necessarily clamp the antihelix 105.

When the user wears the headphone, a sidewall of the sound production component 11 facing the antihelix region needs to fit the antihelix region of the user to form a clamping region. When the size of the sound production component 11 in the thickness direction X is constant, if a distance between the farthest point on the sound production component from the plane of the ear hook and the plane of the ear hook is too large, an inclination angle of the sound production component 11 relative to the plane of the ear hook is too large. The sidewall of the sound production component 11 facing the antihelix region and the antihelix region may not fit tightly, and the stability when the user wears the headphone may be poor. At the same time, a baffle structure formed between the sound production component 11 and the antihelix region may have a poor effect or even fail to function as the baffle structure, which affects the listening quality of the user. On the other hand, if the distance between the farthest point on the sound production component 11 from the plane of the ear hook and the plane of the ear hook is too small, the sound production component 11 may excessively compress the antihelix region of the user, and the user may experience serious discomfort when wearing the headphone for a long time. In some embodiments, in order to ensure that the sound production component 11 has a better acoustic output, and to ensure that a distance between the sound production component 11 and the plane of the ear hook in the thickness direction X is sufficiently large after wearing to make the sound production component 11 tend to approach to the plane of the ear hook to provide an appropriate clamping force and maintain the wearing stability, in some embodiments, when the headphone is worn in a way that the sound production component covers at least partially the antihelix region of the user, the distance between the farthest point on the sound production component from the plane of the ear hook and the plane of the ear hook may be within a range of 12 mm-19 mm. In some embodiments, when the headphone is in the wearing state, the distance between the farthest point on the sound production component from the plane of the ear hook and the plane of the ear hook may be within a range of 13.5 mm-17 mm. At this time, the clamping force between the sound production component 11 and the antihelix region may be relatively great, further improving the stability of the user wearing the headphone. In some embodiments, in order to further improve the stability and the listening effect of the headphone in the wearing state, the distance between the farthest point on the sound production component from the plane of the ear hook and the plane of the ear hook may be within a range of 14 mm-17 mm. Due to the elasticity of the ear hook, the distance between the farthest point on the sound production component from the plane of the ear hook and the plane of the ear hook may vary in the wearing state and the non-wearing state. For example, the distance in the wearing state may be greater than that in the non-wearing state. That is to say, the distance between the sound production component 11 and the plane of the ear hook in the thickness direction X in the wearing state may be enlarged as compared to that in the non-wearing state. At this time, the sound production component 11 may tend to approach the plane of the ear hook and may have the clamping force. In order to make the headphone have an appropriate clamping force between the headphone and the ear of the user to make at least a portion of the sound production component 11 fit with the antihelix region of the user to form the baffle structure, and to increase the listening volume near the ear canal of the user to improve the listening effect of the headphone when worn, in some embodiments, in the non-wearing state, the distance between the farthest point on the sound production component 11 from the plane of the ear hook and the plane of the ear hook may be within a range of 11 mm-18 mm. In some embodiments, when the headphone is in the non-wearing state, the distance between the farthest point on the sound production component 11 from the plane of the ear hook and the plane of the ear hook may be within a range of 12 mm-17 mm. At this time, when the clamping force between the sound production component 11 and the antihelix region may be relatively large, which may further improve the stability of the user wearing the headphone.

Further, a pressure between a side of the sound production component in contact with the ear of the user and the ear of the user (e.g., the antihelix region) may be correlated with a difference between the distance between the farthest point on the sound production component from the plane of the ear hook and the plane of the ear hook in the wearing state and that in the non-wearing state. If the difference between the distance between the farthest point on the sound production component from the plane of the ear hook and the plane of the ear hook in the wearing state and that in the non-wearing state is too large, the clamping force may be too small, and the sound production component may not fit stably with the antihelix region of the user, failing to form an effective baffle structure between the sound production component and the antihelix region, and affecting the listening volume near the ear canal of the user. If the difference between the distance between the farthest point on the sound production component from the plane of the ear hook and the plane of the ear hook in the wearing state and the non-wearing state is too small, the clamping force may be too large, when the user wears the headphone for a long time, the sound production component may press the antihelix region of the ear of the user, causing discomfort to the user. By controlling the difference between the distance between the farthest point on the sound production component from the plane of the ear hook and the plane of the ear hook in the wearing state and that in the non-wearing state to be within a range of 0.8 mm-1.2 mm, an appropriate clamping force may be provided to ensure the wearing comfort while ensuring the listening volume near the ear canal of the user.

In addition, the closest point on the sound production component from the plane of the ear hook may also affect the listening effect and wearing experience of the user wearing the headphone. Similar to the principle of the farthest point on the sound production component from the plane of the ear hook, in some embodiments, in a non-wearing state, a distance between the closest point on the sound production component from the plane of the ear hook and the plane of the ear hook may be within a range of 3 mm-9 mm. At this time, the clamping force between the sound production component 11 and the antihelix region may be more moderate, which can ensure the stability of the user wearing the headphone. In some embodiments, the distance between the closest point on the sound production component from the plane of the ear hook and the plane of the ear hook may be within a range of 4.5 mm-8 mm to further enhance the clamping region formed by the sound production component and the antihelix region, and improve the stability of the user wearing the headphone. In some embodiments, the distance between the closest point on the sound production component from the plane of the ear hook and the plane of the ear hook may be within a range of 5 mm-7 mm to further enhance the baffling effect formed by the sound production component and the antihelix region, and improve the listening effect of the headphone in the wearing state. In some embodiments, the distance between the farthest point on the sound production component from the plane of the ear hook and the plane of the ear hook may be controlled to be within a range of 12 mm-19 mm, and the distance between the closest point on the sound production component from the plane of the ear hook and the plane of the ear hook may be controlled to be within a range of 3 mm-9 mm. In such cases, the sizes of the sound production component along the thickness direction X and the long axis direction Y may be constrained so that at least a portion of the sound production component may form a baffle with the antihelix region of the user, and at the same time, a sufficient clamping force may be provided to ensure a good wearing comfort and stability when the user wears the headphone. The overall structure of the headphones shown in FIG. 21 and FIG. 18 is substantially the same as that of the headphones shown in FIG. 10 and FIG. 11. Descriptions regarding the inclination angle of the sound production component of the headphone relative to the plane of the ear hook, and the distance between the farthest point on the sound production component 11 from the plane of the ear hook and the plane of the ear hook shown in FIG. 21 and FIG. 18 may be referred to descriptions in FIG. 10 and FIG. 11.

In the wearing state, the distances between the farthest point and the closest point on the sound production component 11 from the plane of the ear hook and the plane of the ear hook may be respectively kept within a specific range, to ensure that when the user wears the sound production component 11, the clamping force between the sound production component 11 and the antihelix region 105 may not be too large, preventing the sound production component 11 from compressing the ear too much. At the same time, the clamping force between the sound production component 11 and the antihelix region 105 may be ensured not to be too small, improving the wearing stability.

The human head may be approximately regarded as a sphere-like structure, and the auricle of the ear may be regarded as a convex structure relative to the head. When the user wears the headphone, a portion of the ear hook 12 may be attached to the head, in order to enable the sound production component 11 to contact with the antihelix region to provide a sufficient clamping force, in some embodiments, the sound production component may have a certain inclination angle relative to the plane of the ear hook when the headphone is in the wearing state. The inclination angle may be represented by an included angle between a plane corresponding to the sound production component 11 and the plane of the ear hook. Referring to FIG. 21 and FIG. 24, in some embodiments, the plane 11 corresponding to the sound production component 11 may include an outer side and an inner side. In some embodiments, when the outer side or the inner side of the sound production component 11 is a curved plane, the plane corresponding to the sound production component 11 refers to a tangent plane corresponding to the curved plane at a center position, or a plane roughly coinciding with a curve enclosed by the edge contour of the curved plane. Taking the inner side of the sound production component 11 as an example, an included angle formed between the inner side and the plane of the ear hook may be the inclination angle of the sound production component 11 relative to the plane of the ear hook.

Considering that if the angle is too large, the contact area between the sound production component 11 and the antihelix region of the user may be small, the clamping force between the headphone and the ear of the user may be too small, and the headphone may be liable to fall off when the user wears the headphone. In addition, the size (especially the size along long axis direction Y of the sound production component 11) of the baffle formed by the antihelix region covered by at least a portion of the sound production component 11 may be too small, and the sound path difference from the sound guiding hole and the pressure relief hole to the external ear canal 101 may be small, affecting the listening volume at the opening of the ear canal of the user. Furthermore, the size of the sound production component 11 along the long axis direction Y may be too small, a region between the end FE of the sound production component 11 and the inner contour 1014 of the auricle may be relatively large, and the sound emitted from the sound guiding hole and the sound emitted from the pressure relief hole may have the acoustic short circuit in the region between the end FE of the sound production component 11 and the inner contour 1014 of the auricle, resulting in a decrease in the listening volume at the opening of the ear canal of the user. In order to ensure a better listening effect when the user wears the headphone 10 while providing an appropriate clamping force to ensure the wearing stability and comfort, for example, in some embodiments, when the headphone is worn in a manner that the sound production component 11 at least partially covers the antihelix region of the user and the headphone is in the wearing state, the inclination angle of the plane corresponding to the sound production component 11 relative to the plane of the ear hook may be less than or equal to 8°. Thus, the sound production component 11 may have a larger contact area with the antihelix region of the user to improve the wearing stability. At the same time, a majority of the structure of the sound production component 11 may be located in the antihelix region of the user to make the opening of the ear canal in a state of completely open so that the user may receive the sound from the external environment. In some embodiments, the inclination angle of the plane corresponding to the sound production component 11 relative to the plane of the ear hook may be within a range of 2°-7°. In some embodiments, the inclination angle of the plane corresponding to the sound production component 11 relative to the plane of the ear hook may be within a range of 3°-6°.

Due to the elasticity of the ear hook, the inclination angle of the sound production component 11 relative to the plane of the ear hook may vary to a certain extent in the wearing state and the non-wearing state. For example, the inclination angle in the non-wearing state may be smaller than that in the wearing state. That is to say, compared with the non-wearing state, a distance between the sound production component 11 and the plane of the ear hook in the wearing state in the thickness direction X may be enlarged, at which time the sound production component 11 may tend to approach the plane of the ear hook and may have the clamping force. In some embodiments, when the headphone is in the non-wearing state, the inclination angle of the sound production component 11 relative to the plane of the ear hook may be within a range of 0°-6°. By making the inclination angle of the sound production component 11 relative to the plane of the ear hook in the non-wearing state slightly smaller than that in the wearing state, the ear hook of the headphone 10 may generate a certain clamping force on the ear of the user (e.g., on the antihelix region) when the headphone 10 is in the wearing state to improve the stability of the user wearing the headphone without affecting the wearing experience of the user. In some embodiments, in the non-wearing state, the inclination angle of the sound production component 11 relative to the plane of the ear hook may be within a range of 1°-6°. In some embodiments, in the non-wearing state, the inclination angle of the sound production component 11 relative to the plane of the ear hook may be within a range of 2°-5°.

In some embodiments, when the headphone 10 is worn in a manner that the sound production component at least partially covers the antihelix region of the user and the headphone is in the wearing state, a sufficiently large clamping force may be provided, and at least a portion of the sound production component 11 may be subjected to the antihelix region to prevent it from sliding off, which ensures the acoustic output effect of the sound production component 11 while enhancing the wearing stability of the headphone through the force on the sound production component 11 from the antihelix region. At this time, the sound production component 11 may have a certain inclination angle relative to the plane of the auricular of the user. When the range of the inclination angle of the sound production component 11 relative to the plane of the auricular of the ear of the user is large, the clamping force may be too large such that the sound production component 11 may compress the antihelix region, and the user may feel a strong sense of discomfort after wearing the headphone for a long time. Therefore, in order to ensure an appropriate clamping force to enable better wearing stability and comfort when the user wears the headphone, and to enable the sound production component 11 to have a better acoustic output, the inclination angle of the sound production component 11 of the headphone relative to the plane of the auricular may be within a range of 5°-40° in the wearing state. In some embodiments, in order to further optimize the acoustic output quality and the wearing experience of the headphone in the wearing state, the inclination angle of the sound production component 11 of the headphone relative to the plane of the auricular may be controlled to be within a range of 8°-35°. In some embodiments, the inclination angle of the sound production component 11 relative to the plane of the auricular may be controlled to be within a range of 15°-25°. In some embodiments, the inclination angle of the sound production component 11 relative to the plane of the auricular may be controlled to be within a range of 7°-25°. It should be noted that an inclination angle of the sidewall of the sound production component 11 away from the head of the user or facing the opening of the ear canal of the user relative to the plane of the auricle of the user may be a sum of an included angle γ1 between the plane of the auricle and the sagittal plane and an included angle γ2 between the sidewall of the sound production component 11 away from the head of the user or facing the opening of the ear canal of the user and the sagittal plane. The descriptions regarding the inclination angle of the sound production component relative to the plane of the auricle may be found elsewhere in the embodiments of the present disclosure (e.g., FIG. 11 and related descriptions thereof).

In some embodiments, an included angle between a direction of the clamping force and the sagittal plane of the user may keep in a specific range. For example, the direction of the clamping force may be perpendicular or substantially perpendicular to the sagittal plane of the user. If the aforementioned included angle deviates too much from 90°, the baffle structure between the sound guiding hole and the pressure relief hole may not be formed (e.g., a side of the housing where the pressure relief hole is located may be tilted such that the antihelix 105 may not block the pressure relief hole to the other side of the sound guiding hole), the volume of the near-field listening position cannot be increased, and the free end FE or the battery compartment may press the ear 100. It should be noted that the direction of the clamping force may be obtained by affixing a patch (i.e., a force sensor) or a patch array on the side of the auricle facing the head and the side of the auricle away from the head, and reading a force distribution at the clamped position. For example, if there is a point where the force may be measured on the side of the auricle facing the head and the side of the auricle away from the head, it may be considered that the direction of the clamping force may be a direction of a line connecting the two points. In some embodiments, in order to meet wearing requirements, the included angle between the direction of the clamping force and the sagittal plane of the user may be within a range of 60°-120°. In some embodiments, in order to increase the volume at the near-field listening position, the included angle between the direction of the clamping force and the sagittal plane of the user may be within a range of 80°-100°. In some embodiments, in order to further make the headphone fit the antihelix 105 better in the wearing state, the included angle between the direction of the clamping force and the sagittal plane of the user may be in a range of 70°-90°.

In some embodiments, in the wearing state, the housing and the first portion of the ear hook may clamp the auricle of the user, and the clamping force provided to the auricle of the user may keep in a specific range. It should be noted that this clamping force may be measured by a tension meter. For example, the housing of the sound production component 11 in the non-wearing state may be separated from the ear hook 12 by a preset distance according to a wearing mode, and a pulling force in this case may be equal to the clamping force. The clamping force may also be achieved by fixing the patch to the ear of the user. If the clamping force is too small, the baffle structure may not be formed between the sound guiding hole and the pressure relief hole (e.g., the sound production component 11 may be loose, and the antihelix 105 may not block the pressure relief hole to the other side of the sound guiding hole, i.e., the height of the baffle in FIG. 9 is reduced), causing that the volume of the near-field listening position may not be increased, and the wearing stability of the headphone 10 may be poor. If the clamping force is too large, the headphone may exert a strong pressure on the ear 100, making the headphone 10 less adjustable after wearing. In some embodiments, in order to meet the wearing requirements, in the wearing state, the housing and the first portion of the ear hook 12 may clamp the auricle of the user and provide a clamping force of 0.03 N-3 N to the auricle of the user. In some embodiments, in order to increase the adjustability after wearing, in the wearing state, the housing and the first portion of the ear hook may clamp the auricle of the user and provide a clamping force of 0.03 N-1 N to the auricle of the user. In some embodiments, in order to increase the volume of the near-field listening position, in the wearing state, the housing and the first portion of the ear hook may clamp the auricle of the user and provide a clamping force of 0.4 N-0.9 N to the auricle of the user.

At least a portion of the housing of the sound production component may be located at the antihelix 105 of the user, and a side of the housing facing the antihelix 105 of the user may include a clamping region in contact with the antihelix 105 of the user. As the distance of the sound production component 11 relative to the plane of the ear hook in the thickness direction X may be enlarged after wearing, the sound production component 11 may tend to approach the plane of the ear hook, and thus the clamping may be formed in the wearing state. In some embodiments, in order to make a portion or the whole of the structure of the sound production component cover the antihelix region when a user wears the headphone as shown in FIG. 21 and FIG. 24 to make the sound production component 11 and the antihelix 105 form a baffle-like structure, and to make the sound production component 11 and the ear hook clamp the ear of the user to provide a certain clamping force when the user wears the headphone, the upper sidewall 111 of the sound production component 11 may have a certain included angle with the second portion 122 of the ear hook. Similar to the principle that at least a portion of the sound production component is inserted into the concha cavity, continuing to refer to FIG. 9, the included angle may be expressed by an included angle β between the projection of the upper sidewall 111 of the sound production component 11 on the sagittal plane and the tangent line 126 of a projection of a connection part between the second portion 122 of the ear hook and the upper sidewall 111 of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook may be drawn through the point U. When the upper sidewall 111 is the curved plane, the projection of the upper sidewall 111 on the sagittal plane may be the curved line or the broken line. At this time, the included angle between the projection of the upper sidewall 111 on the sagittal plane and the tangent line 126 may be an included angle between a tangent line to a point at which the curved line or the broken line has the largest distance from a plane and the tangent line 126. In some embodiments, when the upper sidewall 111 is the curved plane, a tangent line parallel to the long axis direction Y on the projection may also be selected. An included angle between the tangent line and the horizontal direction may represent an inclination angle between the projection of the upper sidewall 111 on the sagittal plane and the tangent line 126. In some embodiments, the included angle β may be within a range of 45°-110°, where the sound production component 11 and the ear hook may be matched to clamp to the ear of the user to ensure the stability of the user wearing the headphone, and at the same time, a portion of the structure of the sound production component 11 may cover the antihelix region to form the baffle structure. In some embodiments, the included angle β may be within a range of 60°-100°. In some embodiments, the included angle β may be within a range of 80°-95° such that the sound production component 11 more closely fits with the ear of the user, which further improves the stability of the user wearing the headphone. At the same time, the baffle structure formed by the sound production component 11 and the antihelix 105 may better increase the distance from the pressure relief hole to the opening of the ear canal to improve the listening effect and the sound leakage reduction effect when the user wears the headphone.

In some embodiments, the size of the sound production component 11 in the short axis direction Z may also be reflected by distances between midpoints of projections of the upper sidewall 111 and the lower sidewall 112 of the sound production component 11 on the sagittal plane and a projection of an upper vertex of the ear hook on the sagittal plane. In order to improve the listening effect of the headphone 10 while ensuring that the headphone 10 does not block the opening of the ear canal of the user, in some embodiments, the distance between the midpoint of the projection of the upper sidewall 111 of the sound production component 11 on the sagittal plane and the projection of the upper vertex of the ear hook on the sagittal plane may be within a range of 13 mm-20 mm, and the distance between the midpoint of the projection of the lower sidewall 112 of the sound production component 11 on the sagittal plane and the projection of the upper vertex of the ear hook on the sagittal plane may be within a range of 22 mm-36 mm. In some embodiments, the distance between the midpoint of the projection of the upper sidewall 111 of the sound production component 11 on the sagittal plane and the projection of the upper vertex of the ear hook on the sagittal plane may be within a range of 14 mm-19.5 mm, and the distance between the midpoint of the projection of the lower sidewall 112 of the sound production component 11 on the sagittal plane and the projection of the upper vertex of the ear hook on the sagittal plane may be within a range of 22.5 mm-35 mm. In some embodiments, the distance between the midpoint of the projection of the upper sidewall 111 of the sound production component 11 on the sagittal plane and the projection of the upper vertex of the ear hook on the sagittal plane may be within a range of 15 mm-18 mm, and the distance between the midpoint of the projection of the lower sidewall 112 of the sound production component 11 on the sagittal plane and the projection of the upper vertex of the ear hook on the sagittal plane may be within a range of 26 mm-30 mm.

Figure 25A:
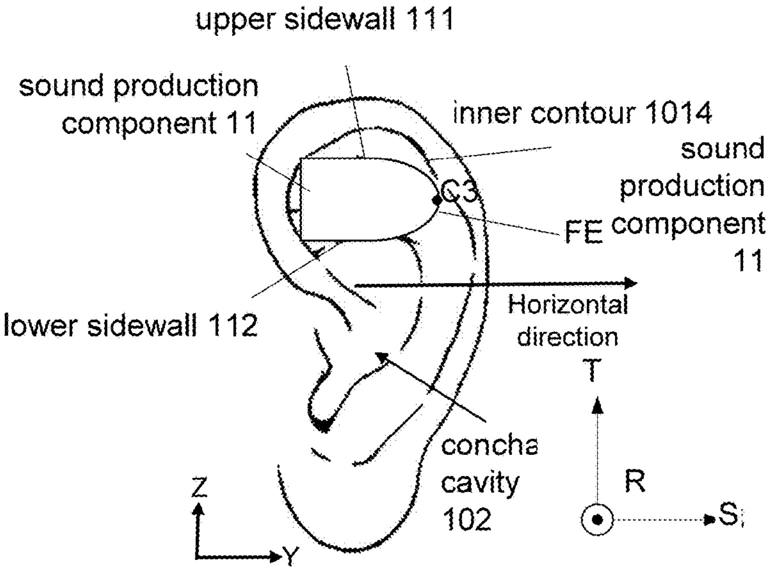
FIG. 25A is a schematic diagram illustrating an exemplary matching position between a headphone and an ear canal of a user according to some embodiments of the present disclosure.
Figure 25B:
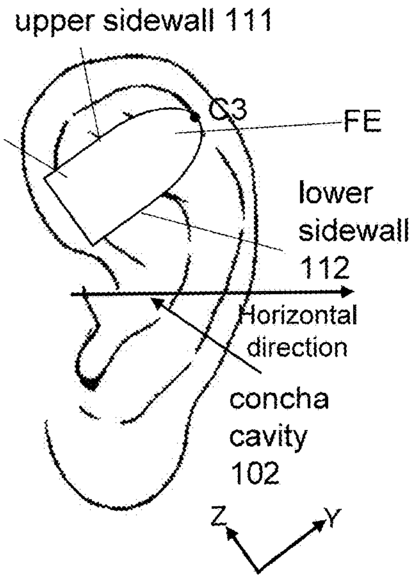
FIG. 25B is a schematic diagram illustrating another exemplary matching position between another headphone and an ear canal of a user according to some embodiments of the present disclosure.
Figure 25C:
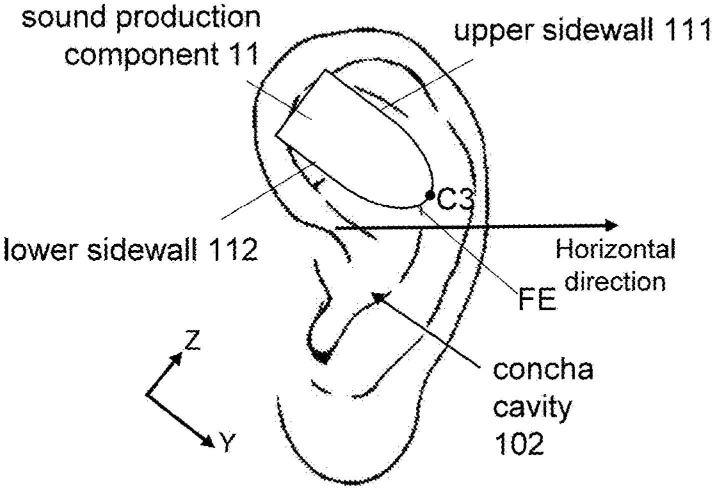
FIG. 25C is a schematic diagram illustrating another exemplary matching position between another headphone and an ear canal of a user according to some embodiments of the present disclosure.

Referring to FIG. 25A, in some embodiments, the upper sidewall 111 or the lower sidewall 112 of the sound production component 11 in the wearing state may be parallel or approximately parallel to a horizontal plane, and the end FE of the sound production component 11 may be located between the inner contour 1014 of the auricle and the edge of the concha cavity 102. That is to say, the midpoint C3 of the projection of the end FE of the sound production component 11 on the sagittal plane may be located between a projection of the inner contour 1014 of the auricle on the sagittal plane and a projection of the edge of the concha cavity 102 (the edge of the concha cavity 102 is shown as a dashed region 1015 in FIG. 24 and FIG. 25) on the sagittal plane. As shown in FIG. 25B and FIG. 19C, in some embodiments, the upper sidewall 111 or the lower sidewall 112 of the sound production component 11 in the wearing state may also be inclined at an angle relative to the horizontal plane. As shown in FIG. 25B, the end FE of the sound production component 11 is inclined relative to the fixed end of the sound production component 11 toward a region at a top of the auricle, and the end FE of the sound production component 11 may abut against the inner contour 1014 of the auricle. As shown in FIG. 25C, the fixed end of the sound production component 11 is inclined toward the region of the top of the auricle relative to the end FE of the sound production component 11, and the end FE of the sound production component 11 is located between the edge of the concha cavity 102 and the inner contour 1014 of the auricle. That is to say, the midpoint C3 of the projection of the end FE of the sound production component 11 on the sagittal plane is located between the projection of the inner contour 1014 of the auricle on the sagittal plane and the projection of the edge of the concha cavity 102 on the sagittal plane. In some embodiments, the midpoint C3 of the projection of the end FE of the sound production component 11 on the sagittal plane may be located between the projection of the inner contour 1014 of the auricle on the sagittal plane and the projection of the edge of the concha cavity 102 on the sagittal plane. In the wearing state, if a distance between the midpoint C3 of the projection of the end FE of the sound production component 11 on the sagittal plane and the projection of the edge of the concha cavity 102 on the sagittal plane is too small, the end FE of the sound production component 11 may not abut against the inner contour 1014 of the auricle, and the sound production component 11 may not be limited and may be easy to fall off. If the distance between the midpoint C3 of the projection of the end FE of the sound production component 11 on the sagittal plane and the projection of the edge of the concha cavity 102 on the sagittal plane is too large, the sound production component 11 may squeeze the inner contour 1014 of the auricle, causing discomfort to the user after a long time of wearing. In order to ensure that the headphone 10 has a better listening effect and ensure the wearing comfort and stability for the user, in some embodiments, a distance between the midpoint C3 of the projection of the end FE of the sound production component 11 on the sagittal plane and the projection of the edge of the concha cavity on the sagittal plane may not be greater than 15 mm. In some embodiments, the distance between the midpoint C3 of the projection of the end FE of the sound production component 11 on the sagittal plane and the projection of the edge of the concha cavity on the sagittal plane may not be greater than 13 mm. In some embodiments, the distance between the midpoint C3 of the projection of the end FE of the sound production component 11 on the sagittal plane and the projection of the edge of the concha cavity on the sagittal plane may not be greater than 11 mm. In addition, considering that when a gap is formed between the end FE of the sound production component 11 and the inner contour 1014 of the auricle, the sound emitted from the sound guiding hole and the sound emitted from the pressure relief hole may have an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In order to ensure the listening volume when the user wears the headphone 10, in some embodiments, the end FE of the sound production component 11 may abut against the inner contour 1014 of the auricle, to make the acoustic short circuit between the end FE of the sound production component 11 and the inner contour 1014 of the auricle closed, thereby increasing the listening volume at the opening of the ear canal.

In some embodiments, when the headphone 10 is in the wearing state and at least a portion of the sound production component 11 covers the antihelix region of the user, a distance between the centroid O of the first projection U and a centroid of a projection of the battery compartment 13 on the sagittal plane may vary to a certain extent compared with the wearing state in which at least a portion of the sound production component 11 is inserted into the concha cavity of the user. Similar to the wearing state in which at least a portion of the sound production component 11 is inserted into the concha cavity of the user and referring to FIG. 16, in order to make the user have better stability and comfort when the user wears the headphone 10, in the wearing state, a distance between the centroid O of the projection of the sound production component 11 on the sagittal plane and the centroid Q of the projection of the battery compartment 13 on the sagittal plane may be controlled to be within a range of 20 mm-31 mm. In some embodiments, the distance between the centroid O of the projection of the sound production component 11 on the sagittal plane and the centroid Q of the projection of the battery compartment 13 on the sagittal plane may be within a range of 22 mm-28 mm. In some embodiments, the distance between the centroid O of the projection of the sound production component 11 on the sagittal plane and the centroid Q of the projection of the battery compartment 13 on the sagittal plane may be within a range of 23 mm-26 mm. Due to the elasticity of the ear hook, in the wearing state and the non-wearing state of the headphone 10, the distance between the centroid O of the projection corresponding to the sound production component 11 and the centroid Q of the projection corresponding to the battery compartment 13 may vary. In some embodiments, in the non-wearing state, a distance (fifth distance) between the centroid O of the projection of the sound production component 11 on a specific reference plane and the centroid Q of the projection of the battery compartment 13 on the specific reference plane may be within a range of 16.7 mm-25 mm. In some embodiments, in the non-wearing state, the distance between the centroid O of the projection of the sound production component 11 on the specific reference plane and the centroid Q of the projection of the battery compartment 13 on the specific reference plane may be within a range of 18 mm-23 mm. In some embodiments, in the non-wearing state, the distance between the centroid O of the projection of the sound production component 11 on the specific reference plane and the centroid Q of the projection of the battery compartment 13 on the specific reference plane may be within a range of 19.6 mm-21.8 mm.

Taking the specific reference plane as the sagittal plane for an example, in some embodiments, when the headphone 10 is in the wearing state and the non-wearing state, a variation value (a ratio of a difference between the fourth distance and the third distance to the third distance) of the distance between the centroid O of the projection corresponding to the sound production component 11 and the centroid Q of the projection corresponding to the battery compartment 13 may reflect a softness of the ear hook. It may be understood that when the softness of the ear hook is too large, the overall structure and shape of the headphone 10 may be unstable, the sound production component 11 and the battery compartment 13 may not be strongly supported, the wearing stability may also be poor, and the headphone 10 may be liable to fall off. Considering that the ear hook needs to be hung at a connection part between the auricle and the head, when the softness of the ear hook is too small, the headphone 10 may not be liable to deform, and when the user wears the headphone, the ear hook may stick tightly and even compress a region between the human ear and/or head, affecting the wearing comfort. Accordingly, in order to make the user have better stability and comfort when wearing the headphone 10, in some embodiments, a ratio of the variation value of the distances between the centroid O of the first projection U and the centroid Q of the projection of the battery compartment 13 on the sagittal plane in the wearing state and the non-wearing state of the headphone 10 to the distance between the centroid O of the first projection U and the centroid Q of the projection of the battery compartment 13 on the sagittal plane in the non-wearing state of the headphone may be within a range of 0.3-0.7. In some embodiments, the ratio of the variation value of the distances between the centroid O of the projection on the sagittal plane and the centroid Q of the projection of the battery compartment 13 on the sagittal plane in the wearing state and the non-wearing state of the headphone 10 to the distance between the centroid O of the projection and the centroid Q of the projection of the battery compartment 13 in the non-wearing state of the headphone may be within a range of 0.45-0.68. The description regarding the specific reference plane may be found elsewhere in the present disclosure (e.g., FIG. 15 and FIG. 16 and corresponding descriptions thereof).

Figure 26:
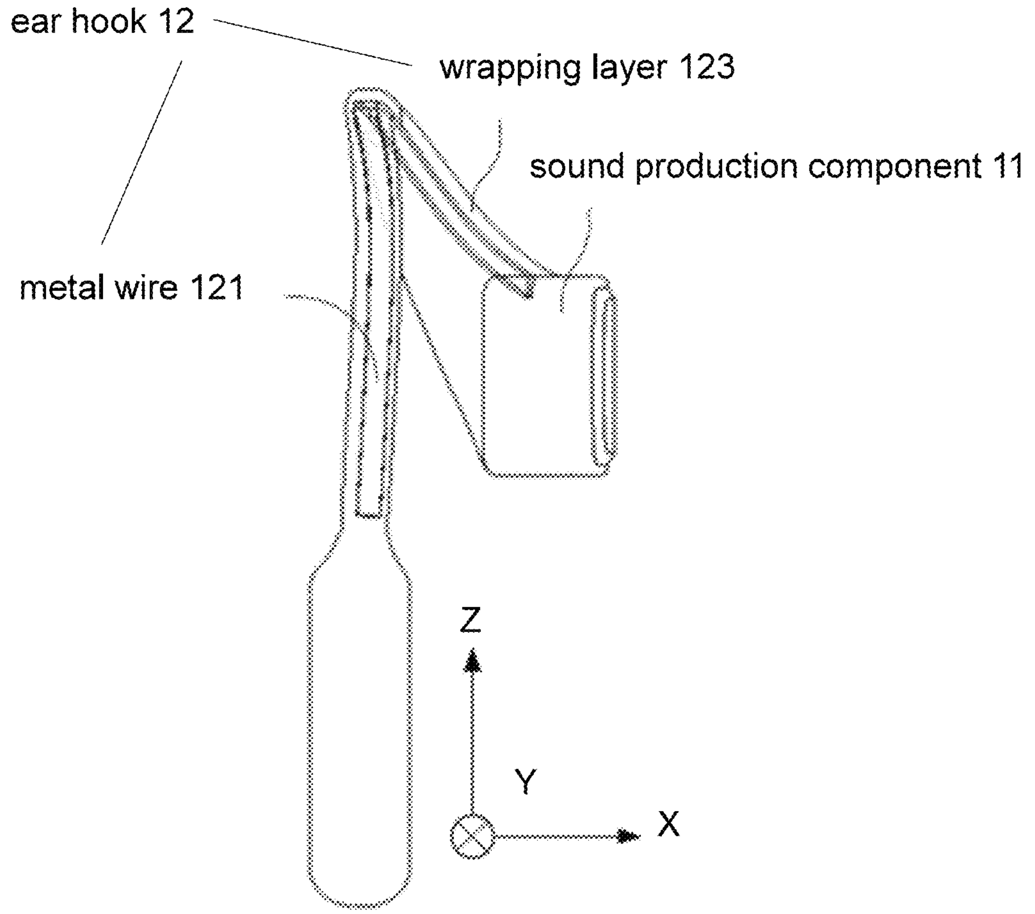
FIG. 26 is a schematic diagram illustrating a perspective view of a portion of components of an exemplary acoustic device according to some embodiments of the present disclosure.

FIG. 26 is a schematic diagram illustrating a perspective view of a portion of the components of an exemplary acoustic device according to some embodiments of the present disclosure.

In some embodiments, as shown in FIG. 26, the ear hook 12 of the headphone 10 may be composed of a metal wire 121 and a wrapping layer 123. The metal wire 121 may play a role of supporting and clamping, and the wrapping layer 123 may wrap the outer side of the metal wire 121, making the ear hook 12 softer and fit better with the auricle, thereby improving the wearing comfort of the user.

The headphone 10 may be described in detail by taking the headphone 10 shown in FIG. 21 as an example. It should be known that, without violating the corresponding acoustic principles, the structure of the headphone 10 in FIG. 21 and the corresponding parameters thereof may also be applied to the headphones of other configurations mentioned above.

In some embodiments, the metal wire 121 may include a spring steel, a titanium alloy, a titanium-nickel alloy, chrome-molybdenum steel, an aluminum alloy, a copper alloy, etc., or a combination thereof. In some embodiments, parameters such as a count, a shape, a length, a thickness, and a diameter of the metal wire 121 may be set according to actual needs (e.g., a diameter of the acoustic device, strength requirements for the acoustic device, etc.). The shape of the metal wire 121 may include any suitable shape, for example, a cylinder, a cube, a cuboid, a prism, an elliptical cylinder, etc.

Figure 27:
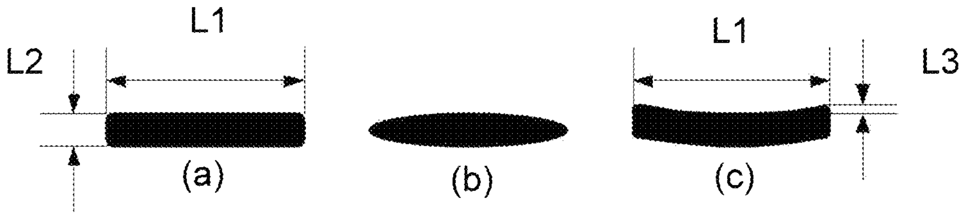
FIG. 27 is a schematic diagram illustrating a cross-sectional view of an exemplary metal wire according to some embodiments of the present disclosure.

FIG. 27 is a schematic diagram illustrating a cross-sectional view of an exemplary metal wire according to some embodiments of the present disclosure. As shown in FIG. 27, a metal wire 121 may have a flat structure, so that the metal wire 121 may have different deformability in various directions. In some embodiments, a cross-sectional shape of the metal wire 121 may include a square, a rectangle, a triangle, a polygon, a circle, an ellipse, an irregular shape, etc. As shown in (a) in FIG. 27, the cross-sectional shape of the metal wire 121 may be a rounded rectangle. As shown in (b) in FIG. 27, the cross-sectional shape of the metal wire 121 may be an ellipse. In some embodiments, the length of a long side (or a long axis, L1) and/or a short side (or a short axis, L2) of the metal wire 121 may be set according to actual needs (e.g., a diameter of an acoustic device including the metal wire 121). In some embodiments, the ratio of the long side to the short side of the metal wire 121 may be within a range of 1.1:1-2:1. In some embodiments, the ratio of the long side to the short side of the metal wire 121 may be 1.5:1.

In some embodiments, the metal wire 121 may form a specific shape by stamping, pre-bending, and other processes. Merely by way of example, an initial state of the metal wire 121 of the ear hook 12 of an acoustic device (i.e., a state before being processed) may be curled, which may be straightened and then stamped to make the metal wire 121 arc-shaped in the short axis direction (as shown in (c) in FIG. 27), so that the metal wire 121 may store a certain amount of internal stress and maintain the flat shape to become a "memory metal wire". When subjected to a small external force, the metal wire 121 may return to the curled shape, so that the ear hook 12 of the acoustic device may fit and wrap around the human ear. In some embodiments, a ratio of an arc height (L3 shown in FIG. 27) of the metal wire 121 to the long side of the metal wire 121 may be within a range of 0.1-0.4. In some embodiments, the ratio of the arc height of the metal wire 121 to the long side of the metal wire 121 may be within a range of 0.1-0.35. In some embodiments, the ratio of the arc height of the metal wire 121 to the long side of the metal wire 121 may be within a range of 0.15-0.3. In some embodiments, the ratio of the arc height of the metal wire 121 to the long side of the metal wire 121 may be within a range of 0.2-0.35. In some embodiments, the ratio of the arc height of the metal wire 121 to the long side of the metal wire 121 may be within a range of 0.25-0.4. By arranging the metal wire 121, rigidities of the components of the acoustic device along a length direction of the acoustic device may be improved, and the clamping effectiveness of the acoustic device (e.g., the ear hook 12) to the ear 100 of the user may be improved. In addition, after processing, the metal wire 121 of the ear hook 12 may be bent in the length direction of the ear hook 12 to have strong elasticity, thereby further improving the pressing and clamping effectiveness of the ear hook 12 to the ear 100 or the head of the user.

In some embodiments, the clastic modulus of the metal wire 121 may be obtained according to GB/T 24191-2009/ISO 12076:2002. In some embodiments, the clastic modulus of the metal wire 121 may keep in a specific range. When the shape and the size of the headphone 10 are constant, if the clastic modulus is too large, the ear hook 12 may not be easily deformed, making it difficult for the user to adjust a wearing angle of the ear hook 12. When the shape and the size of the headphone 10 are constant, if the clastic modulus is too small, the ear hook 12 may be easily deformed, so that the ear hook 12 may not be effectively clamped on both sides of the ear 100 after wearing. In some embodiments, in order to make the ear hook 12 effectively clamped on both sides of the ear 100 after wearing, the clastic modulus of the metal wire 121 may be within a range of 20 GPa-50 GPa. In some embodiments, in order to make the ear hook 12 easy to adjust, the clastic modulus of the metal wire 121 may be within a range of 25 GPa-43 GPa. In some embodiments, the clastic modulus of the metal wire 121 may be within a range of 30 GPa-40 GPa.

In some embodiments, the diameter of the metal wire 121 may be in a specific range. It should be noted that when the cross-sectional shape of the metal wire 121 is a circle, the diameter of the metal wire 121 may be defined as the length of the diameter of a circular cross-section of the metal wire 121. Besides, when the cross-sectional shape of the metal wire 121 is an ellipse, the diameter of the metal wire may be defined as the length of a long axis of an elliptical cross-section of the metal wire 121. Furthermore, when the cross-sectional shape of the metal wire 121 is a square, a rectangle, a triangle, a polygon, an irregular shape, etc., the diameter of the metal wire 121 may be defined as the length of the longest line segment among line segments of which two endpoints are located on the cross-section of the metal wire 121 and passing through a center of the cross-section of the metal wire 121.

In some embodiments, the diameter of the metal wire 121 may be in a specific range. When a material of the metal wire 121 and the shape and the size of the headphone 10 are constant, if the aforementioned diameter is too large, the ear hook 12 may be too heavy and exert pressure on the ear 100, a strength of the ear hook 12 may be too large, and the ear hook 12 may not easily deform, making it difficult for the user to adjust the wearing angle of the ear hook 12. When the material of the metal wire 121 and the shape and the size of the headphone 10 are constant, if the aforementioned diameter is too small, the strength of the ear hook 12 may be too low, the clamping force may be too weak, and the ear hook 12 may not be effectively clamped on both sides of the ear 100 after wearing. In some embodiments, in order to prevent the ear hook 12 from exerting the pressure on the ear 100 after wearing and to facilitate the adjustment of the wearing angle, the diameter of the metal wire 121 may be within a range of 0.5 mm-1 mm. In some embodiments, in order to increase the strength of the ear hook 12, the diameter of the metal wire 121 may be within a range of 0.6 mm-1 mm. In some embodiments, in order to make the ear hook 12 effectively clamped on both sides of the ear 100 after wearing, the diameter of the metal wire 121 may be within a range of 0.7 mm-0.9 mm.

In some embodiments, the density of the metal wire 121 may be in a specific range. If the aforementioned density is too large, the ear hook 12 may be too heavy, which may cause pressure to the ear 100. If the aforementioned density is too small, the strength of the ear hook 12 may be too low, which may make the ear hook 12 easy to damage, and short in service life. In some embodiments, in order to prevent the ear hook 12 from exerting pressure on the ear 100 after wearing, the density of the metal wire 121 may be within a range of 5 $g/cm^3$-7 $g/cm^3$. In some embodiments, in order to increase the strength of the ear hook 12, the density of the metal wire 121 may be within a range of 5.5 $g/cm^3$-6.8 $g/cm^3$. In some embodiments, the density of the metal wire 121 may be within a range of 5.8 $g/cm^3$-6.5 $g/cm^3$.

In some embodiments, the wrapping layer 123 may be made of a soft material, a hard material, etc., or a combination thereof. The soft material refers to a material with a hardness (e.g., the Shore hardness) less than a first hardness threshold (e.g., 15 A, 20 A, 30 A, 35 A, 40 A, etc.). For example, the Shore hardness of the soft material may be in the ranges of 45 A-85 A or 30 D-60 D. The hard material refers to a material with a hardness (e.g., the Shore hardness) greater than a second hardness threshold (e.g., 65 D, 70 D, 75 D, 80 D, etc.). The soft material may include Polyurethanes (PU) (e.g., thermoplastic polyurethanes (TPU)), polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF), urea-formaldehyde (UF), melamine-formaldehyde (MF), silica gel, or the like, or any combination thereof. The hard material may include polyethersulfone resin (PES), polyvinylidenechloride (PVDC), polymethylmethacrylate (PMMA), poly-ether-ether-ketone (PEEK), etc., or any combination thereof, or any mixture with glass fibers, carbon fibers or other reinforcing agents. In some embodiments, the wrapping layer 123 may be arranged according to specific conditions. For example, the metal wire 121 may be directly covered with the soft material. As another example, the metal wire 121 may be covered with the hard material first, and then the hard material may be wrapped with the soft material. As another example, in the wearing state, a portion of the ear hook 12 in contact with the user may be made of the soft material, and a remaining portion of the ear hook 12 may be made of the hard material. In some embodiments, different materials may be formed by two-color injection molding, spraying rubber paint, or other processes. The rubber paint may include rubber paint, clastic paint, plastic clastic paint, etc., or any combination thereof. In the embodiment, the soft material may improve the comfort of the user wearing the ear hook 12, and the hard material may improve the strength of the ear hook 12. By rationally configuring the materials of each part of the ear hook 12, it is possible to improve the strength of the ear hook 12 while improving the wearing comfort of the user.

In some embodiments, the Shore hardness of the wrapping layer 123 may keep in a specific range. If the aforementioned Shore hardness is too large, the comfort of the user wearing the ear hook 12 may be poor. In some embodiments, in order to increase the comfort of the user wearing the ear hook 12, the Shore hardness of the wrapping layer 123 may be within a range of 10 HA-80 HA. In some embodiments, the Shore hardness of the wrapping layer 123 may be within a range of 15 HA-70 HA. In some embodiments, the Shore hardness of the wrapping layer 123 may be in a range of 25 HA-55 HA. In some embodiments, the Shore hardness of the wrapping layer 123 may be within a range of 30 HA-50 HA.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by the present disclosure, and are within the spirit and scope of the exemplary embodiments of the present disclosure.

What is claimed is:

1. A headphone, comprising:

a sound production component; and an ear hook including a first portion and a second portion connected in sequence, wherein the first portion is configured to be hung between an auricle of a user and a head of the user, the second portion extends toward a front outer side of the auricle, connects with the sound production component, and is configured to place the sound production component at a position close to an ear canal without blocking an opening of the ear canal, and at least a portion of the sound production component is inserted into a concha cavity;

wherein the sound production component and the first portion of the ear hook clamp the auricle in a wearing state, a minimum distance between the sound production component and the first portion of the ear hook in the wearing state has a difference with a minimum distance between the sound production component and the first portion of the ear hook in a non-wearing state, and the difference is not less than 1 mm; and the sound production component has a first projection on a sagittal plane of the user, and a distance between a centroid of the first projection and a projection of an edge of the concha cavity of the auricle on the sagittal plane is within a range of 4 mm-25 mm.

2. The headphone of claim 1, wherein, in the non-wearing state, the minimum distance between the sound production component and the first portion of the ear hook is not larger than 3 mm.

3. The headphone of claim 1, wherein the auricle has a second projection on the sagittal plane, the centroid of the first projection has a first distance from a highest point of the second projection in a vertical axis direction, a ratio of the first distance to a height of the second projection in the vertical axis direction is within a range of 0.25-0.6, the centroid of the first projection has a second distance from an end point of the second projection on a sagittal axis direction, and a ratio of the second distance to a width of the second projection in the sagittal axis direction is within a range of 0.4-0.7.

4. The headphone of claim 1, wherein, in the non-wearing state, an inclination angle of the sound production component relative to a plane of the ear hook is within a range of 15°-28° or an inclination angle of the sound production component relative to a plane of the auricle is within a range of 40°-60°.

5. The headphone of claim 1, wherein a distance between a farthest point on the sound production component from the plane of the ear hook and the plane of the ear hook is within a range of 11.2 mm-16.8 mm.

6. The headphone of claim 4, wherein an included angle between a direction of a clamping force of the sound production component and the first portion of the ear hook to the auricle and the sagittal plane is within a range of −30°-30°.

7. The headphone of claim 1, wherein the at least a portion of the sound production component inserted into the concha cavity includes at least one clamping region in contact with the edge of the concha cavity; and the ear hook includes a clamping fulcrum located at a position with a smallest cross-sectional area on the ear hook, and a clamping coefficient of the ear hook based on the clamping fulcrum is within a range of 10 N/m-30 N/m.

8. The headphone of claim 7, wherein a distance between a midpoint of a projection of an upper sidewall of the sound production component on the sagittal plane and a projection of the clamping fulcrum on the sagittal plane is within a range of 21 mm-32 mm; and a distance between a midpoint of a projection of a lower sidewall of the sound production component on the sagittal plane and the projection of the clamping fulcrum on the sagittal plane is within a range of 32 mm-48 mm.

9. The headphone of claim 7, wherein a distance between a center of the clamping region and the clamping fulcrum is within a range of 20 mm-40 mm.

10. The headphone of claim 9, wherein a distance between an ear hook clamping point on the first portion of the ear hook and the clamping fulcrum is within a range of 25 mm-45 mm.

11. The headphone of claim 10, wherein an included angle between a first connection line from the center of the clamping region to the clamping fulcrum and a second connection line from the ear hook clamping point to the clamping fulcrum is within a range of 6°-12°.

12. The headphone of claim 11, wherein in the wearing state, a distance between the centroid of the first projection and a projection of the first portion of the ear hook on the sagittal plane is within a range of 18 mm-43 mm.

13. The headphone of claim 12, wherein in the non-wearing state, a distance between a centroid of a projection of the sound production component on a specific reference plane and a centroid of a projection of the first portion of the ear hook on the specific reference plane is within a range of 13 mm-38 mm.

14. The headphone of claim 1, wherein the headphone further comprises a battery compartment, the battery compartment being located at an end of the ear hook away from the sound production component; and in the non-wearing state, the centroid of the projection of the sound production component on a specific reference surface has a third distance from a centroid of a projection of the battery compartment on the specific reference surface, the third distance being within a range of 16.7 mm-25 mm.

15. The headphone of claim 14, wherein in the wearing state, the centroid of the first projection has a fourth distance from a centroid of a projection of the battery compartment on the sagittal plane, the fourth distance being within a range of 20 mm-30 mm.

16. The headphone of claim 15, wherein a ratio of a difference between the fourth distance and the third distance to the fourth distance is within a range of 0.3-0.8.

17. The headphone of claim 1, wherein a clamping force of the sound production component and the first portion of the ear hook to the auricle is within a range of 0.03 N-1 N.

18. A headphone, comprising:

a sound production component; and an ear hook including a first portion and a second portion connected in sequence, wherein the first portion is configured to be hung between an auricle of a user and a head of the user, the second portion extends toward a front outer side of the auricle, connects with the sound production component, and is configured to place the sound production component at a position close to an ear canal without blocking an opening of the ear canal, and at least a portion of the sound production component covers an antihelix region, wherein the sound production component and the auricle have a first projection and a second projection on a sagittal plane, respectively, a centroid of the first projection has a first distance from a highest point of the second projection in a vertical axis direction, and a ratio of the first distance to a height of the second projection in the vertical axis direction is within a range of 0.25-0.4;

the centroid of the first projection has a second distance from an end point of the second projection in a sagittal axis direction, and a ratio of the second distance to a width of the second projection in the sagittal axis direction is within a range of 0.4-0.6; and a side of the sound production component facing the antihelix region includes a clamping region in contact with the antihelix region, and in a wearing state, a distance between a farthest point on the sound production component from a plane of the ear hook and the plane of the ear hook is within a range of 12 mm-19 mm.

19. The headphone of claim 18, wherein in the wearing state, an inclination angle of the sound production component relative to the plane of the ear hook is not greater than 8°.

20. The headphone of claim 18, wherein in a non-wearing state, an inclination angle of the sound production component relative to the plane of the ear hook is not greater than 6°.

* * * * *